United States Patent [19]
Goler et al.

[11] Patent Number: 5,812,833
[45] Date of Patent: *Sep. 22, 1998

[54] TIMER BUS STRUCTURE FOR AN INTEGRATED CIRCUIT

[75] Inventors: Vernon Bernard Goler, Austin; Gary Lynn Miller, Round Rock; David Rivera, Austin, all of Tex.

[73] Assignee: Motorola, Inc., Schaumburg, Ill.

[*] Notice: The term of this patent shall not extend beyond the expiration date of Pat. No. 5,634,045.

[21] Appl. No.: 555,454

[22] Filed: Nov. 13, 1995

[51] Int. Cl.$^6$ .............................. G06F 13/40; G06F 1/04
[52] U.S. Cl. ........................ 395/557; 395/306; 395/559
[58] Field of Search .................................. 395/557, 559, 395/306, 308, 309, 845

[56] References Cited

U.S. PATENT DOCUMENTS

| | | | |
|---|---|---|---|
| 4,589,093 | 5/1986 | Ippolito et al. | 395/672 |
| 4,926,319 | 5/1990 | Wilkie et al. | 364/200 |
| 4,942,522 | 7/1990 | Wilkie et al. | 364/200 |
| 4,952,367 | 8/1990 | Porter et al. | 364/200 |
| 5,042,005 | 8/1991 | Miller et al. | 364/900 |
| 5,117,498 | 5/1992 | Miller et al. | 395/775 |
| 5,129,078 | 7/1992 | Groves et al. | 395/550 |
| 5,535,376 | 7/1996 | Catherwood et al. | 395/557 |
| 5,634,045 | 5/1997 | Goler et al. | 395/559 |

FOREIGN PATENT DOCUMENTS

A3 0 180 196  5/1986  European Pat. Off. .......... G04G 1/00

OTHER PUBLICATIONS

Motorola Ltd. 1994 Reference Manual, "Modular Microcontroller Family–CTM–Configurable Timer Module", USA/EUROPE Motorola Lit. Distribution, pp. 1–1 thru 10–14 & Appendix A–D.

Motorola Ltd. 1994 Reference Manual, "Modular Microcontroller Family–TPU–Time Processor Unit" USA/EUROPE Motorola Lit.Distribution, pp. 1–1 thru 4–8 & Appendix A–D.

Intel Corp. Lit. Dept., Santa Clara, CA, 8096 16–Bit Microcontroller Architectural Specification & Functional Description, Advance Info., pp. 1–21.

Hitachi, Ltd. 1987, Hitachi Microcomputer System HD63140 Universal Pulse Processor (UPP), Mar. 1987, pp. 1–55.

Motorola Inc., 1995, "Motorola Semiconductor Technical Data—Technical Summary 32–Bit Modular Microcontroller MC68336", pp. 1–141.

*Primary Examiner*—Dennis M. Butler
*Attorney, Agent, or Firm*—Susan C. Hill

[57] ABSTRACT

I/O control modules (25–29) include a timer bus (71, 72) which may be segmented anywhere along its length. As a result, the channels (86, 87) are partitioned by each timer bus (71, 72) into separate blocks of channels (86, 87) which are provided with access to different timebases by their respective timer bus (71, 72). The channels within one timer bus block (e.g. 86) can be used to perform different function(s) with the potential for no loss of resolution because each channel in a timer bus block (e.g. 86) can concurrently receive the same timebase value from its corresponding timer bus (71). In one embodiment, one end of each timer bus (71, 72) is delineated by a master timer bus control channel (61, 63), and the other end of the timer bus is delineated by a slave timer bus control channel (62, 64).

9 Claims, 26 Drawing Sheets

| LOGIC LEVEL OF TOGGLE CONDUCTOR 159 | LOGIC LEVEL OF SET CONDUCTOR 157 | LOGIC LEVEL OF CLEAR CONDUCTOR 158 | CURRENT LOGIC LEVEL OF RESULT CONDUCTOR 168 | NEXT LOGIC LEVEL OF RESULT CONDUCTOR 168 |
|---|---|---|---|---|
| 0 | 0 | 0 | 0 | 1 |
| 0 | 0 | 0 | 1 | 0 |
| 0 | 0 | 1 | 0 | 1 |
| 0 | 0 | 1 | 1 | 0 |
| 0 | 1 | 0 | 0 | 1 |
| 0 | 1 | 0 | 1 | 0 |
| 0 | 1 | 1 | 0 | 1 |
| 0 | 1 | 1 | 1 | 0 |
| 1 | 0 | 0 | 0 | 0 |
| 1 | 0 | 0 | 1 | 1 |
| 1 | 0 | 1 | 0 | 1 |
| 1 | 0 | 1 | 1 | 1 |
| 1 | 1 | 0 | 0 | 0 |
| 1 | 1 | 0 | 1 | 0 |
| 1 | 1 | 1 | 0 | 0 |
| 1 | 1 | 1 | 1 | 1 |

NOTE:
LOGIC LEVEL "0" IS THE ASSERTED STATE OF CONDUCTORS 157-159.
LOGIC LEVEL "1" IS THE NEGATED STATE OF CONDUCTORS 157-159.

| PIN OUTPUT STIMULUS CONTROL BITS (182 OR 183) | FUNCTION |
|---|---|
| 000 | DISABLED |
| 001 | RISING |
| 010 | FALLING |
| 011 | TOGGLE |
| 100 | AND-TO-CLEAR |
| 101 | AND-TO-SET |
| 110 | OR-TO-CLEAR |
| 111 | OR-TO-SET |

*FIG.8*

| LOGICAL COMBINATION OF CHANNEL OUTPUTS (SEE FIG.5) | | | | | | | | | |
|---|---|---|---|---|---|---|---|---|---|
| OUTPUT OF MATCH CHANNEL 160 | OUTPUT OF MATCH CHANNEL 161 | LOGIC LEVEL OF PIN 165 | | | | | | | |
| | | AND-TO-SET | | OR-TO-SET | | AND-TO-CLEAR | | OR-TO-CLEAR | |
| | | CURRENT | NEXT | CURRENT | NEXT | CURRENT | NEXT | CURRENT | NEXT |
| T | F | 0 | 0 | 0 | 0 | 1 | 1 | 1 | 1 |
| F | T | 0 | 0 | 0 | 1 | 1 | 1 | 1 | 0 |
| T | F | 0 | 0 | 0 | 1 | 1 | 1 | 1 | 0 |
| T | T | 0 | 1 | 0 | 1 | 1 | 0 | 1 | 0 |

*FIG.9*

EIGHT EXAMPLES OF PROVIDING TIMEBASE VALUES (TB1 THRU TB8) USING THE EIGHT TIME SLOTS OF A TIMER BUS

| EXAMPLE | TIME SLOT 1 | TIME SLOT 2 | TIME SLOT 3 | TIME SLOT 4 | TIME SLOT 5 | TIME SLOT 6 | TIME SLOT 7 | TIME SLOT 8 |
|---|---|---|---|---|---|---|---|---|
| 1 | TB1 | | | | | | | |
| 2 | TB1 | TB2 | TB1 | TB2 | TB1 | TB2 | TB1 | TB2 |
| 3 | TB1 | TB2 | TB1 | TB3 | TB1 | TB2 | TB1 | TB3 |
| 4 | TB1 | TB2 | TB3 | TB4 | TB1 | TB2 | TB3 | TB4 |
| 5 | TB1 | TB2 | TB3 | TB4 | TB1 | TB2 | TB3 | TB5 |
| 6 | TB1 | TB2 | TB3 | TB4 | TB1 | TB2 | TB5 | TB6 |
| 7 | TB1 | TB2 | TB3 | TB4 | TB5 | TB6 | TB7 | TB8 |
| 8 | TB1 | TB2 | TB3 | TB4 | TB5 | TB6 | TB7 | TB8 |

MAXIMUM RESOLUTION (SYSTEM CLOCKS)

| EXAMPLE | 2 | 4 | 8 | 16 |
|---|---|---|---|---|
| 1 | TB1 | | | |
| 2 | | TB1-2 | | |
| 3 | | TB1 | TB2-3 | |
| 4 | | | TB1-4 | |
| 5 | | | TB1-3 | TB4-5 |
| 6 | | | TB1-2 | TB3-6 |
| 7 | | | TB1 | TB2-7 |
| 8 | | | | TB1-8 |

FIG. 15

NOTE:
    DTC = DATA TRANSFER CONTROL REGISTER BITS
    DVB = DATA VALID REGISTER BITS
    DTS = DATA TRANSFER STATUS REGISTER BITS
    VADP/IADP = VALID ADJACENT DATA PAIR/INVALID
                ADJACENT DATA PAIR OUTPUT EVENT SIGNAL(S)

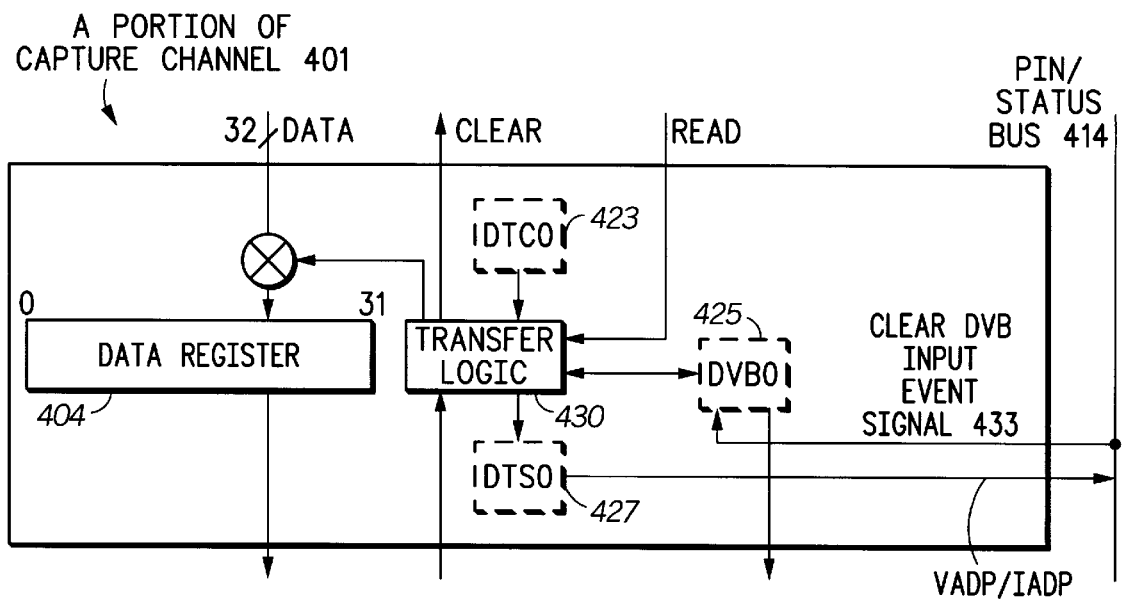

NOTE:
DTC = DATA TRANSFER CONTROL REGISTER BITS
DVB = DATA VALID REGISTER BITS
DTS = DATA TRANSFER STATUS REGISTER BITS
VADP/IADP = VALID ADJACENT DATA PAIR/INVALID
DATA PAIR OUTPUT EVENT SIGNAL(S) ADJACENT

*FIG. 22*

| TYPE OF CHANNEL | MODE | DATA VALID BIT SET (DVB=1) | | | DATA VALID BIT CLEARED (DVB=0) | | |
|---|---|---|---|---|---|---|---|
| | | WRITE TO DATA REGISTER | TRANSFER FROM TOP ADJACENT CHANNEL | END OF OPERATION | READ 1 WRITE 0 TO DVB | TRANSFER TO BOTTOM ADJACENT CHANNEL | END OF OPERATION |
| MATCH | MATCH | X | | | X | X | X |
| | TRANSFER | X | X | | X | X | |
| | MATCH TRANSFER | X | X | | X | X | X |
| CAPTURE | CAPTURE | X | | X | X | X | |
| | TRANSFER | X | X | | X | X | |
| UP COUNTER | COUNT | X | | X | X | X | |
| | TRANSFER | X | X | | X | X | |
| DOWN/UP COUNTER | COUNT/ TRANSFER | | | | UP COUNTER | X | X |

*FIG. 23*

| LOGIC LEVEL OF DATA TRANSFER CONTROL BITS (DTC) | CORRESPONDING DATA TRANSFER OPERATION |
|---|---|
| 0  0 | DISABLED |
| 0  1 | ENABLED WITH NO OUTPUT EVENT |
| 1  0 | ENABLED WITH VALID ADJACENT DATA PAIR DETECT OUTPUT EVENT |
| 1  1 | ENABLED WITH INVALID ADJACENT DATA PAIR DETECT OUTPUT EVENT |

```
                                                    A PORTION OF
                                                    REGISTERS 66
BIT NUMBER:
  0    1    2    3    4    5    6    7    8    9   10   11   12   13   14   15
┌────┬────────┬────────┬─────────────┬────┬────┬────────┬────────────────┐
│16/32│  CWE  │  DTC   │    CTB      │SCC │    │  CWI   │    RESERVED    │
│ 500 │  501  │  502   │    503      │504 │    │  505   │                │
└────┴────────┴────────┴─────────────┴────┴────┴────────┴────────────────┘
                                        RESERVED
BIT NUMBER:
 16   17   18   19   20   21   22   23   24   25   26   27   28   29   30   31
┌────┬──────────────────┬────┬──────────┬──────────┬──────────────┬────┬──────┐
│    │     CI/CDVI      │    │ CIE/CDVE │ RESERVED │   CO/DTO     │    │COE/DTOE│
│    │      506         │    │    507   │          │     508      │    │  509 │
└────┴──────────────────┴────┴──────────┴──────────┴──────────────┴────┴──────┘
 RESERVED      RESERVED                                           RESERVED
```

16/32: 16-BIT OR 32-BIT
    FUNCTIONALITY

CWE: CAPTURE WINDOW ENABLE

DTC: DATA TRANSFER CONTROL

CTB: CAPTURE TIMEBASE

SCC: SINGLE/CONTINUOUS CAPTURE

CWI: CAPTURE WINDOW INPUT

CI/CDVI: CAPTURE INPUT/
    CLEAR DATA VALID INPUT

CIE/CDVE: CAPTURE INPUT EDGE/
    CLEAR DATA VALID EDGE

CO/DTO: CAPTURE OUTPUT/
    DATA TRANSFER OUTPUT

COE/DTOE: CAPTURE OUTPUT EDGE/
    DATA TRANSFER OUTPUT EDGE

*FIG. 35*

```
                                                    A PORTION OF
                                                    REGISTERS 66
BIT NUMBER:
  0    1    2    3    4    5    6    7    8    9   10   11   12   13   14   15
┌──────────────────────────────────────────────────┬────┬────┬────┬────┬────┐
│                   RESERVED                       │CES │CDVS│    │DVB │CIS │
│                                                  │510 │511 │    │513 │514 │
└──────────────────────────────────────────────────┴────┴────┴────┴────┴────┘
                                                          COS/DTS
                                                            512
```

CES: CAPTURE EDGE STATUS

CDVS: CLEAR DATA VALID STATUS

COS: CAPTUE OUTPUT STATUS

DTS: DATA TRANSFER OUTPUT
    STATUS

DVB: DATA VALID BIT

CIS: CAPTURE INPUT STATUS/
    CLEAR DATA VALID STATUS

*FIG. 36*

A PORTION OF REGISTERS 65

BIT NUMBER:

| 0 1 | 2 3 4 | 5 6 7 | 8 | 9 10 11 12 13 14 15 |
|---|---|---|---|---|
| 12/16/32 529 | RESERVED | MTB 530 | SCM 531 | RESERVED |

BIT NUMBER:

| 16 17 18 19 20 21 22 23 24 | 25 26 27 28 | 29 30 31 |
|---|---|---|
| RESERVED | MO 532 | MOE 533 |

12/16/32: 12-BIT/16-BIT/ OR 32-BIT OPERATION
MTB: MATCH TIME BASE

SCM: SINGLE/CONTINUOUS MATCH
MOE: MATCH OUTPUT EDGE
MO: MATCH OUTPUT

*FIG. 38*

A PORTION OF REGISTERS 65

BIT NUMBER:

| 0 1 2 3 4 5 6 7 8 9 10 11 12 13 14 | 15 |
|---|---|
| RESERVED | MS 534 |

MS: MATCH STATUS

*FIG. 39*

TIMER BUS STRUCTURE FOR AN INTEGRATED CIRCUIT

REFERENCE TO RELATED APPLICATIONS

The present application is related to the following U.S. patent applications:

"INTEGRATED CIRCUIT INPUT/OUTPUT PROCESSOR HAVING IMPROVED TIMER CAPABILITY", invented by Vernon B. Goler et al., Attorney Docket No. SC-01861A, filed concurrently herewith, and assigned to the assignee hereof now U.S. Pat. No. 5,634,045;

"DATA TRANSFER BETWEEN INTEGRATED CIRCUIT TIMER CHANNELS", invented by Gary L. Miller et al., Attorney Docket No. SC-01864A, filed concurrently herewith, and assigned to the assignee hereof now U.S. Pat. No. 5,721,889;

"PIN AND STATUS BUS STRUCTURE FOR AN INTEGRATED CIRCUIT", invented by Gary L. Miller et al., Attorney Docket No. SC-01865A, filed concurrently herewith, and assigned to the assignee hereof now U.S. Pat. No. 5,701,421;

"SIGNAL/CONDITION BROADCAST FEATURE OF AN INTEGRATED CIRCUIT TIMER", invented by Gary L. Miller et al., Attorney Docket No. SC-01866A, filed concurrently herewith, and assigned to the assignee hereof now U.S. Pat. No. 5,732,225;

"PERFORMING FLEXIBLE LOGICAL OPERATIONS WITH TIMER CHANNEL OUTPUTS", invented by Gary L. Miller et al., Attorney Docket No. SC-01897A, filed concurrently herewith, and assigned to the assignee hereof now U.S. Pat. No. 5,721,888;

"TIMEBASE SYNCHRONIZATION IN SEPARATE INTEGRATED CIRCUITS OR SEPARATE MODULES", invented by Rudolf Bettelheim et al., Attorney Docket No. SC-01898A, filed concurrently herewith, and assigned to the assignee hereof now U.S. Pat. No. 5,729,721; and "FLEXIBLE CONFIGURATION OF TIMEBASES IN A TIMER SYSTEM", invented by Gary L. Miller et al., Attorney Docket No. SC-01899A, filed concurrently herewith, and assigned to the assignee hereof now U.S. Pat. No. 5,631,853.

FIELD OF THE INVENTION

The present invention relates in general to an integrated circuit, and more particularly to a timer bus structure for an integrated circuit.

BACKGROUND OF THE INVENTION

Data processing systems used for complex real-time control systems, for example, automotive and robotics control systems, are requiring finer control, faster system response, and more input/output (I/O) capability. As a result, the need for more, faster, and improved input/output (I/O) processing by the data processing system has grown significantly. Microcomputers are expected to provide higher resolution outputs, both digital and analog, for more accurate control. For higher frequency control functions, the central processing unit (CPU) may not be capable of responding at the rate needed, due to processing overhead. A solution is needed which provides more, faster, and improved I/O processing capability without overburdening the CPU.

In addition, microcomputers are required to be very flexible in order to accommodate a wide variety of applications. In microcomputers of the past, flexibility in I/O processing has been provided through central processing unit (CPU) software which operates on ports or simple timer channels. Analog and digital I/O were linked through CPU software as well. However, I/O bandwidth was sacrificed primarily due to system overhead since the CPU was involved in all I/O. Thus, a solution is needed which provides both flexibility and increased I/O capability.

BRIEF DESCRIPTION OF THE DRAWINGS

FIG. 6 illustrates, in tabular form, a truth table which is used by pin control circuitry 64 in FIG. 5 to determine the logic level of result conductor 168;

FIG. 7 illustrates, in block diagram form, a portion of control registers 166 and a portion of control registers 167 of FIG. 5 in accordance with one embodiment of the present invention;

FIG. 8 illustrates, in tabular form, a set of functions which can be user programmed by pin output stimulus control bits 182 or 183 of FIG. 7;

FIG. 9 illustrates, in tabular form, an example of the results produced at pin 165 of FIG. 5 by the logical ANDing and logical ORing of the states of match channels 160 and 161;

FIG. 15 illustrates, in tabular form, eight examples of how a user may selective provide one or more timebase values during the different time slots of a timer bus;

FIG. 22 illustrates, in block diagram form, a portion of capture channel 401 of FIG. 20 in accordance with one embodiment of the present invention;

FIG. 23 illustrates, in tabular form, the actions that can set and clear the DVB bit (e.g. 425 in FIG. 22) of each channel which supports data transfer operation while it is configured in each of its modes of operation;

FIG. 35 illustrates, in block diagram form, a first portion of registers 66 of FIG. 2 in accordance with one embodiment of the present invention;

FIG. 36 illustrates, in block diagram form, a second portion of registers 66 of FIG. 2 in accordance with one embodiment of the present invention;

FIG. 38 illustrates, in block diagram form, a first portion of registers 65 of FIG. 2 in accordance with one embodiment of the present invention;

FIG. 39 illustrates, in block diagram form, a second portion of registers 65 of FIG. 2 in accordance with one embodiment of the present invention.

DESCRIPTION OF THE PREFERRED EMBODIMENTS

Figure 1:
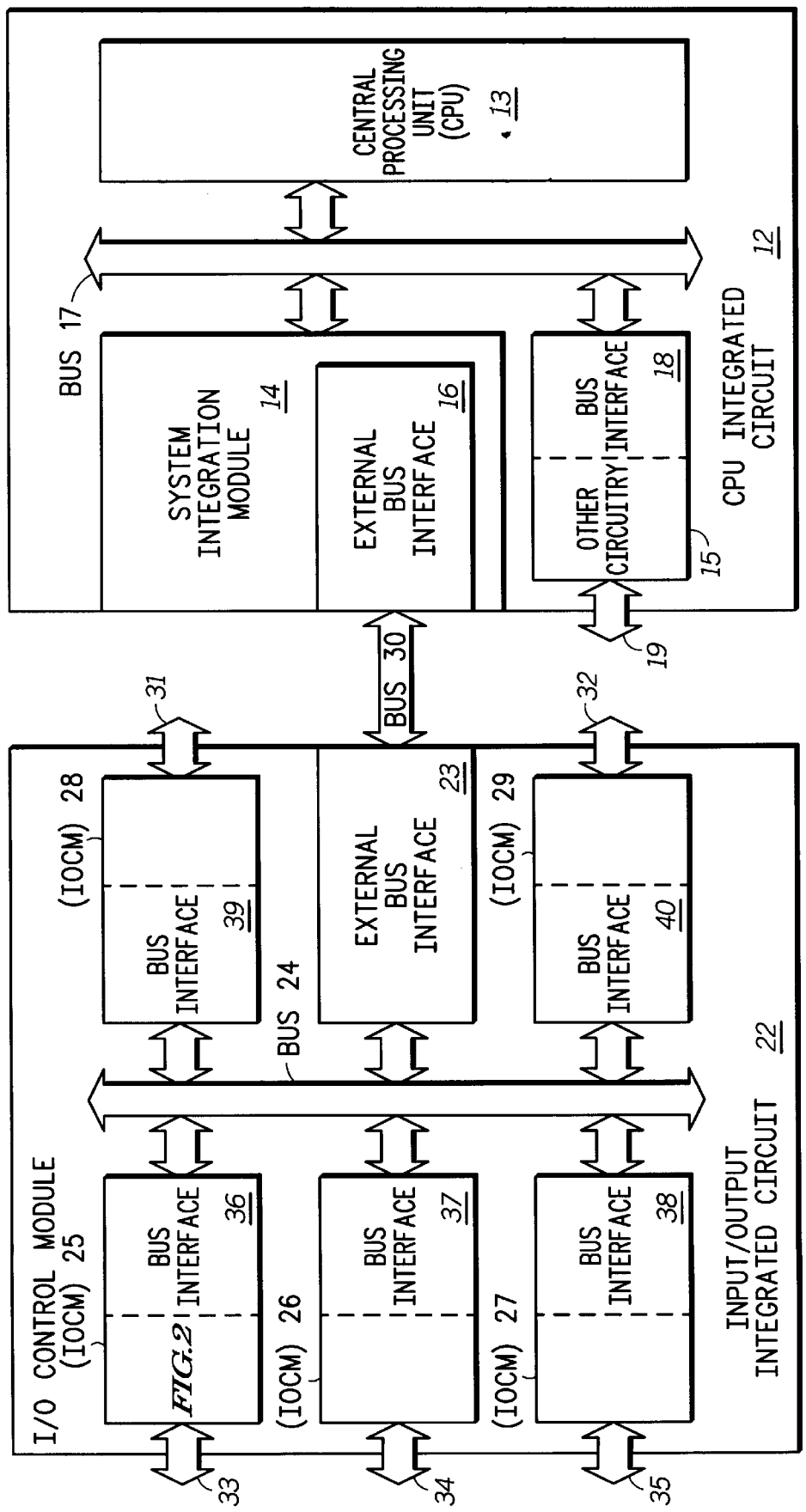
FIG. 1 illustrates, in block diagram form, a data processing system 10 in accordance with one embodiment of the present invention.

The term "bus" will be used to refer to a plurality of signals or conductors which may be used to transfer one or more various types of information, such as data, addresses, control, or status.

The terms "assert" and "negate" will be used when referring to the rendering of a signal, status bit, integrated circuit pin, or similar apparatus into its logically true or logically false state, respectively. If the logically true state is a logic level one, the logically false state will be a logic level zero. And if the logically true state is a logic level zero, the logically false state will be a logic level one.

The term "set" will be used when referring to the rendering of a signal, status bit, integrated circuit pin, or similar apparatus to a logic level one. The term "clear" will be used when referring to the rendering of a signal, status bit, integrated circuit pin, or similar apparatus to a logic level zero. And, the term "toggle" will be used when referring to the rendering of a signal, status bit, integrated circuit pin, or similar apparatus to a logic level one if the present state is a logic level zero, and to a logic level zero if the present state is a logic level one.

The symbol "%" preceding a number indicates that the number is represented in its binary or base two form. The symbol "$" preceding a number indicates that the number is represented in its hexadecimal or base sixteen form. The term "integrated circuit pin" and the term "pin" are used interchangeably. In addition, where the term "integrated circuit pin" or "pin" is used, a bonding pad, or any conductor for providing an electrical coupling from an integrated circuit to an external device, may alternately be used.

In the following description, numerous specific details are set forth such as specific word or byte lengths, etc. to provide a thorough understanding of the present invention. However, it will be obvious to those skilled in the art that the present invention may be practiced without such specific details. In other instances, circuitry has been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Although the terms "integrated circuit pin" and "pin" (e.g. 31–35 35 and 19 in FIG. 1) are used throughout this document, these terms are intended to encompass any type of apparatus which allows electrical signals to be transferred to or from an integrated circuit, such as, for example, integrated circuit bonding pads, solder bumps, wire conductors, etc.

Refer now to the drawings wherein depicted elements are not necessarily shown to scale and wherein like or similar elements are designated by the same reference numeral through the several views.

Input/output control modules (see IOCMs 25–29 in FIG. 1) provide both flexibility and increased I/O capability to data processing systems. In one embodiment of the present invention, one or more IOCMs 25–29 are located on a separate integrated circuit from a central processing unit (CPU) 13, but the one or more IOCMs 25–29 communicate with the CPU 13 by way of a bus 30. In alternate embodiments of the present invention, one or more IOCMs may be located on the same integrated circuit as a CPU. For example, referring to FIG. 1, other circuitry 15 may be implemented as an input/output control module (IOCM) which communicates with CPU 13 by way of bus 17.

Each IOCM 25–29 is designed using a very modular architecture. At the highest level, each one of IOCMs 25–29 is a module which can communicate with other modules by way of an inter-module bus 24. For example, in one embodiment, each of IOCMs 25–29 may be a module which is capable of being used with the MC68HC300 family of microcomputers, available from Motorola, Inc. of Austin, Tex.

In addition to being a module itself, each one of IOCMs 25–29 is also made up of sub-modules, or modular I/O channels. Different IOCM versions can be easily created by combining modular channels from a "silicon library of channels" in any combination. Channels may have different hardware, including digital or analog I/O capability, to accomplish specific operations. To allow a growth path for unanticipated I/O functions, new channels can be added to the library. Thus different arrangements of the modular channels can be combined in order to form different versions of IOCMs 25–29.

Another important feature of IOCMs 25–29 is that their architecture allows the user to partition tasks between software and hardware. The channels can be programmed to operate together, in hardware, to accomplish simple high frequency functions. Channels operating in concert essentially act as a pre-processor to accommodate high frequency I/O events. This is essential in providing finer control and faster system response by relieving the CPU of the software servicing of all I/O events, or requiring the CPU to only perform the software servicing of lower frequency I/O events.

The digital I/O section of each IOCM 25–29 is flexible in both the number and characteristics of I/O functions which it can perform. Each IOCM 25–29 achieves this flexibility because it is modular with respect to the number of pins, channels, and buses. That is, different IOCM versions can be easily created from a "silicon library of channels", and integrated circuit pins can also be added, independent of the number of channels. The architecture of IOCMs 25–29 also supports adding more buses for data and control when the number of channels is increased in various IOCM versions. New channels can also be designed and added to the library, to provide a growth path for future I/O functions.

A second important aspect of the architecture of IOCMs 25–29 is that channels can be programmed to operate together, in hardware, to accomplish simple high frequency functions. Allowing the user to partition tasks between software and hardware is important in maximizing system throughput by reducing the number of CPU interrupts in the system.

A significant amount of the I/O processing required by complex real-time control systems involves the same types of timer functions. Thus a relatively small library of channels can be combined in different ways to form a variety of IOCMs 25–29 which meet the requirements of most customers.

In one embodiment of the present invention, the library of channels includes several different categories or types of channels, namely "work channels", "timebase channels", and "other channels". This category name allows channels with similar functionality or structure to be grouped together. "Work channels" include channels which perform typical timer functions, such as capturing an input value when a time event occurs, providing a signal when a match event occurs, and counting. Work channels also include channels which form more complex combinations of basic timer functions. For example, a channel which performs both matching and counter functions may count the number of match events and only provide a signal after a predetermined number of match events have occurred.

In one embodiment of the present invention, work channels include: (1) a capture channel (CC); (2) a match channel (MC); (3) a counter channel (CMTC); (4) a spark integrated channel (SIC) for performing a combination of timer functions to provide spark timing for an engine; (5) a fuel integrated channel (FIC) for performing a combination of timer functions to provide fuel injection timing for an engine; and (6) a dual FIFO channel (DFC) for providing a 2-deep FIFO for the storage of data values. Note that the dual FIFO channel (DFC) does not perform a timer function, but instead provides a data storage function.

In one embodiment of the present invention, timebase channels include: (1) a timer bus control channel (TBCC) for providing either master or slave control of a timer bus; (2) a degree clock channel (DC) for providing up to four timebases; and (3) a timer channel (TC) for providing a timebase which can be generated either internally or externally. Note that in one embodiment of the present invention, the timer channel can be controlled (e.g. clocked, have a modulus value loaded, or have directionality of count determined) by one or more work channels or by one or more external signals.

In one embodiment of the present invention, the other channels include: (1) a synchronous serial channel for performing serial transfers; (2) an asynchronous serial channel for performing serial transfers; (3) a pin control channel (PCC) for interfacing work channels and integrated circuit pins; (4) a slave external bus interface channel (SEBI) for interfacing the internal inter-module bus to a bus external to the integrated circuit; (5) a global resource channel (GRC) which includes customized or specialized circuitry that may change between versions (e.g. certain clocks and some system protection features); (6) a slave bus interface channel (SBIU) for interfacing to the internal inter-module bus; (7) a master bus interface channel (MBIU) for interfacing the internal inter-module bus (IMB) to the degree clock (in case of CPU failure, all CPU writes are prevented except to one predetermined register, the MBIU allows the degree clock to take over the IMB, and the MBIU reconfigures certain channels so as to run the system, such as an automobile engine, without the CPU); and (8) a test channel which includes circuitry that is used for testing purposes.

Note that in one embodiment of the present invention, the serial channels may have direct control over one or more corresponding integrated circuit pins, or may alternately make used of the corresponding integrated circuit pins by way of a pin control channel.

In one embodiment of the present invention, there may be additional circuitry which is not strictly part of the library of channels, but which is designed in a modular fashion and may be used to coupled one or more channels. For example, pin control share logic may be coupled between two adjacent pin control channels (PCCs) in order to allow the two adjacent PCCs to share bus information. Alternate embodiments of the present invention may include all such connectivity circuitry as part of the library of channels.

Each work channel provides many programmable features which includes input and output events. The source of input events can be integrated circuit pins or other work channels, whereas an output event can affect integrated circuit pins or other work channels. Channel operations, such as input capture and data transfers between adjacent work channels, can be controlled by input events. Conversely, a work channel's output event, or an integrated circuit pin, can affect operation of work channels and data transfer between work channels. Another feature of each work channel is a selectable configuration mode which defines the work channel operation to be performed for input events or operation which results in output events. These and other features enable the work channels to be programmed to operate together to accomplish a wide range of I/O functions.

The channels included in the library of channels can be added in various combinations to create different versions of IOCMs 25–29. Alternate embodiments of the present invention may have more, fewer, or different channels in the library of channels which is used to form IOCMs 25–29. By using a modular architecture and a flexible library of modular channels, the I/O requirements of a wide variety of customers can be met in a fast and efficient manner.

FIG. 1 illustrates a data processing system 10. Data processing system 10 has a CPU integrated circuit 12 and an input/output (I/O) integrated circuit 22. CPU integrated circuit 12 includes a central processing unit (CPU) 13, system integration module 14, and other circuitry 15, which are all bi-directionally coupled by way of bus 17. System integration module 14 includes external bus interface circuitry 16 which is bi-directionally coupled to bus 30. Other circuitry 15 includes bus interface circuitry 18. Other circuitry 15 is optionally coupled external to CPU integrated circuit 12 by way of integrated circuit pins 19.

I/O integrated circuit 22 includes circuits 25–29 and external bus interface circuitry 23, which are all bi-directionally coupled by way of bus 24. External bus interface circuitry 23 is bi-directionally coupled to bus 30 for transferring and receiving information from CPU integrated circuit 12. I/O control module circuits 25–29 are coupled external to I/O integrated circuit 22 by way of integrated circuit pins 31–35. In alternate embodiments of the present invention, blocks 31–35 in FIG. 1 represent integrated circuit bonding pads rather than integrated circuit pins. Each of modules 25–29 includes one or more channels from the library of channels (see FIG. 2 for an example). Each of modules 25–29 also includes a slave bus interface channel (SBIU) 36–40 for interfacing the one or more channels to the internal inter-module bus 24.

Alternate embodiments of the present invention may have one or more modules 25–29. The partitioning of the channels into one or more modules 25–29, each having its own bus interface 36–40 is due to the constraints of loading on buses internal to modules 25–29. The number of channels included in each of modules 25–29 is determined by the resultant loading on the internal buses within each module 25–29. The modularity of the architecture allows each of modules 25–29 to be formed using different channels from the library of channels. Thus each of modules 25–29 may be customized to the requirements of individual customers.

Features of a Modular Channel Architecture

In addition to using a library of modular channels, the present invention also uses a modular approach to the channel buses which are used to transfer information between the various channels. Since the arrangement of channels varies between IOCM versions, the channel bus structure must be flexible.

Figure 2:
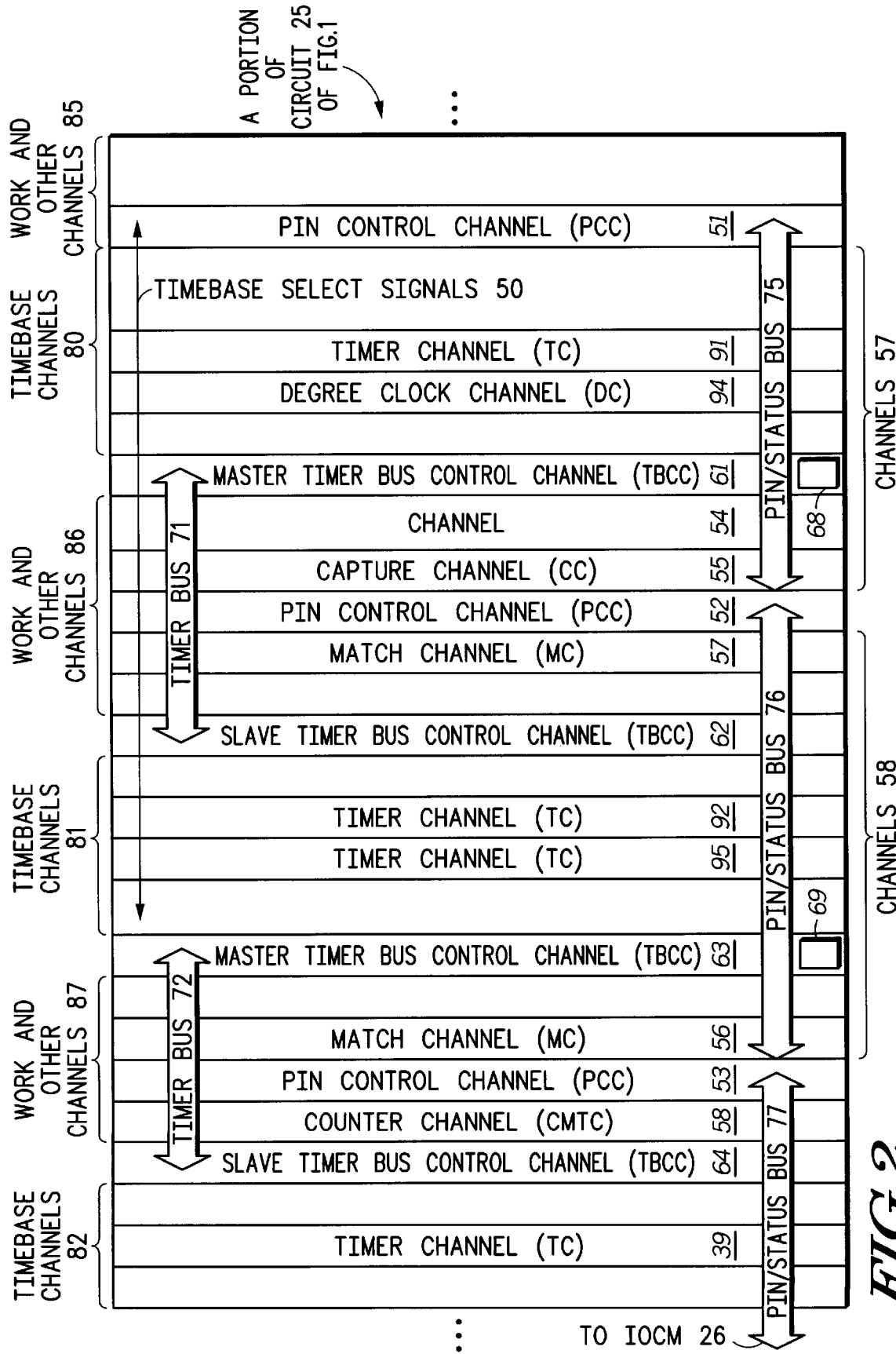
FIG. 2 illustrates, in block diagram form, a portion of circuit 25 of FIG. 1 in accordance with one embodiment of the present invention.

Referring to FIGS. 1 and 2, in one embodiment of the present invention, the channels within an IOCM (e.g. IOCM 25) communicate by way of channel buses. The following channel buses may transverse the channels within an IOCM: (1) the address and data conductors of the inter-module bus (IMB) 24; (2) one or more timer buses; and (3) one or more pin/status buses. The channels may also have an interconnection path between one another to allow for data flow between adjacent channels. The address and data conductors of inter-module bus 24 provide access to channel registers, control registers, and status registers. In one embodiment of the present invention, the bus interface circuits 36–40 (see FIG. 1) perform the global address decode to determine if that particular IOCM 25–29 is being addressed; however, all local address decode is done within each channel.

Timer Bus Structure

Referring to FIG. 2, the present invention uses one or more timer buses 71–72 which can be easily partitioned into segments through the use of master and slave timer bus control channels (TBCCs) 61–64 in order to increase the number of timebases which can be broadcast to other channels.

The architecture and bus structure of IOCMs 25–29 provide a way to easily segment the timer bus anywhere along its length. As a result, the channels are partitioned by each timer bus into separate blocks of channels which are provided with access to different timebases by their respective timer bus. The channels within one timer bus block can be used to perform different function(s) with the potential for no loss of resolution because each channel in a timer bus block can receive the same timebase value from the timer bus.

As an example, referring to FIG. 2, note that timer bus 71 corresponds to the block of channels labeled work & other channels 86, and timer bus 72 corresponds to the block of channels labeled work & other channels 87. Timer bus 71 is used to transfer timebase values to work & other channels 86, and likewise timer bus 72 is used to transfer timebase values to work & other channels 87.

Note that one end of each timer bus 71–72 is delineated by a master timer bus control channel (TBCC), and the other end of the timer bus is delineated by a slave timer bus control channel (TBCC). For example, one end of timer bus 71 is delineated by a master timer bus control channel (TBCC) 61, and the other end of timer bus 71 is delineated by a slave timer bus control channel (TBCC). Likewise, one end of timer bus 72 is delineated by a master timer bus control channel (TBCC) 63, and the other end of timer bus 72 is delineated by a slave timer bus control channel (TBCC) 64. The master and slave timer bus control channels are used to delineate each portion or segment of the timer bus.

Referring to FIG. 2, it is important to realize that timer bus 71 and timer bus 72 must use different conductors because they must be able to simultaneously transfer different sets of timebase values. However, timer bus 71 and timer bus 72 may conceptually be considered as separate buses; or alternately, they may conceptually be considered as different portions or segments of the same global timer bus. In this context, the global timer bus is considered as the bus for transferring all required timebase values to all necessary work and other channels on integrated circuit 22. The key point is that for each set of timebase values that must be transferred simultaneously, a different set of timer bus conductors must be used. These separate sets of conductors can either be considered as separate buses, or can be considered as separate portions or segments of one global bus.

In some embodiments of the present invention, a master timer bus control channel (TBCC) alone can be used to control a timer bus. A slave timer bus control channel (TBCC) is only required if the timebase values provided by a block of timebase channels are to be shared between two timer buses. Alternately, a master TBCC may be used instead of a slave TBCC to allow the sharing of timebase values between two timer buses. For example, referring to FIG. 2, if timer bus 72 only required timebase values from timebase channels 81, then slave TBCC 64 would not be required. Slave TBCC 64 is used to provide the timebase values from timebase channels 82 to timer bus 72. Slave TBCC 64 is controlled by master TBCC 63.

Note that alternate embodiments of the present invention may include fewer, more, or different channels within each block of channels coupled to a timer bus. For example, work and other channels 86 and 87 may include more, fewer, or different work channels or other channels from the library of available channels.

In a timer system consisting of building blocks of modular channels, the segmented timer bus structure provides a way to easily provide multiple and different timebases anywhere along the length of the timer bus, to different portions of the timer system, with the potential to not sacrifice resolution.

For example, in a typical timer system, work and other channels 86 may need access to certain timebases with a first predetermined resolution, while work and other channels 87 may need access to some of the same timebases associated with channels 86, plus additional timebases with a second predetermined resolution. The present invention segments the global timer bus where needed throughout each IOCM 25–29. As a result, the channels corresponding to each individual timer bus (e.g. 71 and 72) receive the timebases they need to perform their required functions with the potential to not sacrifice resolution.

Also in a timer system in which the timer bus is potentially very long, due to the large number of functions that must be supported, the present invention provides a way to segment the timer bus in order to ensure sufficient drive capability for each portion of the timer bus.

In the present invention, a timer bus receives a timebase value from a timebase channel (e.g. one of timebase channels 80 in FIG. 2) and provides this timebase value to one or more work and other channels (e.g. work and other channels 86 in FIG. 2). By providing the timebase value to a plurality of work and other channels at the same time, coherency is maintained between the work and other channels.

In one embodiment of the present invention, the timer bus is a time-multiplexed bus which allows up to eight timebase channels to provide up to eight different timebase values which are time-multiplexed on the same timer bus. In alternate embodiments of the present invention, the timer bus may not be time-multiplexed, or may be time-multiplexed into a different number of time segments.

Referring to FIG. 2, in one embodiment of the present invention, the master timer bus control channel (TBCC) 61 selects which one or more of timebase channels 80 and which one or more of timebase channels 81 can provide timebase values that will be driven on timer bus 71. If master TBCC 61 selects one of timebase channels 80, e.g. timer channel 91, then master TBCC 61 drives timer bus 71 with the timebase value provided by timer channel 91. But if master TBCC 61 selects one of timebase channels 81, e.g. timer channel 92, then slave TBCC 62 drives timer bus 71 with the timebase value provided by timer channel 92. Thus, only master TBCCs select which timebase channels provide timebase values; but, both master and slave TBCCs may receive a timebase value from a timebase channel and may drive the timer bus with that timebase value.

In one embodiment of the present invention, each master TBCC provides all control to the corresponding slave TBCC. Control register storage bits in each master TBCC are used to control which timebase select signal is active during each one of eight time division multiplexed windows of the timer bus (e.g. control register storage bits 68 in TBCC 61 and control register storage bits 69 in TBCC 63). The timebase select signals from the master TBCC are used to select the active timebase to be gated through either the master TBCC (from timebase channels 80) or the slave TBCC (from timebase channels 81) onto the corresponding time division multiplexed timer bus 71.

Referring to FIG. 2, the timebase select signals 50 must therefore span from the master TBCC 61 to the timebase channels 80 associated with the master TBCC 61, and from the master TBCC 61 across the work and other channels 86 to the slave TBCC 62 and its associated timebase channels 81. In addition the timebase select signals 50 are used by the work and other channels 86 to determine which timebase is physically active on the timer bus 71, in order to know when to perform certain operations such as match or capture. Thus, the timebase select signals 50 effectively transfer a tag value from master TBCC 61 to work and other channels 86, to timebase channels 80, and to timebase channels 81. The tag value transferred by timebase select signals 50 indicates which timebase is presently available on timer bus 71.

Figure 13:
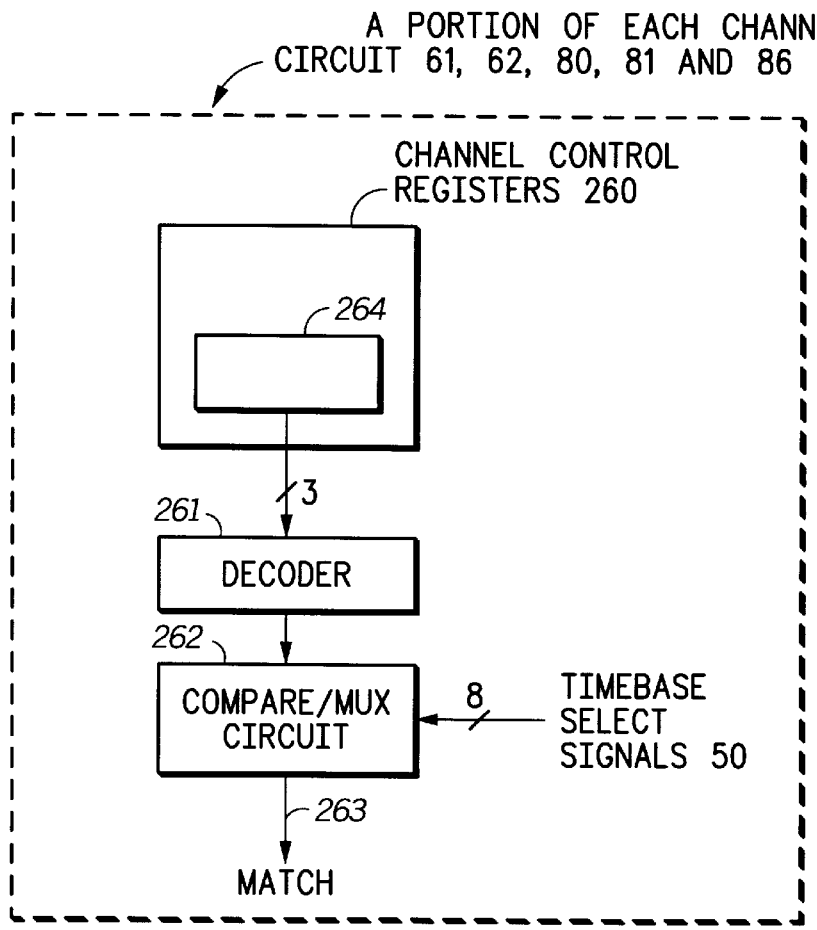
FIG. 13 illustrates, in block diagram form, a portion of each channel in circuit 61, 62, 80, 81, and 86 of FIG. 2 in accordance with one embodiment of the present invention.

Note that in one embodiment of the present invention, each channel illustrated in FIG. 2 has one or more user programmable channel control registers 260 (see FIG. 13). Different types of channels may have some of the same registers, and may have some different registers. Referring to FIG. 2 and FIG. 13, in one embodiment of the present invention, each one of the channels in 80, 81, and 86, along with each of channels 61 and 62, has one or more channel registers 260 which are coupled as illustrated in FIG. 13.

Referring to FIG. 13, a portion 264 of channel control registers 260 stores a user programmable tag value which may or may not be encoded. If the tag value is encoded, the encoded tag value is provided to a decoder circuit 261, which provides a decoded tag value at the output. The decoded tag value is then compared to the tag value provided by the timebase select signals 50. If the decoded tag value matches the tag value being driven on the timebase select signals 50, then the match signal 263 is asserted to indicate to the channel that the channel is either to provide a timebase value to the timer bus (for timebase channels) or to receive the timebase value from the timer bus (for work and other channels).

In an alternate embodiment of the present invention, the tag value stored in portion 264 of channel control registers 260 is not encoded. As a result, decoder 261 is not required. Instead, portion 264 is provided directly to an input of multiplexer (MUX) circuit 262. Portion 264 is used as the control input to MUX circuit 262 to select one of the timebase select signals 50 to provide at the output as match signal 263.

The timer bus structure of the present invention supports the following capabilities. First, the timer bus structure allows segmentation anywhere along its length. Second, it allows a pair of timer bus control channels (TBCCs), namely a master TBCC and a slave TBCC, to control segmentation of the timer bus. Third, it allows the same timebase channels (e.g. timebase channels 81 in FIG. 2) to provide the same timebase channels to two different timer bus segments (e.g. timer bus 71 and 72) simultaneously.

Fourth, the timer bus structure of the present invention allows each timer bus segment to be divided into N time division multiplexed timing windows. Fifth, the timer bus structure supports user programmability to select any one of M timebase values to be driven during each of N timing windows of each timer bus segment. For example, timebase channels 81 in FIG. 2 may include various numbers of timebase channels (e.g. timer channel 92 and timer channel 95). Each timebase channel may provide one or more timebase values to timer bus 71, to timer bus 72, or to both timer bus 71 and 72 simultaneously. The numbers N and M are positive integers.

As an example, referring to FIG. 2, in one embodiment of the present invention, timebase channels 81 may provide five timebase values (i.e. M=5), where timer channel 92 provides two timebase values "A" and "B", and timer channel 95 provides three timebase values "C", "D", and "E"; and, timer bus 71 and timer bus 72 may each be time multiplexed into eight timing windows (i.e. N=8). The eight timing windows of timer bus 71 may drive the following timebase values: A,D,A,B,A,D,A,C, which of course repeat for the next eight timing windows of timer bus 71. On the other hand, the eight timing windows of timer bus 72 may drive the following timebase values: B,D,B,D,B,D,B,D, which of course repeat for the next eight timing windows of timer bus 72. During the second and sixth timing windows, both timer bus 71 and timer bus 72 drive the same timebase value "D" provided by timer channel 95.

FIG. 15 illustrates eight examples of how a user may selectively provide one or more timebase values (namely TB1, TB2, TB3, TB4, TB5, TB6, TB7, and TB8) during the different time slots of a timer bus (e.g. timer bus 71 in FIG. 2). Each one of timebase channels 80 provides one of the timebase values TB1–TB8. Each one of timebase channels 80 has user programmable register storage bits 264 (see FIG. 13) which store a tag value. For each time slot in which the timebase select signals 50 drive a tag value that matches the programmed tag value in a timebase channel, that timebase channel will drive the timebase source bus 271 (see FIG. 14), and thus drive the timer bus 71, with its timebase value (namely one of timebase values TB1–TB8).

Note that in an alternate embodiment of the present invention, a timebase channel may have one set of programmable register storage bits 264 for each separate timebase value (TB1–TB8) which the channel is capable of providing to timer bus 71. Each set of programmable register storage bits 264 can be programmed by performing a write access to storage bits 264 (e.g. from CPU 13 in FIG. 1). In alternate embodiments of the present invention, the tag storage bits 264 may instead be mask programmable so that they are programmed to a fixed predetermined value once during the manufacture of I/O integrated circuit 22.

Note that in addition to timebase channels 81, timebase channels 80 may also be programmed by the user to provide one or more of the timebase values for timer bus 71. Likewise, in addition to timebase channels 81, timebase channels 82 may also be programmed by the user to provide one or more of the timebase values for timer bus 72. Thus the total number of timebase values available to be selected and driven on timer bus 71 is the sum of the timebase values provided by both timebase channels 80 and timebase channels 81. Likewise, the total number of timebase values available to be selected and driven on timer bus 72 is the sum of the timebase values provided by both timebase channels 81 and timebase channels 82.

There are still more capabilities of the timer bus structure of the present invention. Sixth, the timer bus structure of the present invention uses master and slave timer bus control channels (e.g. TBCCs 61 and 62 in FIG. 2) to control the gating of multiple timebase values onto a common timer bus segment (e.g. timer bus 71). Timebase select signals 50 include one select signal for each timebase channel in timebase channels 80 and 81. Master TBCC 61 selects a timebase channel to gate onto timer bus 71 by asserting one of the timebase select signals 50 during the appropriate timing window.

Seventh, the timer bus structure of the present invention allows the work and other channels 86 to monitor the timebase select signals 50 in order to determine which one of the timebase channels is currently providing the timebase value to timer bus 71. As a result, each one of the work and other channels 86 is able to determine when to perform their respective operation, such as the matching or capturing of the selected timebase value from timer bus 71. The work and other channels 86 read timer bus 71 at the proper time, as determined by the timebase select signals 50, and perform operations using the timebase value read from timer bus 71.

Timebase Channels and Timebase Synchronization

Referring to FIG. 2, the present invention uses one or more timebase channels (e.g. 81) to generate timebase values which are provided to work and other channels 86 and 87 by way of timer buses (e.g. 71, 72). The architecture and bus structure of IOCMs 25–29 (see FIG. 1) partition each IOCM into separate blocks of work and other channels (e.g. 85–87) which are provided with access to various timebase channels (e.g. 80–81). The work and other channels within a block can be used to perform different function(s) with the potential for no loss of resolution because each work and other channels in a block can receive the same timebase value from the timer bus.

In one embodiment of the present invention, timebase channels (e.g. 80, 81) may include one or more of the following: (1) a timer bus control channel (TBCC) for providing either master or slave control of a timer bus; (2) a degree clock channel (DC) for providing up to four timebases; and (3) a timer channel (TC) for providing a timebase which can be generated either internally or externally.

Figure 14:
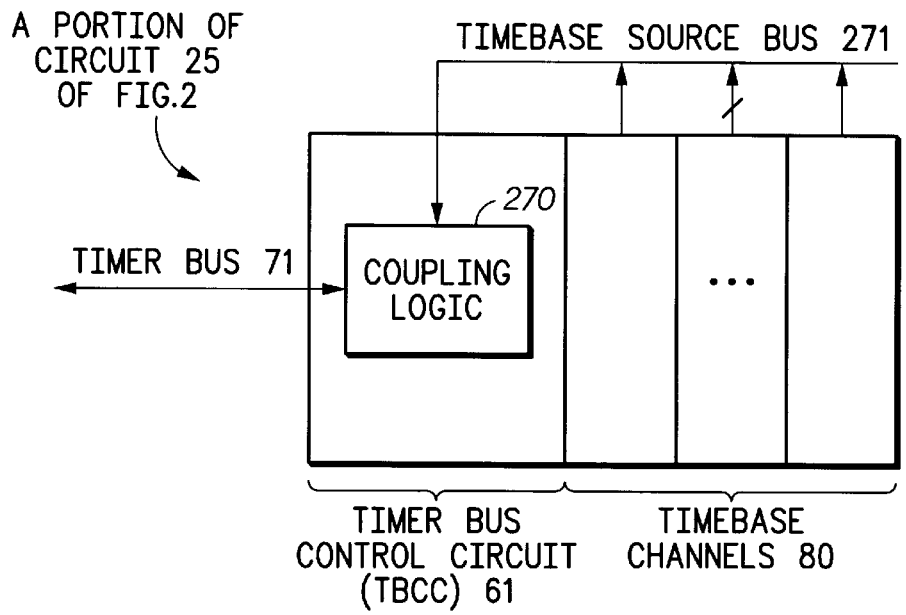
FIG. 14 illustrates, in block diagram form, a portion of circuit 25 of FIG. 2 in accordance with one embodiment of the present invention.

Referring to FIG. 2 and FIG. 14, in one embodiment of the present invention, each one of timebase channels 80 is coupled to timebase source bus 271. The timebase source bus 271 is time multiplexed in the same manner as timer bus 71. Each one of timebase channels 80 compares the tag value of the timebase select signals 50 with a user programmed tag value stored in a register portion 264 (see FIG. 13). If a match is found, the channel with the match drives the timebase source bus 271 with that channel's timebase. The channels which did not find a match do not drive the timebase source bus 271 during this particular time interval. Coupling logic 270 (see FIG. 14) is used to provide the next timebase value from the timebase source bus 271 to the timer bus 71 at the appropriate times.

A complex data processing system (e.g. data processing system 315 in FIG. 17) may be too large to function with a single timebase due to timer bus drive capabilities, frequency of data change on the timer bus, the physical placement of various timer systems, or routing concerns. In some data processing systems, it may be necessary to partition a timer system between several modules (see FIG. 16) or even between several integrated circuits (see FIG. 17). Partitioning between several integrated circuits may be required due to the size of the total system, or due to the requirements of different technologies such as power output drivers, analog input conditioning, and complex digital circuits. Referring to FIG. 17, distributing a 16-bit or 32-bit timebase value to an interface integrated circuit 301 or to a power integrated circuit 302 is not feasible with currently available packaging technologies for these types of integrated circuits.

Figure 16:
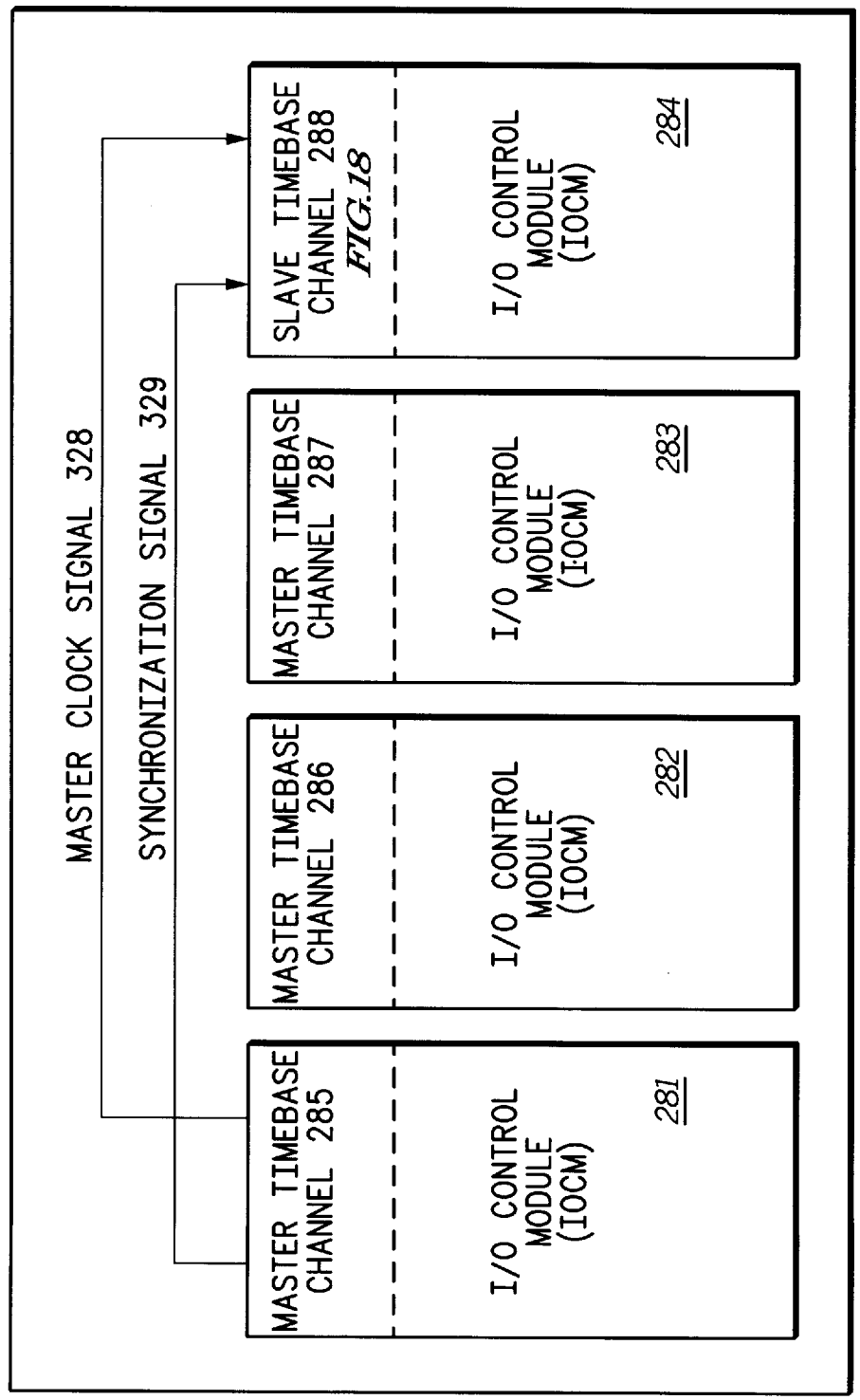
FIG. 16 illustrates, in block diagram form, a timer system integrated circuit 280 in accordance with one embodiment of the present invention.
Figure 17:
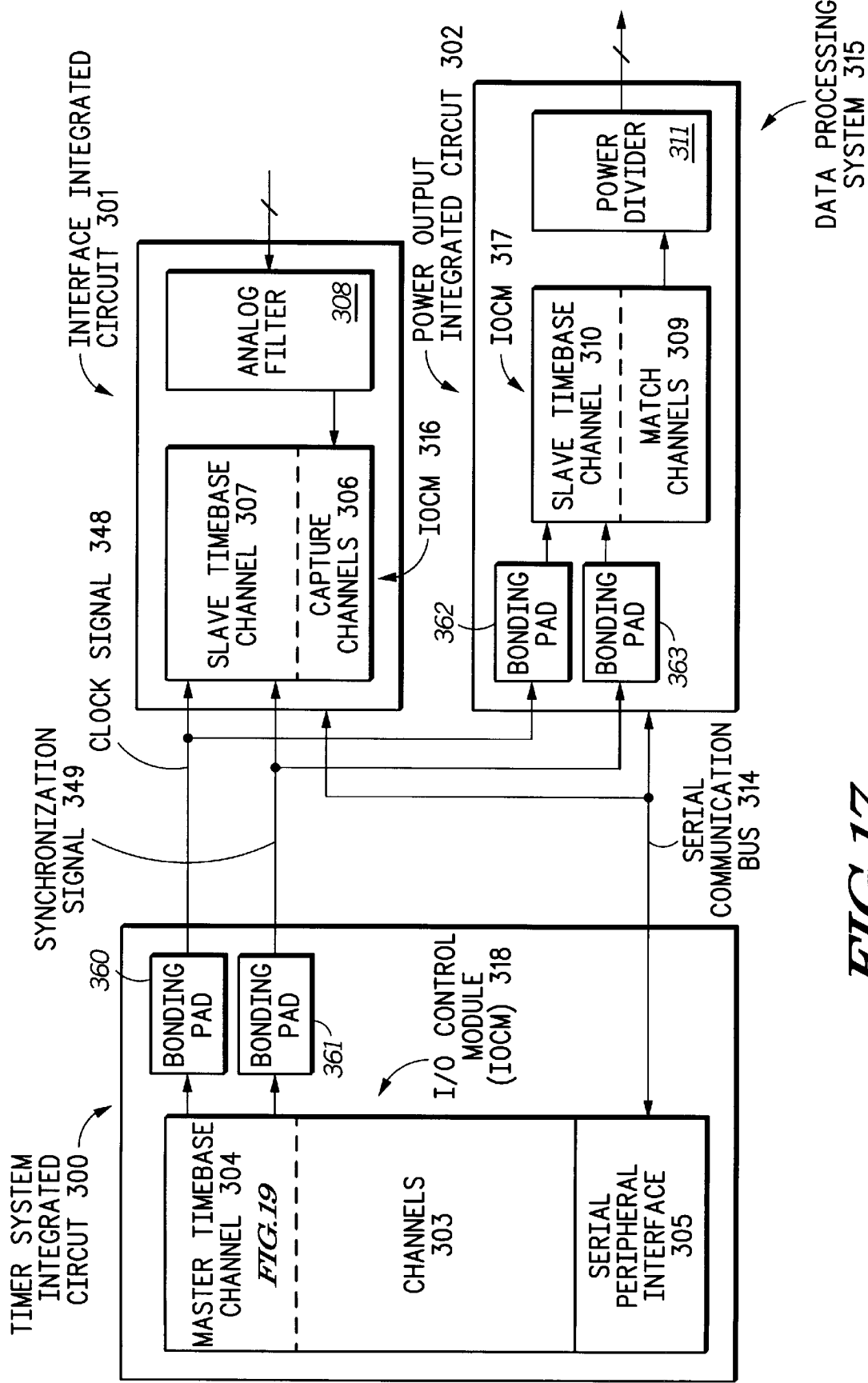
FIG. 17 illustrates, in block diagram form, a data processing system 315 in accordance with one embodiment of the present invention.
Figure 18:
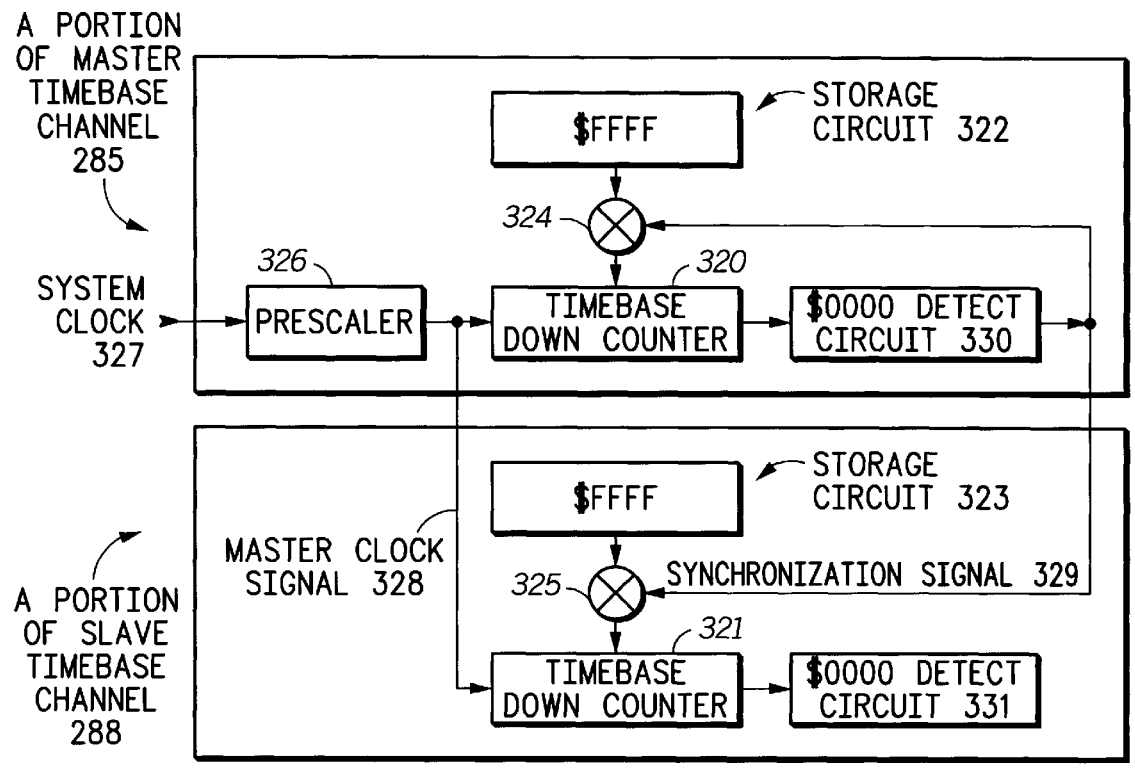
FIG. 18 illustrates, in block diagram form, a portion of master timebase channel 285 and a portion of slave timebase channels 288 of FIG. 16 in accordance with one embodiment of the present invention.
Figure 19:
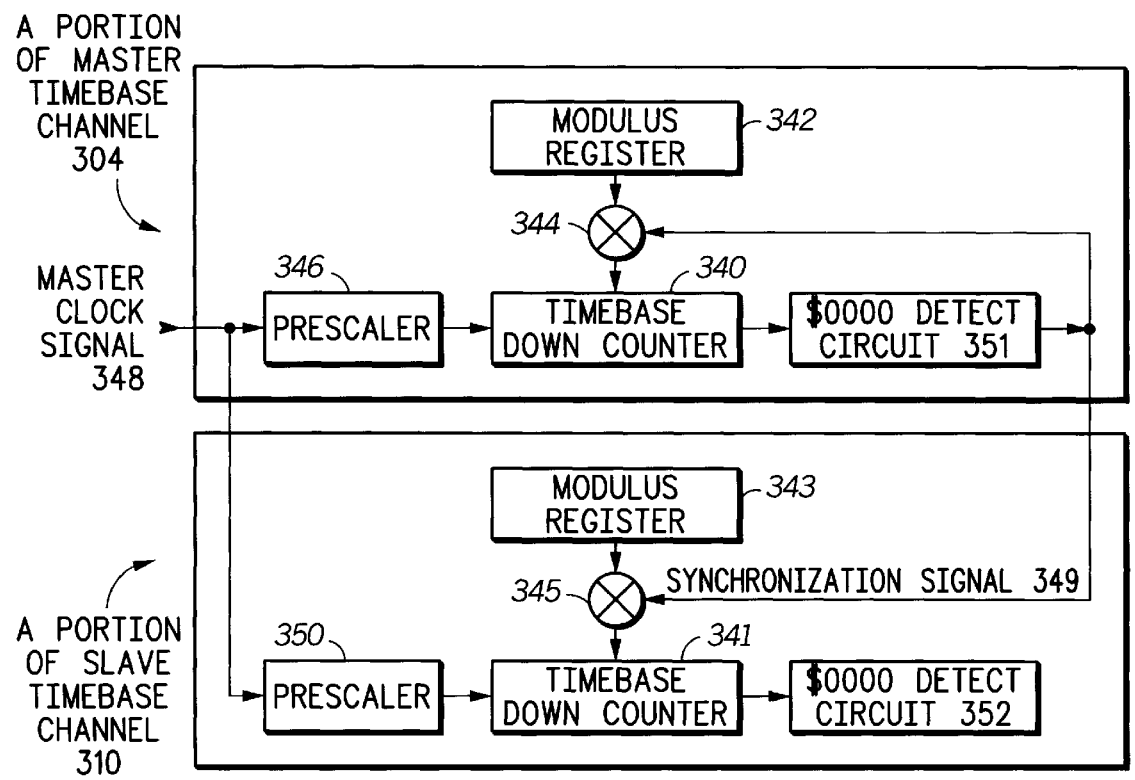
FIG. 19 illustrates, in block diagram form, a portion of master timebase channel 304 and a portion of slave timebase channels 310 of FIG. 17 in accordance with one embodiment of the present invention.

Referring to FIGS. 16–19, the present invention allows two or more timebase channels (e.g. master timebase channel 285 and slave timebase channel 288 in FIG. 16 and FIG. 18) to be synchronized and kept in synchronization using just two signals, a clock signal 328 and a synchronization signal 329. The clock signal 328 and synchronization signal 329 may be broadcast between timer systems on separate integrated circuits (see FIG. 17), or in different modules of an integrated circuit (see FIG. 16). The master timebase channel generates or receives a master clock signal which is connected to one or more slave timebase channels to ensure that the master and slave timebase channels increment or decrement at the same time and rate.

For example, in FIG. 18, master timebase channel 285 generates a master clock signal 328 by scaling the system clock signal 327. Master timebase channel 285 then provides the master clock signal 328 to one or more slave timebase channels (e.g. 288) to ensure that master timebase channel 285 and slave timebase channel 288 increment or decrement at the same time and rate. In an alternate embodiment illustrated in FIG. 19, master timebase channel 304 and slave timebase channel 310 both receive the same master clock signal 348, which in some embodiments of the present invention is the same signal as system clock 327 (see FIG. 18). However, both master timebase channel 304 and slave timebase channel 310 scale the master clock signal 348 by the same amount. Thus timebase down counter 340 and timebase down counter 341 are decremented at the same time and rate.

If a data processing system (e.g. 315 in FIG. 17) uses a fixed frequency system clock, and if that system clock is available as an input to the master timebase channel and as an input to the one or more slave timebase channels, then that system clock may be used as the master clock signal, providing that the same prescale divide values can be selected in the prescale circuits 326, 346, and 350 (see FIG. 18 and 19) of the master and slave timebase channels. This potentially saves having to add a new interconnect conductor for the master clock signal. In data processing systems using a system clock signal that is not in the time domain, or is of irregular frequency, it is necessary for the master timebase channel to generate the master clock signal. The key is that all timebase channels to be synchronized (e.g. 285 and 288 in FIG. 18, and 304 and 310 in FIG. 19) must be clocked with a master clock signal (e.g. 328 in FIG. 18, and 348 in FIG. 19) having the same frequency and phase.

A synchronization signal (e.g. 327 in FIG. 18, and 349 in FIG. 19) is then needed to set all timebase channels (e.g. 285 and 288 in FIG. 18, and 304 and 310 in FIG. 19) to the same initial value, from which they can be incremented/ decremented by the master clock signal described above. For a timebase channel using a free running counter, the most convenient synchronization point is the roll-over point to $0000 or $FFFF depending on whether it is a down counter or an up counter (see FIG. 18). For modulus timebases the point where the modulus value is loaded into the counter is the most convenient synchronization point (see FIG. 19).

These synchronization points have been selected because the master timebase channels (e.g. 285 in FIG. 18, and 304 in FIG. 19) already have the required detection circuitry (e.g. 330 in FIG. 18, and 351 in FIG. 19) which was required for other purposes. In addition, the timebase values at these selected synchronization points are available or easily generated by all slave timebase channels (e.g. $0000 for down counters, $FFFF for up counters, and the modulus value for a modulus counter). The master timebase channel is used to detect the occurrence of the synchronization point, and to generate the synchronization signal. The synchronization signal is then provided to one or more slave timebase channels, where the synchronization signal is used to reset all timebase values to the same value at the same time.

Once the counters (320 and 321 in FIG. 18, and 340 and 341 in FIG. 19) in each timebase channel have been reset to the same value, and are clocked by the same frequency and phase master clock signal, the counters should remain fully synchronized for all count values. Should one of the timebases be knocked out of synchronization by noise or other interference, it will be resynchronized by the synchronization signal at the next synchronization point.

The present invention thus allows timebase channels in different I/O control modules (IOCMs) 281–284 (see FIG. 16) or on different integrated circuits 300–302 (see FIG. 17) to generate and use a synchronized, coherent timebase value. Due to circuit loading constraints, there is an upper limit as to the number of work and other channels (e.g. 86 in FIG. 2) which can be coupled to the same timer bus 71 in order to receive timebase values from timebase channels 80 and 81). The present invention thus allows timebase channels in different IOCMs and on different integrated circuits to provide synchronized, coherent timebase values to different blocks of work and other channels that are coupled to different timer buses. The ability to add timer channels to peripheral integrated circuits (e.g. 301 and 302 in FIG. 17), while using a minimal number of integrated circuit pins, is significant.

Referring to FIG. 16, note that in one embodiment of the present invention, IOCM 281 in timer system integrated circuit 280 may include all of the circuitry illustrated in FIG. 2. Likewise, IOCM 284 in timer system integrated circuit 280 may include a duplicate of all of the circuitry illustrated in FIG. 2. Other than an inter-module bus 24 (see FIG. 1), possibly a global channel communication bus 200 (see FIG. 10), the master clock signal 328, and the synchronization signal 329, IOCM 281 and IOCM 288 do not need any other conductors coupled between them for transferring information.

Note that in the context of synchronizing timebase channels, the term "master" and "slave" are being used to denote which timebase channel provides the synchronization signal (the master) and which timebase channel receives the synchronization signal (the slave). The terms "master" and "slave" have a different meaning in the context of master and slave timer bus control channels, and a different meaning in the context of master and slave pin control channels. However, in general, the term "master" indicates the circuitry which provides more control signals, and the term "slave" indicates the circuitry which provides less control signals or which receives more of its control signals from the master.

Pin/Status Bus Structure

Referring to FIGS. 1 and 2, pin/status buses 75–77, like timer buses 71 and 72, are modular in that they can be extended, or alternately segmented to create separate buses carrying different signals. The present invention uses one or more pin/status buses 75–77 which can be easily partitioned into separate buses or segments through the use of pin control channels (PCCs) 51–53.

Pin/status buses 75–77 are used to transfer information between channels within IOCM 25. In some embodiments of the present invention, one or more pin/status buses (e.g. 77) may also be used to transfer information from one IOCM (e.g. 25) to a different IOCM (e.g. 26). In addition, pin/status buses 75–77 are used to transfer information between integrated circuit pins 33 and one or more channels in IOCM 25. The integrated circuit pins 31–35 are used to receive and provide information external to I/O integrated circuit 22. Each IOCM 25–29 has one or more pin/status buses to transfer information among the IOCM's channels, and between the IOCM's channels and one or more integrated circuit pins 31–35.

In some embodiments of the present invention, the pin/status buses 75–77 serve as a way for channels to affect and control other channels which are coupled to the same pin/status bus. The pin/status buses 75–77 also serve as a way for channels to affect and control the logic levels of output integrated circuit pins, and for channels to be affected by or controlled by the logic levels of input integrated circuit pins.

In one embodiment of the present invention, each one of the pin/status buses (e.g. 75–77 in FIG. 2) is capable of serving four main purposes: (1) to indicate the logic level of one or more integrated circuit pins which are programmed as inputs; (2) to determine the logic level of one or more integrated circuit pins which are programmed as outputs; (3) to function as a source of an input event to one or more channels; and (4) to function as a destination of an output event from one or more channels.

Coherency of data written to the channels by the CPU 13 (see FIG. 1) is an essential requirement. Coherency is ensured with the use of the pin/status buses. Simultaneity of control among the channels is provided with these buses, so the operation of channels can be synchronized with one another. Since the CPU 13 can also affect these buses by way of control registers in pin control channels, channel operation can be synchronized with CPU 13 operation. As a result, coherent access of channel data can be ensured with CPU 13 control of the pin/status buses.

The architecture and bus structure of IOCMs 25–29 provide a way to easily segment the pin/status bus anywhere along its length. As a result, the channels are partitioned into separate blocks of channels which are provided with access to different integrated circuit pins. Each channel within a block can provide or receive information from multiple, one, or no integrated circuit pins. Also, more than one channel within a block can provide information to or receive information from the same integrated circuit pin. Referring to FIG. 2, note that the partitioning of channels into separate blocks having access to different pin/status buses 75–77 is independent of the partitioning of channels into separate blocks having access to different timer buses 71–72.

As an example, referring to FIG. 2, note that pin/status bus 75 corresponds to the block of channels labeled 57, and pin/status bus 76 corresponds to the block of channels labeled 58. Pin/status bus 75 is used to transfer pin and/or status information between channels 57, and likewise pin/status bus 76 is used to transfer pin and/or status information between channels 58.

Unlike the timer bus control channels (e.g. 61–64 in FIG. 2), the pin control channels do not come in "master" and "slave" versions. Instead, each pin control channel is responsible for controlling its corresponding pin/status bus. For example, in FIG. 2, pin control channel 51 controls pin/status bus 75; pin control channel 52 controls pin/status bus 76; and pin control channel 53 controls pin/status bus 77.

Figure 3:
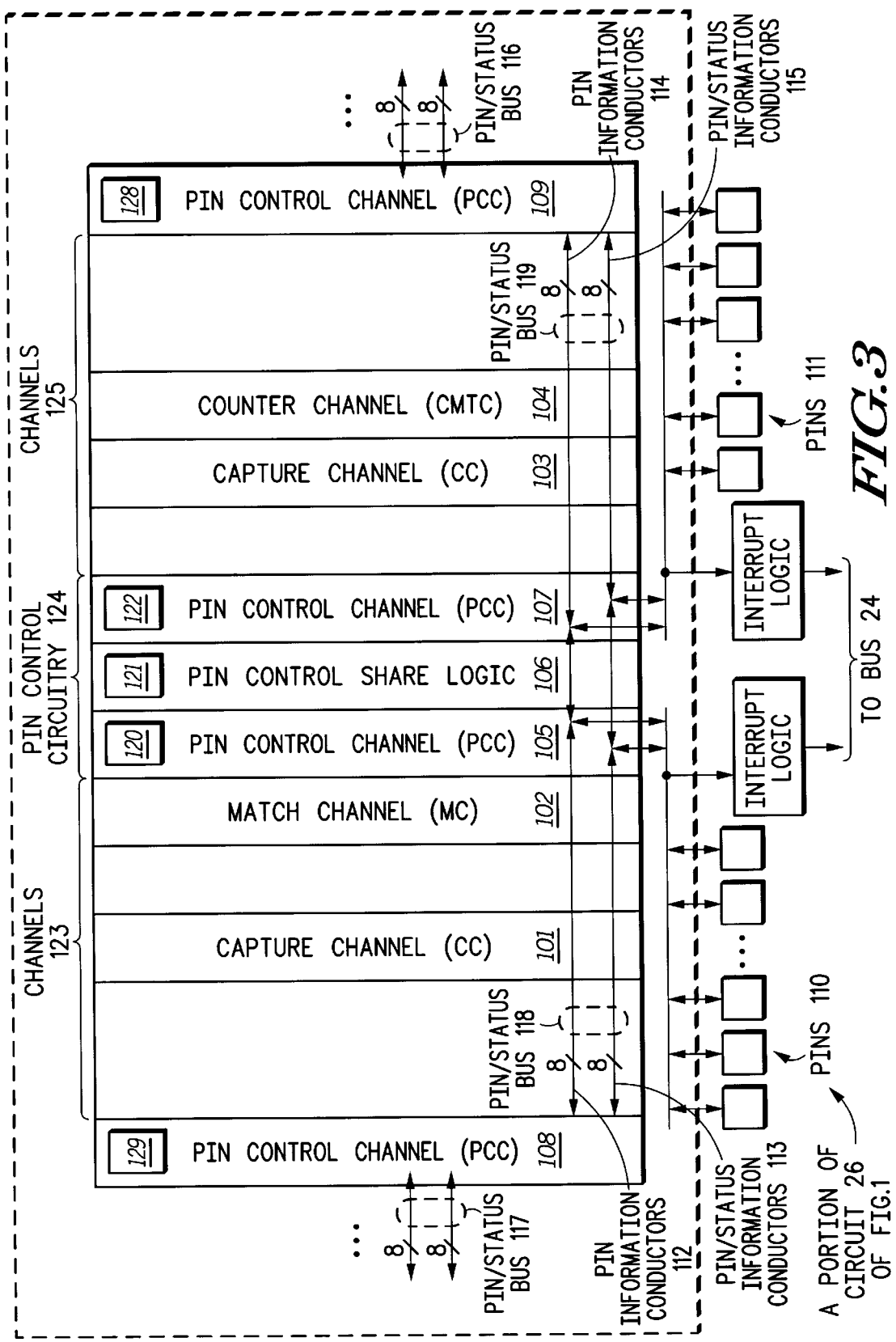
FIG. 3 illustrates, in block diagram form, a portion of circuit 26 of FIG. 1 in accordance with one embodiment of the present invention.

However, as illustrated in FIG. 3, pin control share logic 106 may be used to selectively couple one or more conductors of pin/status bus 118 to one or more conductors of pin/status bus 119, thus potentially forming one extended pin/status bus (118, 119). For example, pin control share logic 106 may be used to link pin/status bus 118 and pin/status bus 119 so that one or more of the conductors of buses 118 and 119 transfer the same value or signal. As a result, pin control share logic 106 allows part or all of pin/status buses 118 and 119 to be effectively joined or extended into one bus which carries the same signals and which transfers the same information between potentially twice as many channels and twice as many integrated circuit pins.

Referring to FIG. 3, the portion of IOCM 26 illustrated in FIG. 3 includes four pin/status buses 116–119. Pin/status bus 116 is controlled by pin control channel 109 and does not transfer any information to any other pin/status bus. Pin/status bus 117 is controlled by pin control channel 108 and does not transfer any information to any other pin/status bus. Pin/status bus 118 is controlled by pin control channel 105 and transfers information to and/or from pin/status bus 119 by way of pin control share logic 106. Pin/status bus 119 is controlled by pin control channel 107 and transfers information to and/or from pin/status bus 118 by way of pin control share logic 106.

In one embodiment of the present invention, each pin/status bus (e.g. 118) has eight conductors which are used to transfer pin information (e.g. 112), and eight conductors which can be individually programmed to transfer either pin information or status information (e.g. 113). Control register storage bits 120 in pin control channel 105 are used to selectively determine, for each pin/status information conductor 113, whether the conductor will transfer pin information between the channels 123 and one or more integrated circuit pins 110, or whether the conductor will transfer status information just between the channels 123. Likewise, control register storage bits 122 in pin control channel 107 are used to selectively determine, for each pin/status information conductor 115, whether the conductor will transfer pin information between the channels 125 and one or more integrated circuit pins 111, or whether the conductor will transfer status information just between the channels 125.

A portion of control register storage bits 121 in pin control share logic 106 are used to control the selective coupling of the conductors of pin/status bus 118 and pin/status bus 119. In an alternate embodiment of the present invention, a portion of the control register storage bits 121 for pin control share logic 106 may be duplicated and may be physically located as part of the circuitry of both pin control channel (PCC) 105 and 107. A mask option change may be required to activate that portion of the control register storage bits 121 in one of the two PCCs 105 and 107.

17

For example, a mask option change may be used to activate a portion of the control register storage bits 121 in PCC 105, while the duplicate portion of control register storage bits 121 in PCC 107 are left inactive. The activated portion of control register storage bits 121 in PCC 105 are thus coupled to pin control share logic 106 and are used to control pin control share logic 106, while the inactive duplicate portion of control register storage bits 121 in PCC 107 are not coupled to pin control share logic 106 and have no effect on pin control share logic 106. In one embodiment of the present invention, PCC 105, which has the activated portion of control register storage bits 121, is considered the "master" PCC, while PCC 107, which has the inactive portion of control register storage bits 121, is considered the "slave" PCC.

Referring to FIG. 2, it is important to realize that pin/status buses 75–77 must each use different conductors because they each must be able to simultaneously transfer a different set of pin/status values. However, pin/status buses 75–77 may conceptually be considered as separate buses; or alternately, they may conceptually be considered as different portions or segments of the same global pin/status bus. In this context, the global pin/status bus is considered as the bus for transferring all required pin/status values to all necessary channels and to all necessary pins on integrated circuit 22. The key point is that for each set of pin/status values that must be transferred simultaneously, a different set of pin/status bus conductors must be used. These separate sets of conductors can either be considered as separate buses, or can be considered as separate portions or segments of one global bus.

Note that alternate embodiments of the present invention may include fewer, more, or different channels within each block of channels coupled to a pin/status bus. For example, referring to FIG. 2, channels 57 and 58 may include more, fewer, or different channels from the library of available channels.

In a timer system consisting of building blocks of modular channels, the segmented pin/status bus structure provides a way to easily provide multiple and different sets of pin/status information anywhere along the length of the pin/status bus, to different portions of the timer system, with the potential to not sacrifice resolution.

For example, in a typical timer system (see FIG. 2), channels 58 may need to exchange information with each other and may need access to the integrated circuit pins (not shown) which are controlled by pin control channel 52, while channels 57 may need to exchange information with each other and may need access to the integrated circuit pins (not shown) which are controlled by pin control channel 51. Referring to FIG. 3, if one or more of channels 123 need to provide or receive information from one or more of channels 125, then pin control share logic 106 must be inserted between pin control channels 105 and 107 in order to allow pin/status bus 118 and pin/status bus 119 to share information and transfer the same sets of pin/status values simultaneously. The present invention segments the global pin/status bus where needed throughout each IOCM 25–29. As a result, the channels corresponding to each individual pin/status bus (e.g. 75, 76, and 77) receive and provide the pin/status information needed to perform the required channel functions.

Also in a timer system in which the pin/status bus is potentially very long, due to the large number of functions that must be supported, the present invention provides a way to segment the pin/status bus in order to ensure sufficient drive capability for each portion of the pin/status bus.

18

Flexible ANDing and ORing of Output Pins

Figure 4:
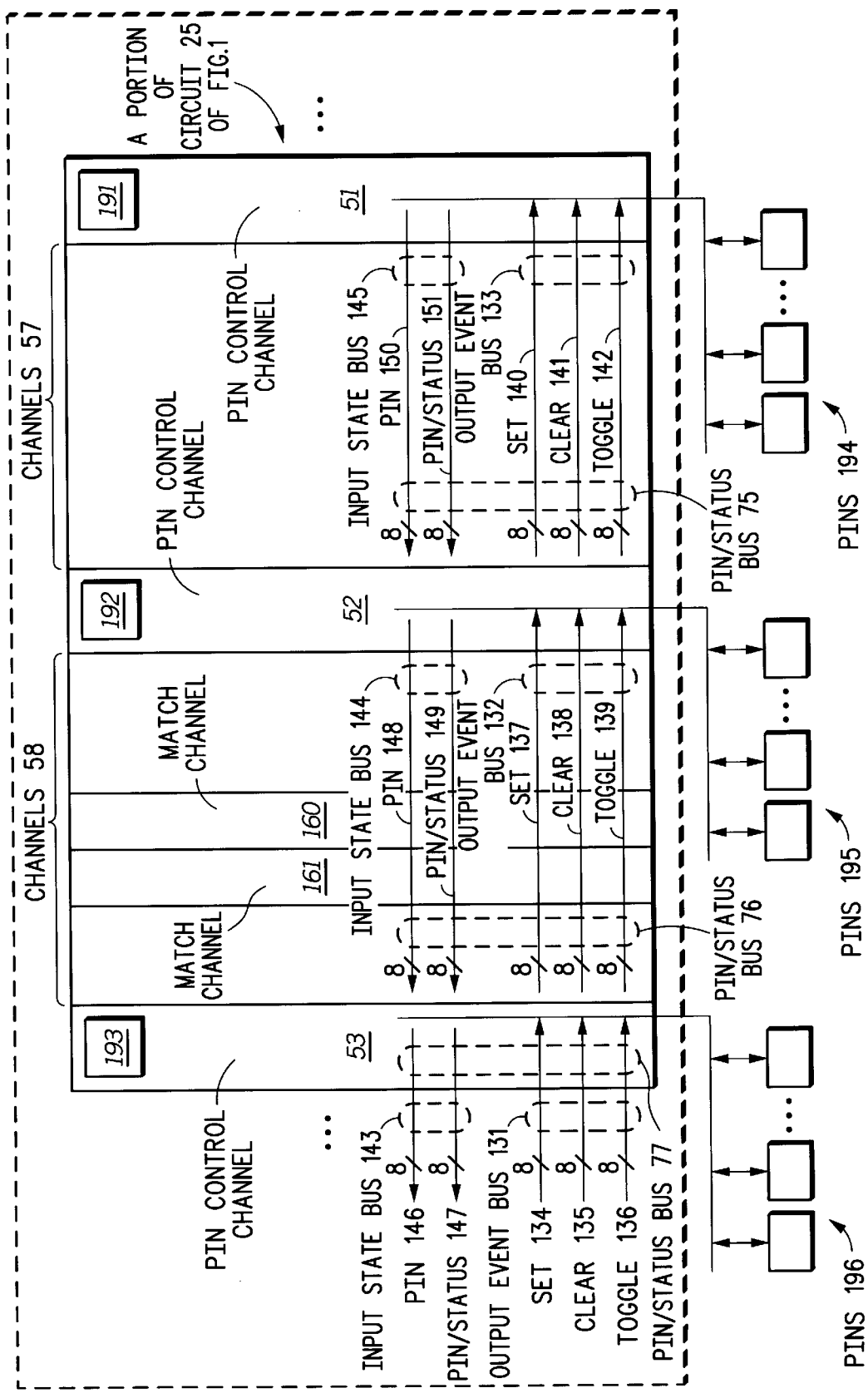
FIG. 4 illustrates, in block diagram form, a portion of circuit 25 of FIG. 1 in accordance with one embodiment of the present invention.

The particular embodiment of the pin/status buses illustrated in FIG. 3 is only one possible embodiment; there are many others. FIG. 4 illustrates an alternate embodiment of the pins/status buses which allows the user to logically combine the output of multiple channels to determine the logic state of an output pin.

In the embodiment illustrated in FIG. 4, each pin/status bus 75–77 of FIG. 1 is implemented using an input state bus 143–145, respectively, and an output event bus 131–133, respectively. Each input state bus 143–145 includes eight pin conductors 146, 148, and 150 respectively, as well as eight pin/status conductors 147, 149, and 151 respectively. Each output event bus 131–133 includes eight set conductors 134, 137, and 140 respectively, eight clear conductors 135, 138, and 141, respectively, and eight toggle conductors 136, 139, and 142 respectively.

The output event bus 132 is used to determine the output states of pins 195, which correspond to and are controlled by pin control channel 52. The various channels in channels 58 use the output event bus to affect the logic state of pins 195. Each one of pins 195 is coupled to one of the set conductors 137, one of the clear conductors 138, and one of the toggle conductors 139. Thus the logic state of a particular output pin 195 is determined by the logic states of the three conductors, namely set, clear, and toggle, which are coupled to that particular pin. Note, however, that the set, clear, and toggle conductors have no effect on the pins 195 which are configured as inputs by pin control channels 52. The set, clear, and toggle conductors associated with a pin are only used when that pin is configured as an output pin.

Still referring to FIG. 4, in one embodiment of the present invention, each one of the twenty-four conductors 137–139 is a wire-NOR conductor which is capable of being wire-NORed to other conductors. In one embodiment of the present invention, all of the set conductors 137 within a block of work channels (e.g. 160, 161) are wire-NORed together. Likewise, all of the clear conductors 138 within a block of work channels (e.g. 160, 161) are wire-NORed together. Similarly, all of the toggle conductors 139 within a block of work channels (e.g. 160, 161) are wire-NORed together.

Figure 5:
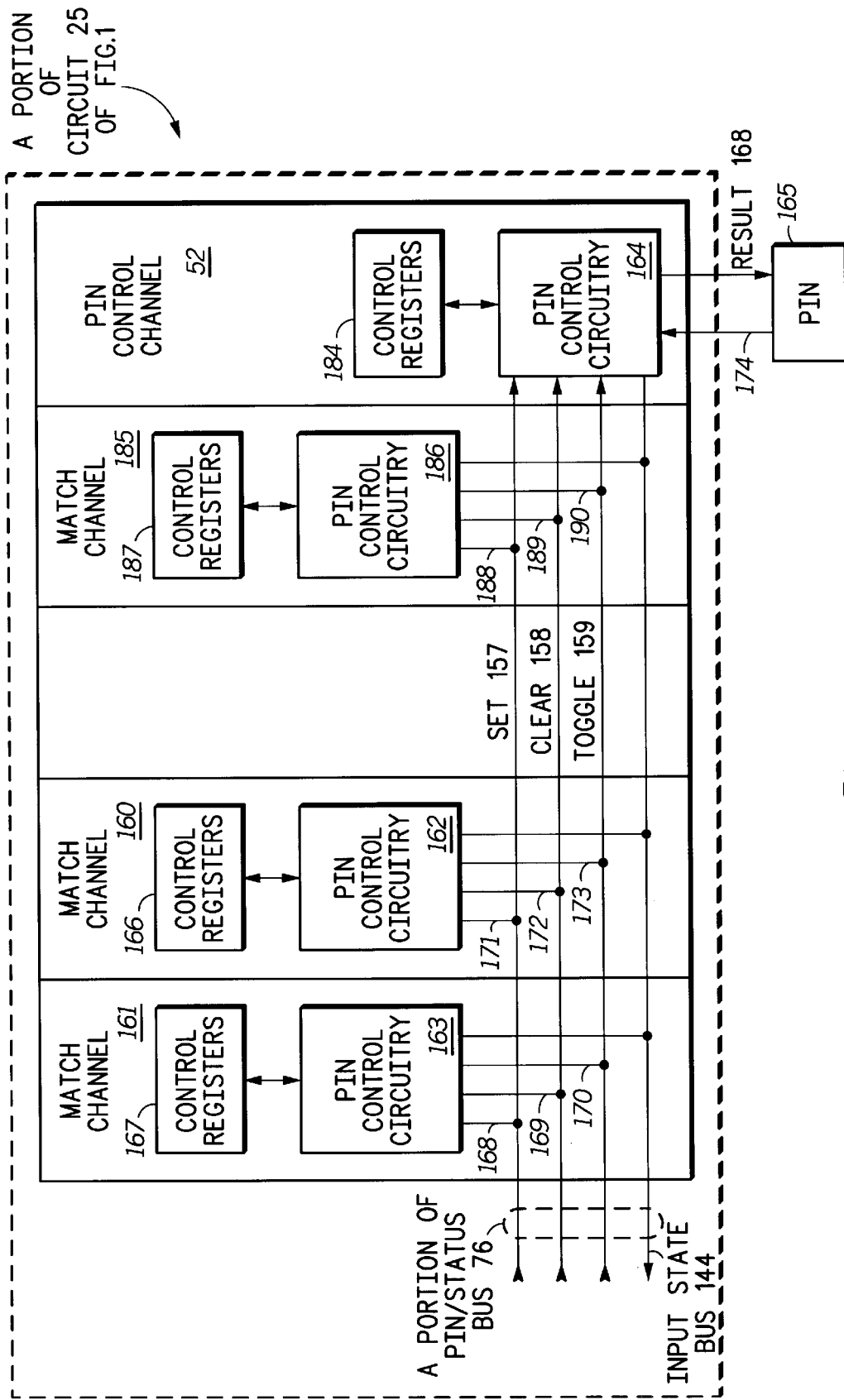
FIG. 5 illustrates, in block diagram form, a portion of circuit 25 of FIG. 1 in accordance with one embodiment of the present invention.

As an example, the operation of pin/status bus 76 (see FIG. 4) will be described. FIG. 5 illustrates a portion of pin/status bus 76 which is used to control the output state of integrated circuit pin 165 when pin 165 is configured as an output pin. Set conductor 157 is one of the eight set conductors 137 illustrated in FIG. 4; clear conductor 158 is one of the eight clear conductors 138 illustrated in FIG. 4; and toggle conductor 159 is one of the eight set conductors 139 illustrated in FIG. 4. Each one of conductors 157–159 is a wire-NOR conductor which is precharged to a logic level one. Thus if the pin control circuitry 162 of match channel 160 drives a logic level one on conductor 171 while the pin control circuitry 163 of match channel 161 drives a logic level zero on conductor 168, the logic level of set conductor 157 will be a logic level zero. Consequently, for wire-NOR conductors, a logic level zero will dominate. Alternate embodiments may use wire-OR conductors.

Pin control circuitry 164 receives the wire-NOR result of set conductor 157, clear conductor 158, and toggle conductor 159. Pin control circuitry 164 also receives the current logic level of pin 165 by way of conductor 174. Pin control circuitry 164 uses the logic level of conductors 157–159 and 174 in order to determine the logic level of result conductor 168, and thus to determine the next output logic level of integrated circuit pin 165.

FIG. 6 illustrates a truth table which is used by one embodiment of pin control circuitry 164 in order to determine the logic level of result conductor 168, and thus to determine the next output logic level of integrated circuit pin 165. Result conductor 168 is used to drive the output logic level of pin 165. The truth table illustrated in FIG. 6 defines a protocol which determines the behavior of pin 165 for all possible conditions of the set, clear, and toggle conductors 157–159. For the table in FIG. 6, the asserted state of the set, clear, and toggle conductors 157–159 is a logic level "0", and the negated state of the set, clear, and toggle conductors 157–159 is a logic level "1". The protocol can be stated as follows: (1) if the toggle conductor 159 is asserted, toggle always wins and the pin 165 is toggled; (2) if all conductors 157–159 are negated, the pin 165 stays at the same logic level; and (3) if both the set conductor 157 and the clear conductor 158 are asserted, and the toggle conductor 159 negated, the pin 165 stays at the same logic level. Alternate embodiments may use a different protocol and a different truth table.

By using an output event bus 132 having separate conductors for set (137), clear (138), and toggle (139), the present invention is able to perform logical operations on the outputs of multiple channels without the intervention of a service processor. This is a very powerful and flexible feature.

In the prior art, intervention by a service processor (e.g. a central processing unit) was required to initiate timer output pin logic level changes as a result of the state of multiple timer channels. A service processor was required to intervene via an interrupt, or by some other mechanism. The service processor recognized the state of multiple timer channels, and in response, produced a corresponding logic level change at a timer output pin. An example of the state of a match channel is whether or not a match has occurred.

Upon recognizing the states of the selected channels, the service processor performed a comparison on the states, and produced one of the following results for certain automotive applications: (1) set an output pin if the states of all selected channels are true; (2) clear an output pin if the states of all selected channels are true; (3) set an output pin if the state of any selected channel is true; or (4) clear an output pin if the state of any selected channel is true. Unfortunately, using a service processor to compare the states of various channels and to cause an output pin to be driven to the appropriate output logic level required a significant amount of software overhead. Since intervention by a service processor was required to set or clear the state of a timing-accurate output pin as a result of the states of multiple channels, a timing error in the timing-accurate output resulted because of service processor latency.

The present invention allows for timer channels to be configured to perform the four types of "logical" operations described above, without intervention by a service processor. As a result, no timing error due to service processor latency is introduced in the timing-accurate output. The number of timer channels outputs which may be logically combined is theoretically limited only by the total number of channels available in the timer system.

The present invention provide user programmable logical ANDing and ORing of timer channels output pins, such as pin 165 in FIG. 5. In one embodiment, the present invention provides a system having multiple independent timer channels and output timer pins with the ability to selectively configure a subset of the channels to control the state of a pin without intervention by a service processor according to one of the following algorithms: (1) set the pin if the output states of all selected channels are true; (2) clear the pin if the output states of all selected channels are true; (3) set the pin if the output state of any of the selected channels is true; and (4) clear the pin if the output state of any of the selected channels is true.

Referring to FIG. 5, each channel has one or more control registers. Match channels 160 has control register 166, match channel 161 has control registers 167, and pin control channel has control registers 184. FIG. 7 illustrates a portion of control registers 166 and a portion of control registers 167 of FIG. 5. In one embodiment, control registers 166 has four pin select control bits 180 which are used to select one of sixteen integrated circuit pins, and control registers 167 has four pin select control bits 181 which are used to select one of sixteen integrated circuit pins. In the embodiment of the present invention illustrated in FIG. 5, pin select control bits 180 and 181 have been programmed by the user to select pin 165.

Also, in one embodiment of the present invention, control registers 166 has three pin output stimulus control bits 182 which are used to select the function which match channel 160 will produce at output pin 165. Likewise, control registers 167 has three pin output stimulus control bits 183 which are used to select the function which match channel 161 will produce at output pin 165. FIG. 8 illustrates the functions which can be user programmed by pin output stimulus control bits 182 and 183 in one embodiment of the present invention. Alternate embodiments of the present invention may use more bits, fewer bits, or different bit encodings for various control bits.

Referring to FIG. 8, the user programmed function determines how each match channel 160–161 effects the set conductor 157, the clear conductor 158, and the toggle conductor 159 when a match occurs. For example, if match channel 160 is programmed for the disable function, match channel 160 will have no effect on conductor 157–159 when a match occurs. If match channel 160 is programmed for the rising function, match channel 160 will assert set conductor 157 (by driving a logic level zero on set conductor 157) for one clock period when a match occurs. If match channel 160 is programmed for the falling function, match channel 160 will assert clear conductor 158 (by driving a logic level zero on clear conductor 158) for one clock period when a match occurs. If match channel 160 is programmed for the toggle function, match channel 160 will assert toggle conductor 159 (by driving a logic level zero on toggle conductor 159) for one clock period when a match occurs.

The remaining four functions, namely AND-to-clear, AND-to-set, OR-to clear, and OR-to-set, are the functions which allow user programmable logical ANDing and ORing of the outputs of timer channels. FIG. 9 illustrates an example of the results produces at pin 165 by the logical ANDing and logical ORing of the states of match channels 160 and 161. The "T" for true indicates that a match has occurred, and the "F" for false indicates that a match has not occurred. If both match channels 160 and 161 are programmed for AND-to-set, the next logic level of pin 165 will only be set (i.e. a logic level "1") when a match has occurred in both match channel 160 and match channel 161. Thus AND-to-set means that a match must occur in both match channel 160 and match channel 161 in order set the output pin 165. Likewise, AND-to-clear means that a match must occur in both match channel 160 and match channel 161 in order clear the output pin 165.

If both match channels 160 and 161 are programmed for OR-to-set, the next logic level of pin 165 will be set (i.e. a logic level "1") when a match has occurred in either match channel 160 or match channel 161. Thus OR-to-set means that a match must occur in any one of match channels 160 and 161 in order set the output pin 165. Likewise, OR-to-clear means that a match must occur in any one of match channels 160 and 161 in order clear the output pin 165. Although the example illustrated in FIG. 9 uses two match channels, any number of channels may be used.

In addition, the various logical AND and OR functions may be combined. For example, an additional channel, such as a counter channel 185, may be placed between match channel 160 and pin control channel 52 in FIG. 5. This counter channel 185 may have pin select bits in control registers 187 which are user programmed to select pin 165. Thus counter channel 185 may drive conductors 157–159. If match channels 160 and 161 are programmed for AND-to-set, and counter channel 185 is programmed for OR-to-set, pin 165 will be set if counter channel 185 reaches its count value, or if both match channels 160 and 161 have a match. The present invention may be used to form even more complex Boolean equation involving the states of various channels.

Referring to FIG. 5, the set, clear, and toggle conductors 157–159 themselves, due to their wire-NOR nature, are used to actually perform the logical ANDing and ORing operations. How the logical ANDing and ORing is performed will now be described. In one embodiment of the present invention, the set conductor 157 and the clear conductor 158 are used to implement the AND-to-clear and AND-to-set functions; and, the toggle conductor 159 is used to implement the OR-to-clear and OR-to-set functions.

If match channel 160 is programmed for AND-to-set, match channel 160 asserts the clear conductor 158 until a match occurs.

Note that the set conductor 157 and the toggle conductor 159 remain precharged to the negated state (i.e. logic level "1"). When a match occurs, match channel 160 asserts the set conductor 157 and continues to assert it until the logic level of pin 165 changes to a logic level one (i.e. set). Note that match channel 160 receives the output logic level of pin 165 by way of the input state bus 144 (see FIG. 4). As long as pin 165 remains set, match channel 160 does not assert any of conductors 157–159. Pin 165 may then be cleared by another channel, or by match channel 160 if it has been reconfigured by software. Once pin 165 has been cleared, match channel 160 once again asserts the clear conductor 158 until a match occurs.

If match channel 160 is programmed for AND-to-clear, match channel 160 asserts the set conductor 157 until a match occurs. Note that the clear conductor 158 and the toggle conductor 159 remain precharged to the negated state (i.e. logic level "1"). When a match occurs, match channel 160 asserts the clear conductor 158 and continues to assert it until the logic level of pin 165 changes to a logic level zero (i.e. clear). Note that match channel 160 receives the output logic level of pin 165 by way of the input state bus 144 (see FIG. 4). As long as pin 165 remains clear, match channel 160 does not assert any of conductors 157–159. Pin 165 may then be set by another channel, or by match channel 160 if it has been reconfigured by software. Once pin 165 has been set, match channel 160 once again asserts the set conductor 157 until a match occurs.

If match channel 160 is programmed for OR-to-set, match channel 160 does not assert any of conductor 157–159 until a match occurs. Note that the conductors 157–159 remain precharged to the negated state (i.e. logic level one). Pin 165 must be cleared by another channel, or by a differently configured match channel 160. When a match occurs, match channel 160 asserts the toggle conductor 159 and continues to assert it until the logic level of pin 165 changes to the opposite logic level (i.e. set). Note that match channel 160 receives the output logic level of pin 165 by way of the input state bus 144 (see FIG. 4). As long as pin 165 remains set, match channel 160 does not assert any of conductors 157–159. Pin 165 may then be cleared by another channel, or by match channel 160 if it has been reconfigured by software. Once pin 165 has been cleared, match channel 160 once again waits until a match occurs to assert toggle conductor 159.

If match channel 160 is programmed for OR-to-clear, match channel 160 does not assert any of conductor 157–159 until a match occurs. Note that the conductors 157–159 remain precharged to the negated state (i.e. logic level one). Pin 165 must be set by another channel, or by a differently configured match channel 160. When a match occurs, match channel 160 asserts the toggle conductor 159 and continues to assert it until the logic level of pin 165 changes to the opposite logic level (i.e. cleared). Note that match channel 160 receives the output logic level of pin 165 by way of the input state bus 144 (see FIG. 4). As long as pin 165 remains cleared, match channel 160 does not assert any of conductors 157–159. Pin 165 may then be set by another channel, or by match channel 160 if it has been reconfigured by software. Once pin 165 has been set, match channel 160 once again waits until a match occurs to assert toggle conductor 159.

Note that in one embodiment of the present invention, matches which occur in match channel 160 while match channel 160 is waiting for pin 165 to respond are ignored. In alternate embodiments, the information that one or more matches have occurred is stored and is used to effect pin 165 at the next available opportunity.

Note that the above description of the operation of the circuitry in FIG. 5 also applies to the other channels 57–58 and to the other output event bus conductors 131–133 illustrated in FIG. 4.

The operation of the input state buses 143–145 illustrated in FIG. 4 will now be described. In one embodiment, input state buses 143, 144, and 145 each include eight pin conductors 146, 148, and 150 respectively, as well as eight pin/status conductors 147, 149, and 151 respectively. Thus, each pin/status bus (e.g. 118) has eight conductors which are used to transfer pin information (e.g. 112), and eight conductors which can be individually programmed to transfer either pin information or status information (e.g. 113).

Control register storage bits 192 in pin control channel 52 are used to selectively determine, for each pin/status conductor 149, whether the conductor will transfer pin information between the channels 58 and one or more integrated circuit pins 195, or whether the conductor will transfer status information just between the channels 58. Likewise, control register storage bits 191 in pin control channel 51 are used to selectively determine, for each pin/status conductor 151, whether the conductor will transfer pin information between the channels 57 and one or more integrated circuit pins 194, or whether the conductor will transfer status information just between the channels 57.

The pin/status conductors 147, 149, and 151 may thus be used as status conductors which have no effect on the pins, but which can be used to inform other channels that an event (e.g. a match) has occurred on a particular channel. The other channels may thus simultaneously adjust their behavior based upon an event which occurred in one particular channel. When being used as status conductors, conductors 149 provide a way to hardware link various ones of channels 58. Likewise, when being used as status conductors, conductors 151 provide a way to hardware link various one of channels 57. For example, match channel 161 can provide information that a match occurred by asserting one of conductors 149. Thus one or more channels in channels 58 monitor that one conductor to determine when a match in channel 161 occurred.

Pin conductors 148 are used to transfer the current logic state of integrated circuit pins 195 back to channels 58, and pin conductors 150 are used to transfer the current logic state of integrated circuit pins 194 back to channels 57. More specifically, each one of pin conductors 148 transfers the current logic level of its corresponding one of integrated circuit pins 195 from the pin back to channels 58. Likewise, each one of pin conductors 150 transfers the current logic level of its corresponding one of integrated circuit pins 194 from the pin back to channels 57.

Thus, the present invention allows multiple channels (e.g. channels 58 in FIG. 4) to provide information to the same pin/status bus conductors (e.g. pin/status bus conductors 76). As a result more than one channel can affect the logic level of an integrated circuit pin (e.g. one of pins 195), and multiple channels can be hardware linked. Although the embodiment described above allows the logical functions of ANDing and ORing to be performed, alternate embodiments of the present invention may perform any logical operation, including NORing, NANDing, exclusive-ORing, or more complex Boolean functions.

Global Channel Communication Bus

Figure 10:
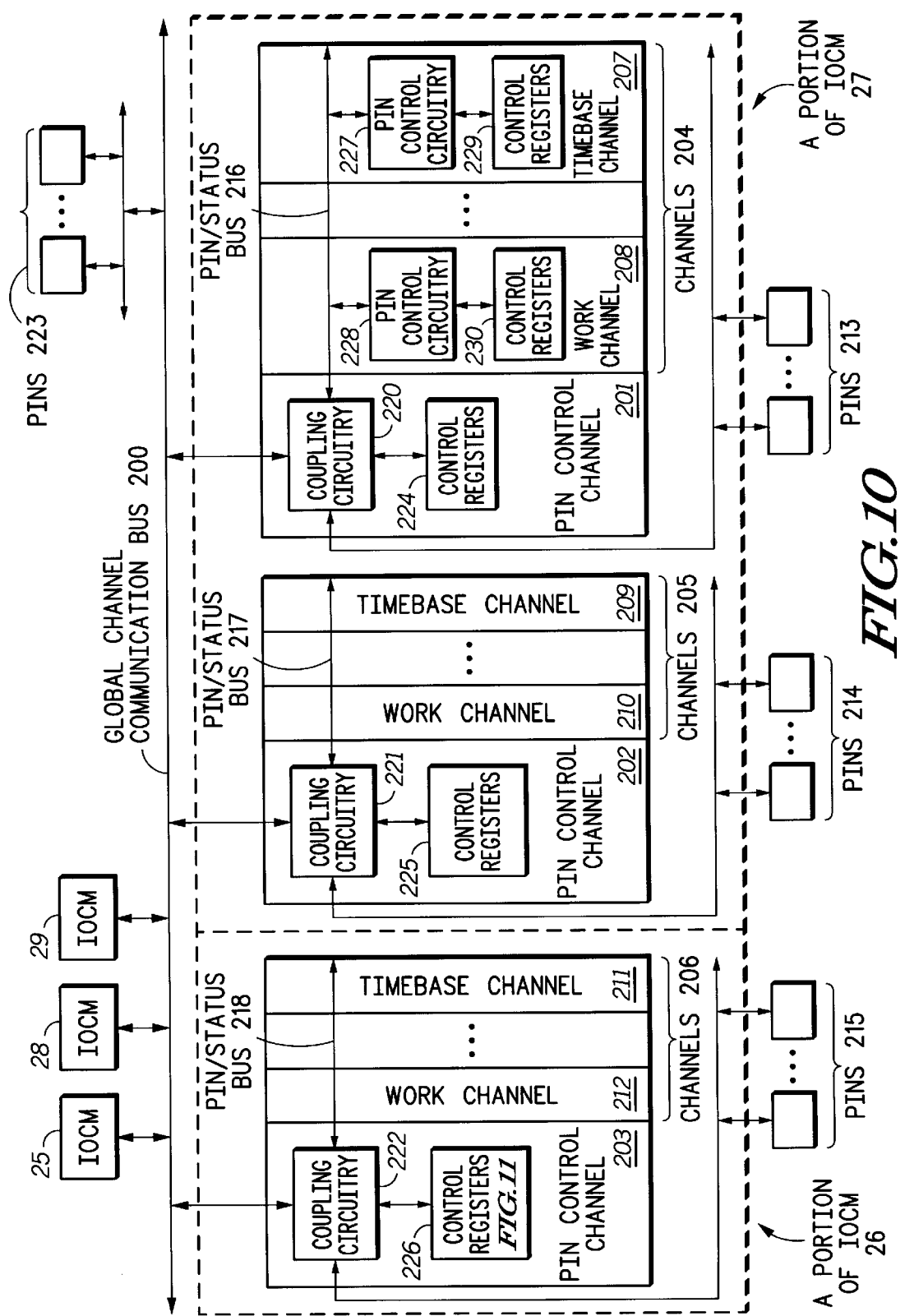
FIG. 10 illustrates, in block diagram form, a portion of circuits 26 and 27 of FIG. 1 in accordance with one embodiment of the present invention.

Referring to FIG. 10, in some embodiments of the present invention, a global channel communication bus 200 is used to communicate information between channels which are coupled to different pin/status buses 216–218. The purpose of the global channel communication bus 200 is to transfer information between channels in different IOCMs 25–29 (see FIG. 1), and to transfer information between channels within an IOCM that are coupled to different pin/status buses (e.g. 216 and 217 in FIG. 10). In addition, in some embodiments of the present invention, the global channel communication bus 200 can provide and receive information from external to input/output integrated circuit 22 (see FIG. 1) by way of integrated circuit pins 223. Note that in one embodiment of the present invention, pins 34 illustrated in FIG. 1 may include pins 213–215 and one or more of pins 223 illustrated in FIG. 10.

In the prior art, locally generated status or control information was communicated to other independent functional blocks of circuitry on one or more integrated circuits by a service processor. For example, many control applications used an event (e.g. match, capture, time-out, etc.) produced by one channel to trigger various actions to take place on multiple independent functional blocks of circuitry. These independent functional blocks of circuitry may be physically located on separate modules or even on separate integrated circuits. In prior art implementations, the single event would be required to generate an interrupt, and the interrupt service routine would be required to trigger an action to take place within each independent functional blocks of circuitry. Additionally, the interrupt service routine operated by triggering each action sequentially.

By using the global channel communication bus 200 (see FIG. 10) instead of interrupts, the present invention allows status and control information to be broadcast to all channels at the same time so that all actions within various independent functional blocks of circuitry may be triggered synchronously, thus providing a coherent means of communicating global signals within the entire data processing system 10 (see FIG. 1).

The global broadcast capability provided by the global channel communication bus 200 (see FIG. 10) eliminates the need to interrupt the service processor every time an event occurs which must be communicated to various channels coupled to different pin/status buses. The global channel communication bus 200 also results in faster communication and response time than the prior art approach of using a service processor, since the speed of an interrupt service routine is typically an order of magnitude slower than the speed of the broadcast capability of the global channel communication bus 200.

In addition, during a software error condition the service processor is generally non-operational. Because the service processor is non-operational, many I/O functions which must communicate between one another must be disabled since interrupts cannot be generated. In the past, if an I/O system was required to perform some limited operation during a software error condition, specially designed hardware was required. The broadcast capability of the present invention eliminates much of this special hardware since independent functional blocks of circuitry can communicate directly with one another by way of the global channel communication bus 200.

Also, the broadcast capability of the present invention greatly simplifies the design and implementation of modifications and additions to data processing system 10 (see FIG. 1). In many versions of data processing system 10, the channels within an IOCM 25–29 are arranged to perform a specific function or a limited number of functions, making it somewhat difficult to reconfigure the hardware to either increase the bandwidth of the original application or alter the application to perform another task. The broadcast capability afforded by the global channel communication bus 200 permits multiple independent functional blocks of circuitry (e.g. IOCMs 25–29) to communicate between one another, thus increasing bandwidth and allowing different functions to be implemented across IOCM boundaries.

Referring to FIG. 10, the global channel communication bus 200 is used to communicate information between channels which are coupled to different pin/status buses 216–218. The different pin/status buses 216–217 may be located in the same IOCM (e.g. IOCM 27), or the different pin/status buses 217–218 may be located in different IOCMs (e.g. IOCM 26 and IOCM 27). In some embodiments of the present invention, the global channel communication bus 200 may be coupled to all of the pin/status buses on an integrated circuit 22 (see FIG. 1).

In alternate embodiments, the global channel communication bus 200 may only be coupled to the pin/status buses which must communicate with channels that are not coupled to the same pin/status bus. For example, if none of channels 206 need to receive or provide information to any channels other than channels 206, there would be no need for pin/status bus 218 to be coupled to the global channel communication bus 200.

Referring to FIG. 1, the inter-module bus 24 is used to perform read and write accesses from CPU 13 to the registers located in the external bus interface 23 and to the registers located in the channels of IOCMs 25–29. The inter-module bus 24 also transfers system information, such as interrupt information. The inter-module bus 24 interfaces to each IOCM 25–29 by way of a bus interface unit 36–40, respectively. In one embodiment of the present invention, the global channel communication bus 200 is merely incorporated as part of inter-module bus 24.

However, in alternate embodiments of the present invention, global channel communication bus 200 is distinct from the inter-module bus 24. Global channel communication bus 200 is routed directly to the pin control channels (e.g. 201–203) in each IOCM 25–29. The global channel communication bus 200 communicates directly to each pin control channel (e.g. 201–203), rather than communicating indirectly by way of bus interface units 36–40.

The coupling circuitry 220–222 in each pin control channel 201–203, respectively, is coupled to one or more control registers 224–226, respectively. As an example, control register storage bits in control registers 224 can be user programmed to select which one or more of the conductors of pin/status bus 216 are coupled to global channel communication bus 200. Thus the user can select which channels will be coupled to which conductors of pin/status bus 216 by way of control registers 229–230 and pin control circuitry 227–228, and which conductors of pin/status bus 216 will be coupled to which conductors of global channel communication bus 200 by way of control registers 224 and coupling circuitry 220.

In one embodiment of the present invention, each one of the conductors of global channel communication bus 200 is a wire-OR conductor which is pulled down to a logic level zero by weak pull-down devices (not shown). Thus if work channel 212, by way of coupling circuitry 222, places a logic level one on a first conductor of global channel communication bus 200, while work channel 210, by way of coupling circuitry 221, places a logic level zero on the same first conductor of global channel communication bus 200, the logic level of that first conductor of global channel communication bus 200 will be a logic level one. Consequently, for wire-OR conductors, a logic level one will dominate. Alternate embodiments may use wire-NOR conductors.

Referring to FIG. 10, in one embodiment of the present invention, the pin/status buses (e.g. 216–218) are not wire-OR or wire-NOR buses. Consequently, for channels (e.g. 204–206) to receive a broadcasted value, the coupling circuitry (e.g. 220–222) receives the values from the conductors of global channel communication bus 200 and then drives the selected conductors of the pin/status bus (e.g. 216–218) with the appropriate values. Similarly, for channels (e.g. 204–206) to provide a broadcasted value, the coupling circuitry (e.g. 220–222) reads the values from the appropriate conductors of the pin/status bus (e.g. 216–218) and then drives the global channel communication bus 200 with the appropriate values.

As a result, the present invention allows the user of data processing system 10 (see FIG. 1) to programmably select which channel or channels on integrated circuit 22, or on a different integrated circuit (e.g. integrated circuit 12) can provide information to conductors of the global channel communication bus 200. Then the information provided to global channel communication bus 200 is synchronously broadcast to all channels which the user has selected on integrated circuit 22, or on a different integrated circuit (e.g. integrated circuit 12), without intervention by a service processor.

The present invention thus provides a way to synchronously communicate signals or information globally to all channels within a data processing system 10. The present invention provides flexibility to share information between multiple independent functional blocks of circuitry (e.g. IOCMs 25–29), thus allowing the IOCMs 25–29 to work together and coordinate one or more of the functions they perform. In addition, the present invention reduces the number of interrupts which must be serviced by a service processor and allows more functions to be performed synchronously within data processing system 10.

Figure 11:
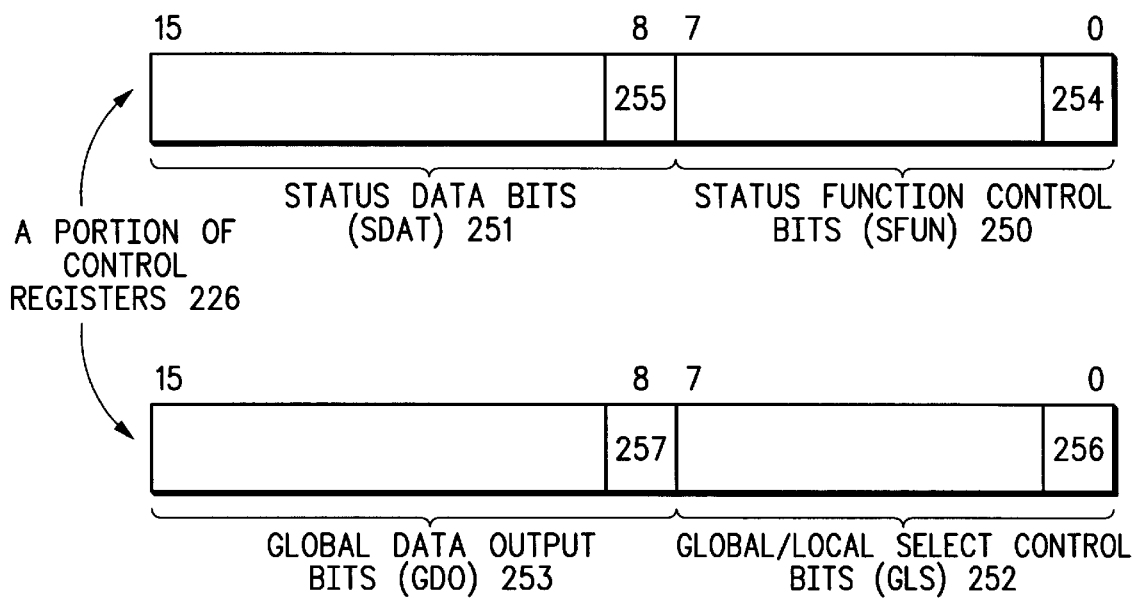
FIG. 11 illustrates, in block diagram form, a portion of control registers 226 of FIG. 10 in accordance with one embodiment of the present invention.

FIG. 11 illustrates one embodiment of a portion of control registers 226 of FIG. 10. In one embodiment of the present invention, global channel communication bus 200 includes eight conductors. For each of the eight conductors of the global channel communication bus 200 there is one corresponding SFUN (Status Function Control) register storage bit 250, one SDAT (Status Data) register storage bit 251, one GLS (Global/Local Select Control) register storage bit 252, and one GDO (Global Data Output) register storage bit 253. For example, conductor 246 (see FIG. 12) corresponds to SFUN bit 254, SDAT bit 255, GLS bit 256, and GDO bit 257.

The SDAT bits 251 contain status data that represents the result of output status events generated by global or local channels for the purpose of channel to channel communication and channel to CPU communication. Each SDAT bit 251 is controlled by a corresponding SFUN bit 250. Each SFUN bit 250 assigns a mode associated with the corresponding SDAT bit 251. The modes assigned to each SDAT bit 251 are "hardware controlled" mode and "software controlled" mode. In addition to SFUN bits 250, the SDAT bits 251 are also configured by the GLS bits 252. Each GLS bit 252 controls whether the corresponding SDAT bit 251 represent local status data or global status data.

Figure 12:
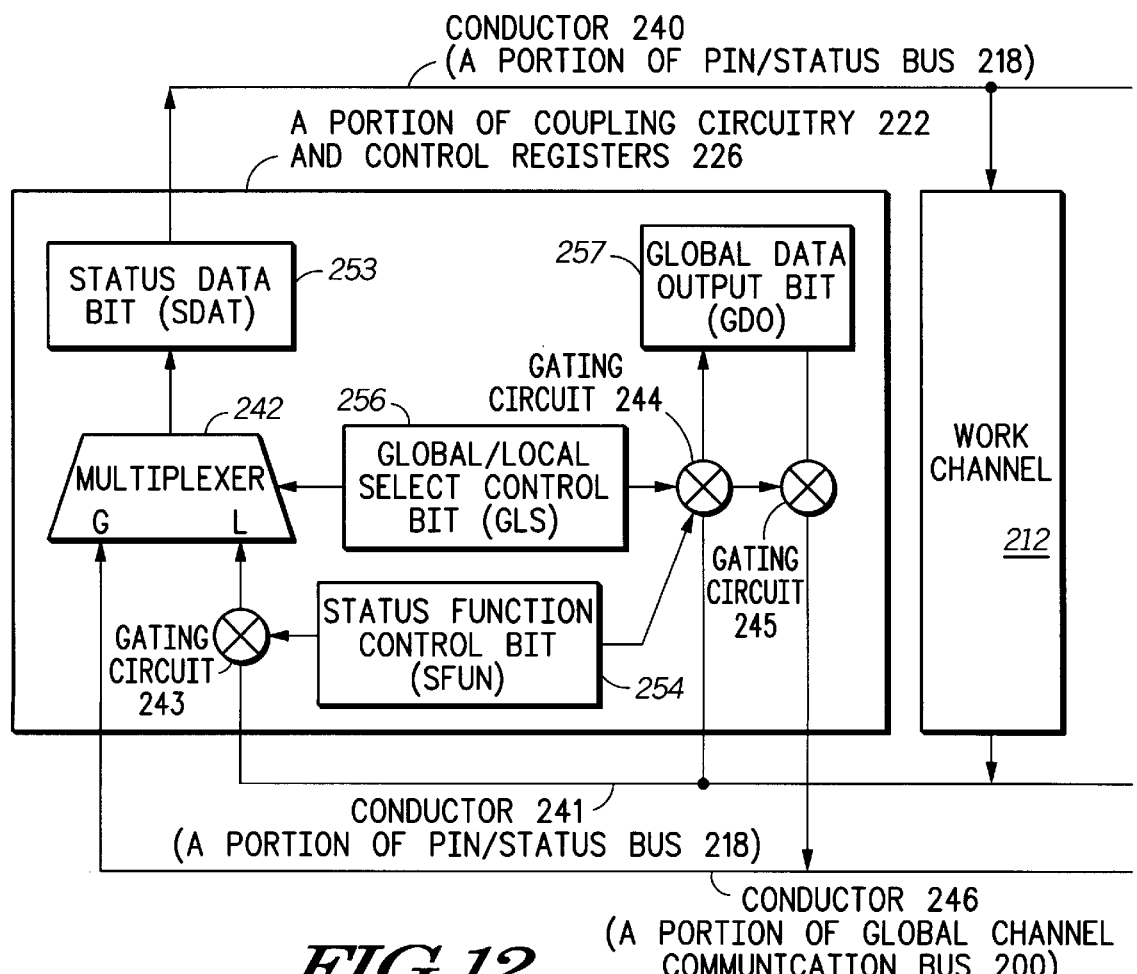
FIG. 12 illustrates, in block diagram form, a portion of circuit 26 of FIG. 10 in accordance with one embodiment of the present invention.

As an example, referring to FIG. 10 and FIG. 12, if the SDAT bit 255 is configured as local by the corresponding GLS bit 256 and is configured as "hardware controlled" by the corresponding SFUN bit 254, the SDAT bit 255 contains the result of channel output status events which are driven on conductor 241 by channels 206. If the SDAT bit 255 is configured as global by the corresponding GLS bit 256 and is configured as "hardware controlled" by the corresponding SFUN bit 254, the SDAT bit 255 contains data that represents the result of global status events which are driven on conductor 246 by selected channels located anywhere on integrated circuit 22 (see FIG. 1). The SDAT bit 255 provides its data to channel 206 via conductor 240. The SDAT bits 251 cannot be written by CPU 13 (see FIG. 1) in "hardware controlled" mode.

If the SDAT bit 255 is configured as local by the corresponding GLS bit 256 and is configured as "software controlled" by the corresponding SFUN bit 254, the SDAT bit 255 contains the data written to it by CPU 13 in order to emulate the status of conductor 241. However, when configured as global, the SDAT bit 255 cannot be written while in software controlled mode. The SDAT bit 255 will reflect the global status from conductor 246. The SDAT bit 255 always provides the value for conductor 240. In software controlled mode, the SDAT bit 255 can only be written by CPU 13 when configured for local status. To write global status, the GDO bit 257 is written.

When writing the SDAT bits 251, it is possible to force a single SDAT bit to a new state without affecting the remaining bits. To accomplish this, both the SDAT bits 251 and the SFUN bits 250, must be simultaneously written by CPU 13. The contents of the SFUN bits 250 determine whether the write will affect the SDAT bits 251, since each of the SFUN bits 250 controls a corresponding one of the SDAT bits 251.

For the write to affect one of the SDAT bits 251, the corresponding one of the SFUN bits 250 must be written with a % 0. To keep the write from affecting one of the SDAT bits 251, the corresponding one of the SFUN bits 250 must be written with a % 1. In this manner, the SFUN bits 250 are used to mask the corresponding SDAT bits 251 in order to control bit writes of to particular SDAT bits 251.

Referring to FIG. 11 and FIG. 12, the GDO bits 253 contain global data which is provided to the global channel communication bus 200. The data stored in GDO bit 257 is provided by one of two possible sources, namely conductor 241 and CPU 13. The SFUN bit 250 and the GLS bit 256 determine whether conductor 241 or CPU 13 provides the global data to GDO bit 257.

When the GLS bit 256 is configured as global, GDO bit 257 is used to provide a global status value to conductor 246. The GDO bit 257 provides the global status value, in both software controlled mode and hardware controlled mode, by driving the global status value onto conductor 246. If the GDO bit 257 is configured as software controlled by the corresponding SFUN bit 254, then CPU 13 is able to update the global status value stored in GDO bit 257. If the GDO bit 257 is configured as hardware controlled by the corresponding SFUN bit 254, then only conductor 241 can update the global status value stored in GDO bit 257.

When the GLS bit 256 is configured as local, the GDO bit 257 is not used to provide global status to conductor 246. The GDO bit 257 cannot be written by CPU 13. The GDO bit 257 can only be updated by conductor 241.

Referring to FIG. 3, note that the ability to couple one of pins 110 (corresponding to PCC 105) to one of pin/status information conductors 115 (corresponding to the other PCC 107 in a pair), allows the user to provide channel outputs from the global channel communication bus 200 to an output pin 110. Thus output events can be generated by any channel on integrated circuit 22 (see FIG. 1) to any output pin 31–35 via the global channel communication bus 200. In one embodiment of the present invention, the logic level of an input pin 110 is not reflected on the pin/status information conductors 115, and thus pin inputs cannot be communicated globally via the global channel communication bus 200. In an alternate embodiment of the present invention, the logic level of an input pin 110 is capable of being reflected on the pin/status information conductors 115, and thus pin inputs can be communicated globally via the global channel communication bus 200.

In one embodiment of the present invention, the GDO bits 253 can be read anytime by CPU 13, and can be written by CPU 13 only when configured for global status in software controlled mode.

Referring to FIG. 11 and FIG. 12, each one of SFUN bits 250 is used to select the mode, namely software controlled mode or hardware controlled mode, for each corresponding one of SDAT bits 251 and GDO bits 253. CPU 13 can read and write the SFUN bits 250 at any time.

Referring to FIG. 11 and FIG. 12, each one of GLS bits 252 is used to select whether the corresponding one of SDAT bits 251 is local or global. Local status values stored in SDAT bits 251 are communicated only on the local pin/status bus (e.g. 218 in FIG. 10) which is controlled by the local pin control channel (e.g. 203 in FIG. 10). Global status values stored in the GDO bits 257 can be provided from either the global channel communication bus 200 or the local pin/status bus (e.g. 218 in FIG. 10). CPU 13 can read and write the GLS bits 252 at any time.

Referring to FIG. 12, note that SDAT bits 255 can be individually configured as global or local by the corresponding GLS bits 256. When configured as global, conductor 241 provides a global status value to GDO bit 257, and not to SDAT bit 255. The GDO bit 257 is the source that provides global status values to the global channel communication bus 200 by way of conductor 246. The resultant logic level of the wire-Or conductor 246 (i.e. the global status value) is stored in SDAT bit 255. This global status value is driven onto conductor 240 to the inputs of channels 206 (see FIG. 10).

Note that in one embodiment of the present invention, there is one global timer bus (not shown) which is coupled to each of the master timer bus control channels (e.g. 61 and 63 in FIG. 2) in order to communicate one or more timebase values to the various timer buses (e.g. 71 and 72 in FIG. 2) on integrated circuit 22 (see FIG. 1). This global timer bus (not shown) functions in an analogous manner to the global channel communication bus 200 (see FIG. 10). In an alternate embodiment of the present invention, a global timer bus is not used. Instead, if separate IOCMs 25–29 require the same timebase value, the timebase channel (e.g. degree clock channel 94 in FIG. 2) which generates the required timebase is duplicated in multiple IOCMs 25–29.

Inter-Channel Data Transfer

Within the "silicon library of channels" there are a number of channels which can be programmed to perform data transfer operation. In data transfer operation, data can be transferred from the data register of a top adjacent channel (e.g. 400 in FIG. 20) to the data register of the channel itself (e.g. 401), and from the data register of the channel itself (e.g. 401) to the data register of the bottom adjacent channel (e.g. 402). By programming control register bits of channels to perform these inter-channel data transfers, both stacks and first-in first-out (FIFO) structures can be formed and used. In one embodiment of the present invention, the work channels which support inter-channel data transfers include: (1) match channels; (2) capture channels; and (3) up counter channels. In one embodiment, the down/up counter channels also allow some data transfer capability.

In one embodiment of the present invention, there are three basic types of structures that can be constructed using channels which support data transfer operation: (1) stacks, which are useful structures for collecting a number of timebase values or count operation values; (2) FIFOs, multiple match output events can be output to a pin or status conductor using a collection of timebase values stored within a FIFO structure (these output events can be used by other channels or by devices external to the I/O integrated circuit (e.g. 22 in FIG. 1)); and (3) FIFOs can also be used to collect and store the most recently captured timebase values or the most recent count operations.

Figure 20:
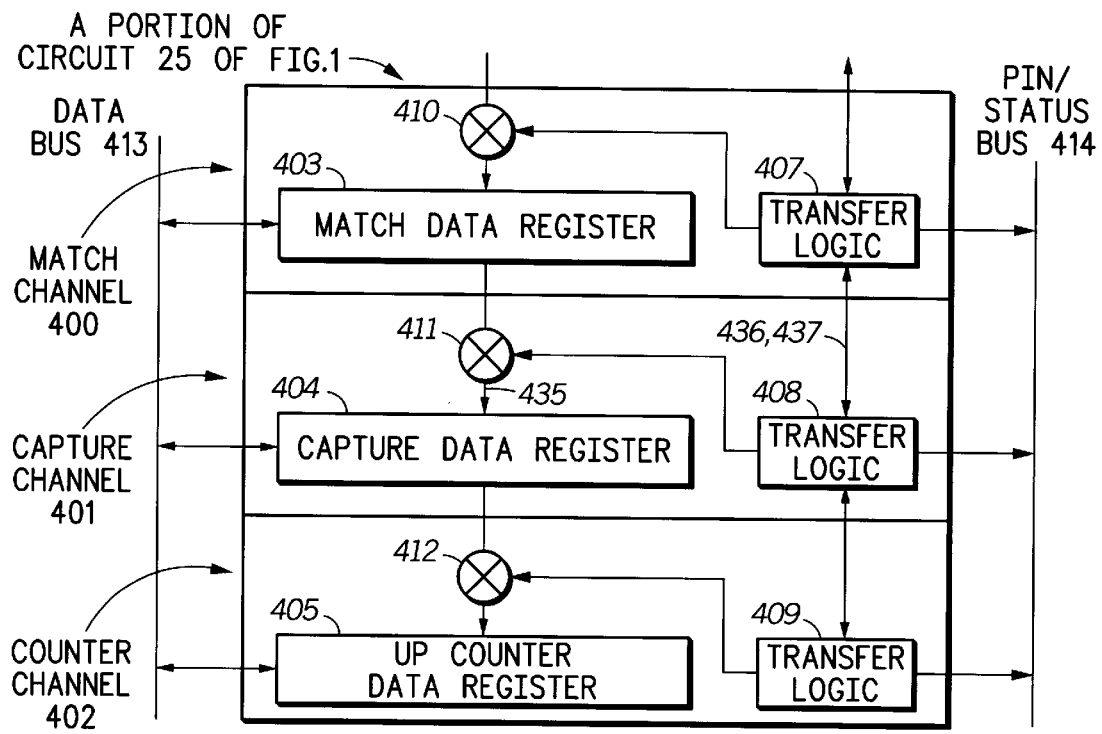
FIG. 20 illustrates, in block diagram form, a portion of circuit 25 of FIG. 1 in accordance with one embodiment of the present invention.

These types of stack and FIFO data storage structures can reduce the frequency of service required by the channels, and thus reduce the number of interrupts which must be responded to by CPU 13 (see FIG. 1). FIG. 20 illustrates one example of data transfer operation between adjacent channels 400–402.

As illustrated in FIG. 20, match channel 400, capture channel 401, and counter channel 402 each control the transfer of data from their top adjacent channel to their own data register. To control data transfers, a channel's data transfer logic (e.g. one of 407–409) communicates with the data transfer logic of the top adjacent channel. Each channel's data transfer logic can produce two types of output events to the status bus 414, namely an output event indicating that the channel and the top adjacent channel both have valid data, and an output event indicating that the channel and the top adjacent channel both have invalid data. Additionally, the capture channel 401 can use an input event from status bus 414 to invalidate the data in its data register 404.

In one embodiment of the present invention, the pin control channel (PCC) (e.g. 52 in FIG. 2) has a 32-bit data path which passes through it so that the PCC's top adjacent channel can transfer data through the PCC to its bottom adjacent channel. The data transferred through the PCC has no effect on the PCC (i.e. the PCC has no data transfer control and does not store the data that is passed through it).

Figure 21:
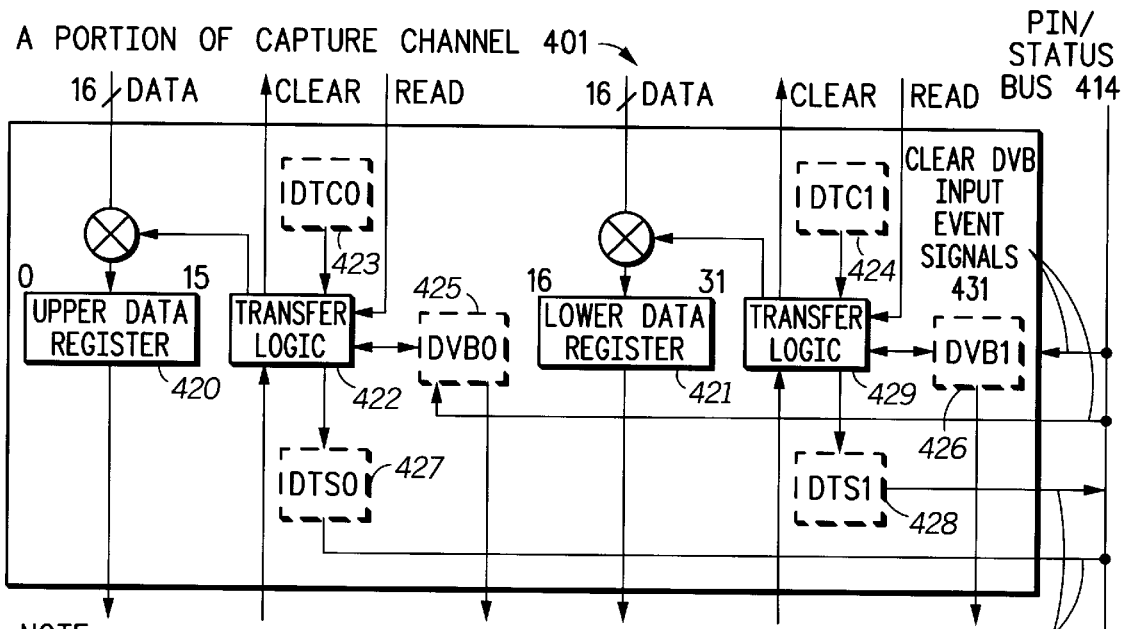
FIG. 21 illustrates, in block diagram form, a portion of capture channel 401 of FIG. 20 in accordance with one embodiment of the present invention.

FIG. 21 and FIG. 22 illustrate the circuitry, including the control and status register storage circuits, which is required to support data transfer operation in a channel (e.g. capture channel 401). FIG. 21 illustrates the circuitry required for 16-bit data transfer operation, and FIG. 22 illustrates the circuitry required for 32-bit data transfer operation. The 32/16-bit data transfer functionality, the register bits used in data transfer operation, the signals communicated between adjacent channels, and the input events used and the output events produced by a channel's data transfer logic will be described herein below. Note that the control and status register storage circuits are illustrated as dashed boxes because they may be physically located as part of one or more user programmable registers. Also note that the clear DVB input event signal is used only by capture channels (e.g. 404 in FIG. 20).

The match channel 400, the capture channel 401, and the counter channel 402 can each be configured to operate in data transfer mode as either two fully independent 16-bit halves or one 32-bit channel. As an example, FIG. 21 illustrates capture channel 401 configured for 16-bit data transfer operation, and FIG. 22 illustrates capture channel 401 configured for 32-bit data transfer operation. Match channel 400 and counter channel 402 are configured for data transfer operation in the same manner.

Referring to FIG. 21, note that the logic for each 16-bits is identical and is independent of the logic for the other 16-bits. In one embodiment of the present invention, it is not required that both halves of a channel, which are configured for 16-bit operation, be used in the same mode of operation. For example, the upper half of a match channel 400 can be configured to match a 16-bit value on the timer bus (e.g. timer bus 71 in FIG. 2), and the lower half of the match channel 400 can be configured for 16-bit data transfer operation.

Referring to FIG. 21, the register storage bits used to control the upper 16-bits of a channel are labeled with a "0", and the register storage bits used to control the lower 16-bits of a channel are labeled with a "1" (e.g. DTC0 and DTC1). When a channel (e.g. 401) is configured for 32-bit data transfer operation, as in FIG. 22, the register storage bits which control the upper 16-bits of the channel is used to control the 32-bit data transfers.

In one embodiment of the present invention, the channels which support data transfer operation have three different register bit fields which are used to control data transfers and provide status information to CPU 13 (see FIG. 1). These three register bit fields are Data Valid Bits (DVB), Data Transfer Control Bits (DTC), and Data Transfer Status Bits (DTS). In one embodiment of the present invention, each capture channel and each counter channel also uses input event edge select (IE) bits to control data transfer operation as well.

Referring to FIGS. 21 and 22, each Data Valid Bit (DVB) 425–426 is used by the corresponding data transfer logic 422, 429, 430 for both status and control. As a status bit, DVB is used to indicate the presence of valid or invalid data within the corresponding data register. As a control bit, DVB is used by the corresponding data transfer logic to control data transfers from the channel's top adjacent channel.

In one embodiment of the present invention, when the DVB bits is a logic level one, it indicates the presence of valid data within the channel's data register. For example, in the capture channel 401, the DVB bit is set to a logic level one whenever a capture operation is completed; and in the counter channel 402, the DVB is set to a logic level one whenever count operation is completed. For example, referring to FIGS. 20 and 22, when data is transferred into data register 404 (e.g. from its top adjacent channel 400), capture channel's data transfer logic 430 sets its DVB bit 425 to a logic level one.

Additionally, if CPU 13 (see FIG. 1) writes to the data register of any channel which is configured in data transfer mode, the DVB bit is automatically set to a logic level one to indicate that the data is valid. In one embodiment of the present invention, the DVB bit in match channels can also be set to a logic level one by a write to the data register when the match channel is in match mode.

In one embodiment of the present invention, when the DVB bits is a logic level zero, it indicates the presence of invalid data within the channel's data register. For example, in the match channel 400, the DVB bit is cleared to a logic level zero whenever a match output event occurs. For example, referring to FIGS. 20 and 22, when data is transferred from data register 404 into data register 405 (bottom adjacent channel), transfer logic 409 clears the DVB bit 425 in capture channel 401 to a logic level zero. Once the data has been transferred, the DVB bit 425 in channel 401 is cleared to logic level zero to indicate that the data is no longer valid.

Additionally, CPU 13 can invalidate the data in data register 404 by clearing its corresponding DVB bit 425 to a logic level zero. To clear the DVB bit 425, CPU 13 must read the DVB bit 425 in its asserted state, and then must write a logic level one to the DVB bit 425. A logic level one in DVB bit 425 indicates that the data in data register 404 is invalid. Note that because the DVB bit is both a status and control bit, a clear of the DVB bit by CPU 13 could potentially cause valid data to be overwritten by a data transfer operation if care is not exercised.

For one embodiment of the present invention, FIG. 23 illustrates the actions that can set and clear the DVB bit (e.g. 425 in FIG. 22) of each channel which supports data transfer operation while it is configured in each of its modes of operation. Referring to FIGS. 20 and 22, when a channel 402 is configured for data transfer operation, a data transfer occurs when the top adjacent channel's DVB bit (DVB bit 425 in channel 401) is a logic level one and the channel's own DVB bit (i.e. the DVB bit in channel 402) is a logic level zero. The channel's data transfer logic (i.e. the transfer logic in channel 402) first copies the data from the top adjacent channel's data register 404 to the channel's own data register 405. Next, the top adjacent channel's DVB bit (DVB bit 425 in channel 401) is cleared to a logic level zero. Finally, the channel's own DVB bit (i.e. the DVB bit in channel 402) is set to a logic level one.

Referring to FIGS. 21 and 22, the Data Transfer Control (DTC) bits 423-424 are used to enable and disable the corresponding data transfer logic 422, 429, 430. When a channel's data transfer logic is enabled, the contents of the top adjacent channel's data register can be transferred into the channel's own data register. The transfer is made when the DVB bit of the channel is a logic level zero and the DVB bit of the top adjacent channel is a logic level one.

In two modes of data transfer operation, output events can be generated: (1) transfer data and cause an output event if the DVB bits of the channel and the top adjacent channel are both a logic level one (this output event indicates the presence of valid data in both the channel and the top adjacent channel and is called the valid adjacent data pair (VADP) output event); and (2) transfer data and cause an output event if the DVB bits of the channel and the top adjacent channel are both a logic level zero (this output event indicates the presence of invalid data in the channel and the top adjacent channel and is called the invalid adjacent data pair (IADP) output event)).

In one embodiment of the present invention, the destination (output event conductor) and type of output event (rising, falling, toggle) for these two modes are not software controlled. Both output events are hardwired to the same conductor of status bus 414 (see FIGS. 21 and 22), and both cause a toggle event to occur.

Figures 24, 25:
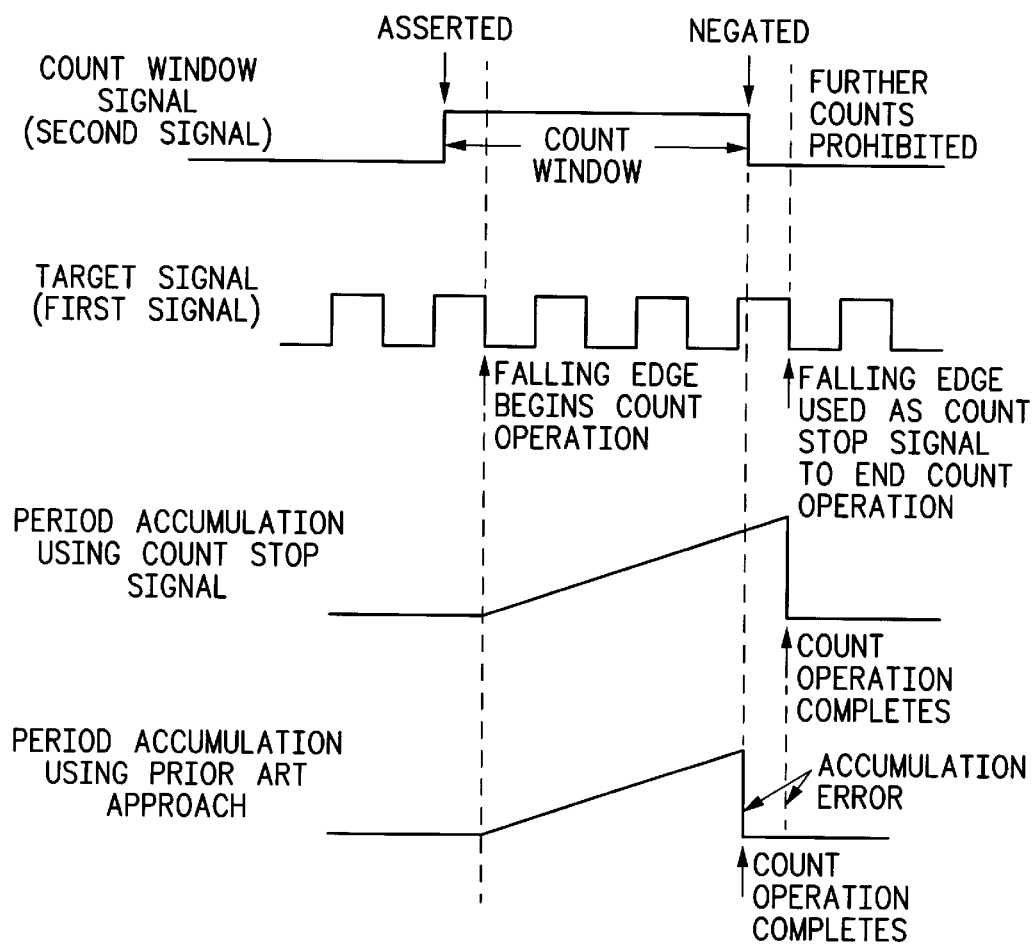
FIG. 24 illustrates, in tabular form, the modes of data transfer operation controlled by the Data Transfer Control bits (DTC) (e.g. 423–424 in FIGS. 21 and 22) in each channel that has data transfer operation.
FIG. 25 illustrates, in timing diagram form, an improved method for performing period accumulation measurements which results in less accumulation error than the prior art approach in accordance one embodiment of the present invention.

FIG. 24 illustrates the modes of data transfer operation controlled by the Data Transfer Control bits (DTC) (e.g. 423–424 in FIGS. 21 and 22) in each channel that has data transfer operation. Referring to FIGS. 21 and 22, the Data Transfer Status (DTS) bits 427–428 are used to flag that an output event has been generated by the corresponding data transfer logic 422, 429, 430. If DTC=% 10, and the VADP detect output event is generated by the corresponding data transfer logic, the DTS bit is set to a logic level one. Likewise, if DTC=% 11, and the IADP detect output event is generated by the corresponding data transfer logic, the DTS bit is set to a logic level one. To clear the DTS bit 427, CPU 13 must read the DTS bit 427 in its asserted state, and then must write a logic level one to the DTS bit 427.

The control signals used to perform data transfer operation will now be discussed. Referring to FIGS. 21 and 22, there are a number of data transfer control signals which are communicated to/from the top adjacent channel of a channel configured in data transfer operation. The three paths of communication between the two channels are the 32/16-bit data conductors, the read signal conductor, and the clear signal conductor. The 32/16-bit data conductors are used to transfer data from the top adjacent channel (e.g. channel 400 in FIG. 20) to the channel's own data register (e.g. data register 404 in channel 401).

The read signal is used to communicate the state of the top adjacent channel's DVB bit to the channel's own data transfer logic. This information is used for two purposes. First, in data transfer operation, if the top adjacent channel's DVB bit is a logic level one and the channel's own DVB is a logic level zero, then a data transfer occurs. Second, the read signal is used to determine if a valid or invalid adjacent data pair exists when the channel is programmed to produce a VADP or an IADP output event.

The clear signal is used by the top adjacent channel to conditionally clear it's DVB bit after data has been transferred from the top adjacent channel's data register to the channel's own data register.

Note in FIG. 22 that the data transfer channel has three paths of communication to the bottom adjacent channel. These are the data, read, and clear signal conductors which were discussed above. When the circuitry for data transfer channels (e.g. 400–402 in FIG. 20) are physically placed adjacent to each other on an integrated circuit, the data, read, and clear signal conductors can be directly routed from one channel to the next adjacent channel. In one embodiment of the present invention, each data transfer channel controls the transfer of data from the top adjacent channel to its own data register. Alternate embodiments of the present invention may use a different approach, may use different status and control register bits, may use different data transfer control signals, and may use different circuitry in order to transfer data between adjacent channels in an I/O integrated circuit 22 (see FIG. 1).

In one embodiment of the present invention, all data transfer channels can produce two types of output events, a valid adjacent data pair (VADP) output event, and an invalid adjacent data pair (IADP) output event. In addition, in some embodiments of the present invention, capture channels and counter channels functioning in data transfer operation can use an input event to clear the capture or counter channel's own DVB bit (see FIGS. 21 and 22).

Referring to FIGS. 21 and 22, in one embodiment of the present invention, the valid adjacent data pair (VADP) or invalid adjacent data pair (IADP) output event signal(s) is/are output to a hardwired status line 414 and produce a toggle event. The VADP and IADP output events can be used to interrupt CPU 13 (see FIG. 1) to indicate that a stack is full or that a FIFO is empty. The pin control channel (PCC) (e.g. 52 in FIG. 2) which monitors the status conductor 414 (e.g. a conductor of pin/status bus 76) that the VADP/IADP output event is output to, can be programmed to cause an interrupt when a toggle event is recognized on the status conductor.

The input event logic of a capture channel or a counter channel can be programmed, while in data transfer operation, to use an input event to clear its DVB bit (see clear DVB input event signals 431 and 433 in FIG. 21 and FIG. 22, respectively). This is useful for invalidating the data of the bottom data transfer channel within a FIFO, so that all data values above the bottom data transfer channel are transferred down one channel.

There are three basic types of data transfer structures which are commonly used in timer applications. The first data transfer structure is a stack which holds captured timebase values or count operation values. The second data transfer structure is a FIFO of timebase values which are used to produce a sequence of match output events. And, the third data transfer structure is a FIFO which contains a number of the most recently captured timebase values or most recent count operation values. The present invention allows these three basic types of data transfer structures to be user programmed by way of the data transfer capability and operation of one or more channels.

Count Operation Control Feature

Many microcontroller based control applications require highly accurate accumulation measurements of target signals. For example, counter channel 58 in FIG. 2 may be used to perform accumulation measurements of a target signal. The target signal may be provided from external to input/output (I/O) integrated circuit 22 (see FIG. 1), or may be generated internal to I/O integrated circuit 22. Counter channel 58 may perform a variety of counting operation which can be selected by writing predetermined control values into one or more user programmable control register storage bits 67 in counter channel 58 (see FIG. 2).

Figure 26:
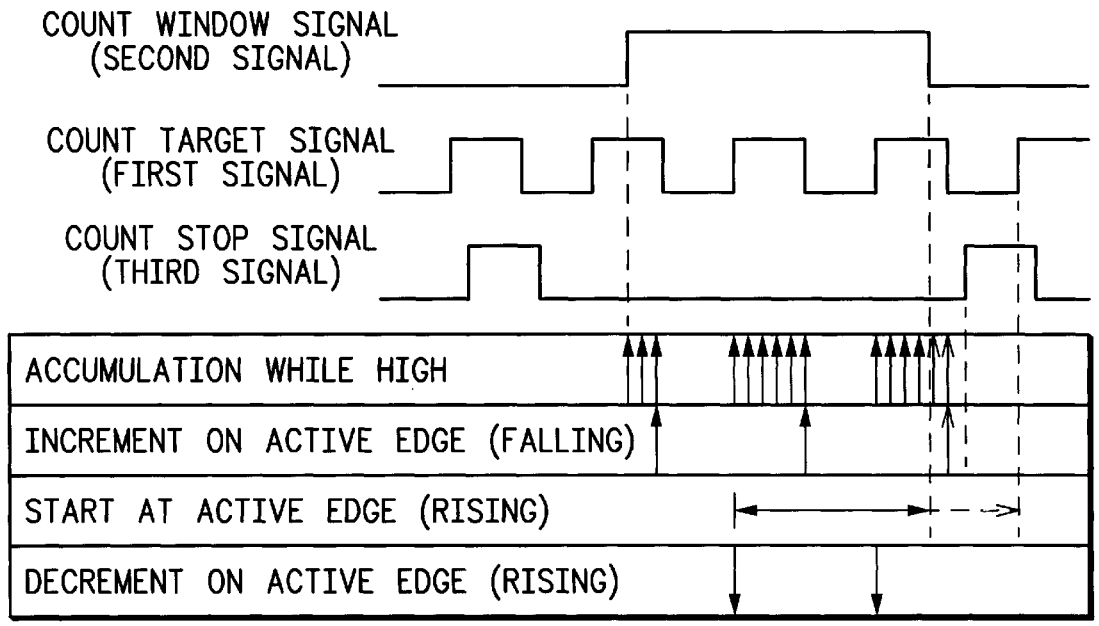
FIG. 26 illustrates, in timing diagram form, an improved method for performing period accumulation measurements in accordance with one embodiment of the present invention.

For example, referring to FIG. 26, as a first programmable selection, counter channel 58 may increment or decrement a counter value based on when a target signal is "high", or alternately when a target signal is "low". Second, counter channel 58 may increment a counter value each time that an active edge of the target signal is received. The active edge may be programmably selected as either the rising or the falling edge of the target signal. Third, counter channel 58 may increment or decrement a counter value continuously starting at the first active edge of the target signal. Fourth, counter channel 58 may decrement a counter value each time that an active edge of the target signal is received. Alternate embodiments of the present invention may use other counting operations.

Some control applications require a second signal produced by a second channel (e.g. match channel 56, capture channel 55, another counter channel in channels 87, etc.) to qualify when the count operation for the target signal will be enabled. In the prior art, if a counter channel performed an accumulation of a target signal over an interval of time, a second signal would either be gated with the target signal or the second signal would be required to generate an interrupt to an interrupt service processor. The interrupt service processor would then be required to intervene in order to enable the counting operation of the target signal within the counter channel.

Also in the prior art, to disable the counting operation of the target signal within the counter channel, either the second signal gated with the target signal would be negated or the second signal would be required to generate an interrupt to the interrupt service processor. The interrupt service processor would then be required to intervene in order to disable the counting operation of the target signal within the counter channel. Unfortunately this prior art method sometimes resulted in accumulation errors in the counting operation.

As the example in FIG. 25 illustrates, accumulation errors can be introduced in the prior art when the second signal is used to disable the counting operation of the target signal within the counter channel. Because the second signal is negated before the falling edge of the target signal, the counter channel will stop counting before the completion of a whole number of periods of the target signal. Thus the period accumulation value stored in the prior art counter channel may be lower than the correct value by the amount of the accumulation error. Note that the upward pointing arrows in FIG. 25 and FIG. 26 denote an increment of the counter in counter channel 58, and the downward pointing arrows in FIG. 25 and FIG. 26 denote a decrement of the counter in counter channel 58.

Still referring to FIG. 25, the prior art performed period accumulation over an interval of time, i.e. a "count window", which was defined solely by the assertion and negation of a count window signal. Generally a first counter channel was used to count the events of the target signal while a second channel was used to generate the count window signal. The first counter channel received both the target signal and the count window signal. In the example illustrated in FIG. 25, the asserted state of the count window signal is "high" and the active edge of the target signal is the falling edge.

Referring to the prior art period accumulation approach illustrated in FIG. 25, when the count window signal received by the first counter channel was asserted, the first counter channel began to count starting at the next active edge of the target signal. The first counter channel continued to count while the count window signal remained active. When the count window signal received by the first counter channel was subsequently negated, the first counter channel stopped counting immediately. As a result, accumulation error sometimes resulted if the count window signal was not negated on a period boundary of the target signal, as illustrated in FIG. 25.

However, the present invention permits counter channel 58 to receive a third signal provided by a third channel (e.g. referring to FIG. 2, match channel 56, capture channel 55, another counter channel in channels 87, etc.) or by a source external to I/O integrated circuit 22 (see FIG. 1). This third signal, labeled "count stop signal" in FIG. 26, is received and used by counter channel 58 to determine when to stop the counting operation. Note that the enabling and disabling of counter channel 58 does not require any interrupt servicing by a processor (e.g. CPU 13 in FIG. 1). In addition, the use of a third signal to control the disabling of the count operation allows the count operation to be stopped on a period boundary of the target signal, thus preventing any accumulation error.

The addition of a third signal, used as a count stop signal, provides a way to accurately accumulate target signal events over an interval of time without error. Note that in prior art, no method existed to allow a third signal produced by an external event or produced by a channel to further qualify the disabling of the count operation. The addition of a third signal eliminates any need for interrupt service intervention and provides a way to accurately accumulate target signal events over an interval of time without error.

Note that in some embodiment of the present invention, the target signal may also be used as the count stop signal. For example, referring to FIG. 25, the count stop condition may be programmed to be a particular edge of the target signal. For example, in FIG. 25, the falling edge of the target signal is selected as the count stop signal by writing a predetermined value to the control register storage bits 67 in counter channel 58 (see FIG. 2). Thus the count operation in counter channel 58 stops when both the count window signal is negated, and the count stop event occurs (i.e. the falling edge of the target signal). Thus counter channel 58 begins counting on the first falling edge of the target signal which occurs after the count window signal is asserted, and stops counting on the first falling edge of the target signal which occurs after the count window signal is negated. As a result, counter channel 58 counts and stores a very accurate period accumulation value with virtually no accumulation error compared to the prior art.

The present invention allows count operations based on a target signal to be qualified by the state of a second signal such that the counting can be enabled during a "count window" defined by a second signal and disabled by either the second signal or the second signal further qualified by a third signal. In some cases, an edge of the target signal is used as the third signal. In one embodiment, a portion of the control register storage bits 67 in counter channel 58 (see FIG. 2) are used to select whether a count stop signal is used. Also, a portion of the control register storage bits 67 selects whether the event stopping the count operation is an event of a third signal (namely a count stop signal as illustrated in FIG. 26), an event of the target signal as illustrated in FIG. 25, or an event of the count window signal as in the prior art. In the prior art, the negation of the count window signal was always used to stop the count operation.

Figure 27:
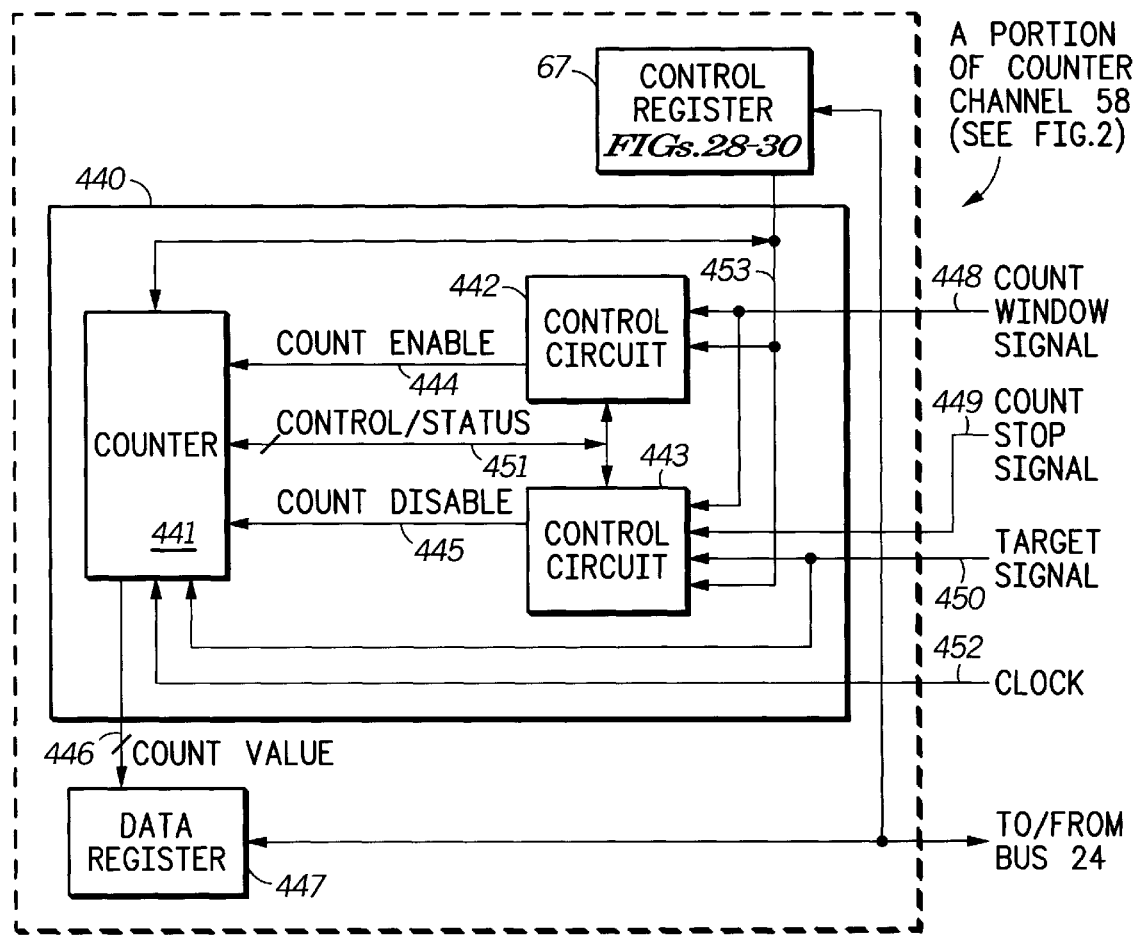
FIG. 27 illustrates, in block diagram form, a portion of counter channel 58 of FIG. 2 in accordance with one embodiment of the present invention.

FIG. 27 illustrates one embodiment of a portion of counter channel 58 (see FIG. 2). Counter channel 58 includes a counter circuit 440 and a data register 447. Data register 447 is bi-directionally coupled to bus 24 (see FIG. 1). Counter circuit 440 includes a counter 441, a control circuit 442, and a control circuit 443. Control circuit 442 receives a count window signal by way of conductor 448. Control circuit 443 receives a count window signal by way of conductor 448, a count stop signal by way of conductor 449, and a target signal by way of conductor 450. Control circuit 442 provides a count enable signal to counter 441 by way of conductor 444, and control circuit 443 provides a count disable signal to counter 441 by way of conductor 445. Counter 441 also receives the target signal by way of conductor 450. Counter 441 provides a count value to data register 447 by way of conductor 446.

Control and status information is transferred between counter 441, control circuit 442, and control circuit 443 by way of conductors 451. For example, one of control circuits 442 and 443 provides a data transfer control signal to counter 441 by way of conductors 451. When the data transfer control signal provided to counter 441 is asserted, counter 441 transfers the present count value to data register 447 by way of conductors 446. Data register 447 can be accessed by way of bus 24 using read accesses and write accesses. Counter 441 receives a clock signal by way of conductor 452. Control register storage bits 67 are coupled to control circuits 442 and 443 by way of conductor 453.

Figure 28:
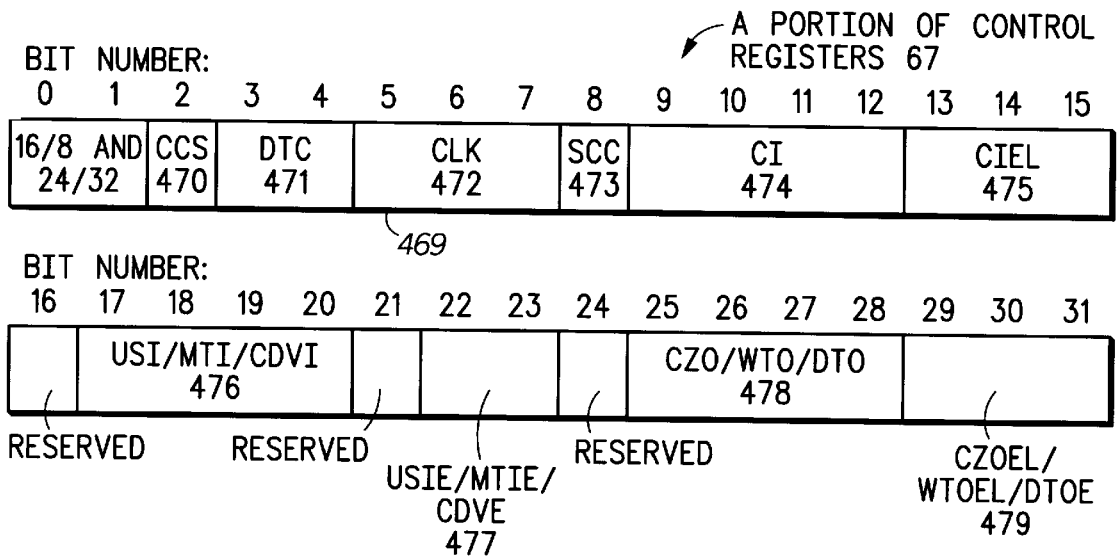
FIG. 28 illustrates, in block diagram form, a first portion of registers 67 of FIG. 2 in accordance with one embodiment of the present invention.

FIG. 28 illustrates one embodiment of a portion of control registers 67 (see FIG. 2 and FIG. 27). Note that some of the register bits may have a different function depending upon the mode selected for counter channel 58. For example, the CZO/WTO/DTO bits 478 function as Count to Zero Output (CZO) bits when the count window mode is disabled, function as Window Termination Output (WTO) bits when the count window mode is enabled, and function as Data Transfer Output (DTO) bits when data transfer mode is selected. In one embodiment, the control register bits illustrated in FIG. 28 serve the following functions.

---

16/8&24/32 - 16-bit, 8- and 24 bit, or 32-bit Operation Bits 469
00 - 32-bit operation
01 - Combined up/down 8- and 24-bit operation
1X - 16-bit operation
CCS: Counter Clock Select Bit 470
0 - Counter clocked using input events
1 - Counter clocked using clock bus input
DTC: Data Transfer Control Bits 471
0X - Count mode enabled
10 - Enabled w/VADP detect output event
11 - Enabled w/IADP detect output event
CLK: Clock Bus Source Select Bits 472
000-111 - Clock bus line 0 - 7
SCC: Single/Continuous Count Operation Bit 473
0 - Continuous count operation
1 - Single count operation
CI: Count Input Bits 474
0000-0111 - Pin line 0 - Pin line 7
1000-1111 - Status line 0 - Status line 7
CIEL: Count Input Edge or Level Bits 475
CCS=0
X00 - Input Disabled
X01 - Count rising-edge input events
X10 - Count falling-edge input events
X11 - Count both edge input events
CCS=1
000 - Input Disabled
001 - Start at rising-edge using clock
010 - Start at falling-edge using clock
011 - Start at either edge using clock
100 - Start at input low using clock
101 - Start at input high using clock
110 - Count while input is low using clock
111 - Count while input is high using clock
USI/MTI/CDVI: Up Count Stop Input/
Modulus Transfer Input/
Clear Data Valid Input Bits 476
0000-0111-Pin0 - Pin7

---

-continued 1000-1111 - Status 0 - Status 7
USIE/MTIE/CDVE: Up Count Stop Input Edge/
Modulus Transfer Input Edge/
Clear Data Valid Edge Bits 477
00 - Input Disabled
01 - Stop cnt/Xfer mod/Clr DVB on rising-edge
10 - Stop cnt/Xfer mod/Clr DVB on falling-edge
11 - Stop cnt/Xfer mod/Clr DVB on either edge
CZO/WTO/DTO: Count to Zero Output/
Window Termination Output/
Data Transfer Output Bits 478
0000-0111 - Pin line 0 - Pin line 7
1000-1111 - Status line 0 - Status line 7
CZOEL/WTOEL/DTOE: Count to Zero Output Edge or Logical
Operation/
Window Termination Output Edge or Logical Operation/
Data Transfer Output Edge Bits 479
CZOEL/WTOEL
000 - Output Disabled
001 - Output a rising-edge
010 - Output a falling-edge
011 - Output a toggle
100 - Conditional AND output to set pin/status
101 - Conditional OR output to set pin/status
110 - Conditional AND output to clear pin/status
111 - Conditional OR output to clear pin/status
DTOE
X00 - Output Disabled
X01 - Output a rising-edge
X10 - Output a falling-edge
X11 - Output a toggle

---

Figure 29:
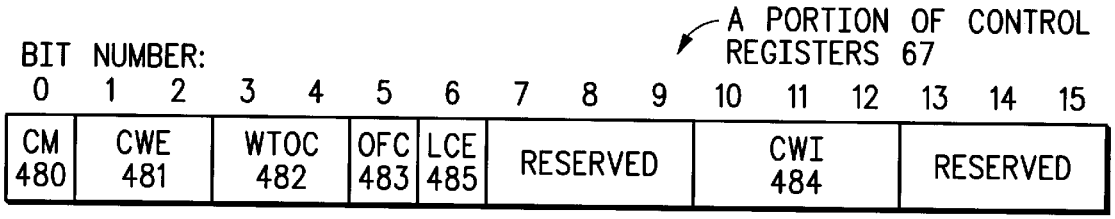
FIG. 29 illustrates, in block diagram form, a second portion of registers 67 of FIG. 2 in accordance with one embodiment of the present invention.

FIG. 29 illustrates one embodiment of a portion of control registers 67 (see FIG. 27). In one embodiment, the control register bits illustrated in FIG. 29 serve the following functions.

---

CM: Counter Mode Bit 480
0 - Down count mode
1 - Up count mode
CWE: Count Window Enable Bits 481
00 - Count window operation disabled
01 - Enabled using selected status line
1X - Enabled using input from bottom adjacent dual FIFO channel
(if applicable)
Note: If a bottom adjacent dual FIFO channel does not exist and
CWE = 1X is selected, then the window input is always low.
WTOC: Window Termination Output Control Bits 482
00 - Count to zero output enabled,
    Window termination output disabled
01 - Count to zero output disabled,
    Window termination output enabled for
    first count operation within a window
10 - Count to zero output enabled,
    Window termination output enabled for
    first count operation within a window
11 - Count to zero output enabled,
    Window termination output enabled for
    any count operation within a window
OFC: Overflow Control Bit 483
0 - Stop at zero on overflow
1 - Continue to increment on overflow
LCE: Logical Complement Enable Bit 485
0 - Logical complement output disabled
1 - Logical complement output enabled
CWI: Count Window Input Bits 484
000-111 - Status line 0 - Status line 7

---

Figure 30:
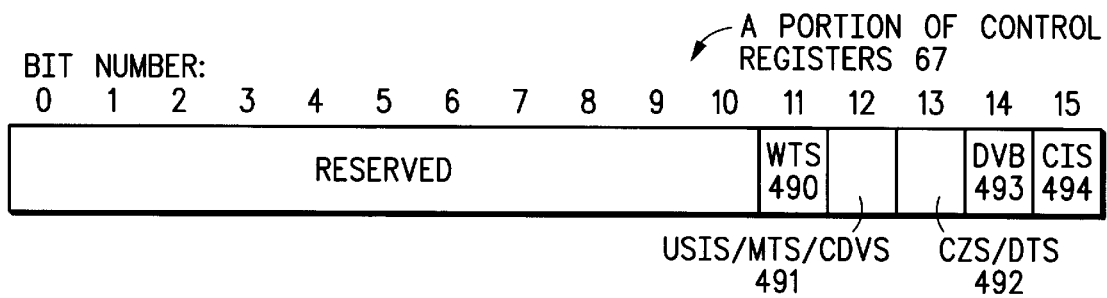
FIG. 30 illustrates, in block diagram form, a third portion of registers 67 of FIG. 2 in accordance with one embodiment of the present invention.

FIG. 30 illustrates one embodiment of a portion of registers 67 (see FIG. 27). Note that in some embodiments, registers 67 include both control register bits and status register bits. In the embodiment illustrated in FIG. 30, a portion of registers 67 is used to store status information. In one embodiment, the status register bits illustrated in FIG. 30 serve the following functions.

Figure 31:
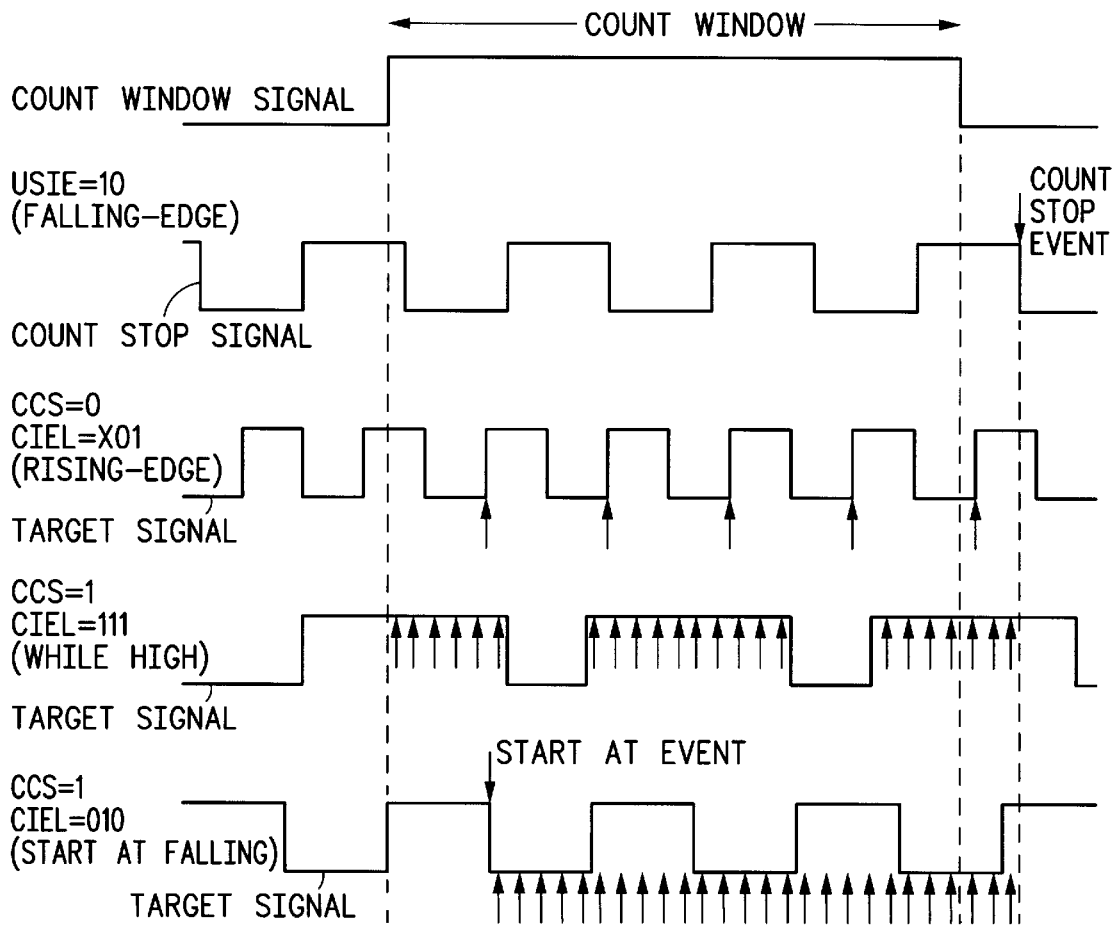
FIG. 31 illustrates, in timing diagram form, an improved method for performing period accumulation measurements in accordance with one embodiment of the present invention.

WTS: Window Termination Status Bit 490
0 - A single count operation, or the first continuous count operation within the window has not been terminated
1 - A single count operation, or the first continuous count operation within the window has been terminated
USIS/MTS/CDVS: Up Count Stop Input Status/
Modulus Transfer Status/
Clear Data Valid Status Bits 491
0 - Stop counter/Modulus Transfer/Clear data valid has not occurred
1 - Stop counter/Modulus Transfer/Clear data valid has occurred
CZS/DTS: Count to Zero Status/
Data Transfer Status Bit 492
0 - Inc/Dec to zero or VADP/IADP has not occurred
1 - Inc/Dec to zero or VADP/IADP has occurred
DVB: Data Valid Bit 493
0 - Data within the data register is invalid
1 - Data within the data register is valid
CIS: Count Input Status Bit 494
0 - Up/Down count input has not occurred
1 - Up/Down count input has occurred FIG. 31 illustrates the relationship between the counting operation in counter 441 (see FIG. 27) and some of the control register bits illustrated in FIGS. 28–29. Referring to FIG. 31, when CCS=0 and CIEL=X01, the counter 441 increments at every rising-edge input after the count window signal is high. Note that counter 441 continues to increment after the count window signal goes low. Counter 441 is stopped when the first count stop signal event occurs after the count window signal goes low. At this point, the count operation is complete, the up count stop input status bit in control registers 67 is set, the count value is transferred to data register 447, and the DVB bit in control registers 67 is set.

When CCS=1 and CIEL=111, counter 441 increments using the clock input selected by the CLK bit-field whenever the target signal is high and the count window signal is high. Again, counter 441 is stopped when the first count stop signal event occurs after the count window signal goes low. When CCS=1 and CIEL=010, counter 441 uses the clock signal from conductor 452 to increment and begins the count operation at the first falling-edge of the target signal when the count window signal is high. Once more, counter 441 is stopped when the first count stop signal event occurs after the count window signal is negated.

Figure 32:
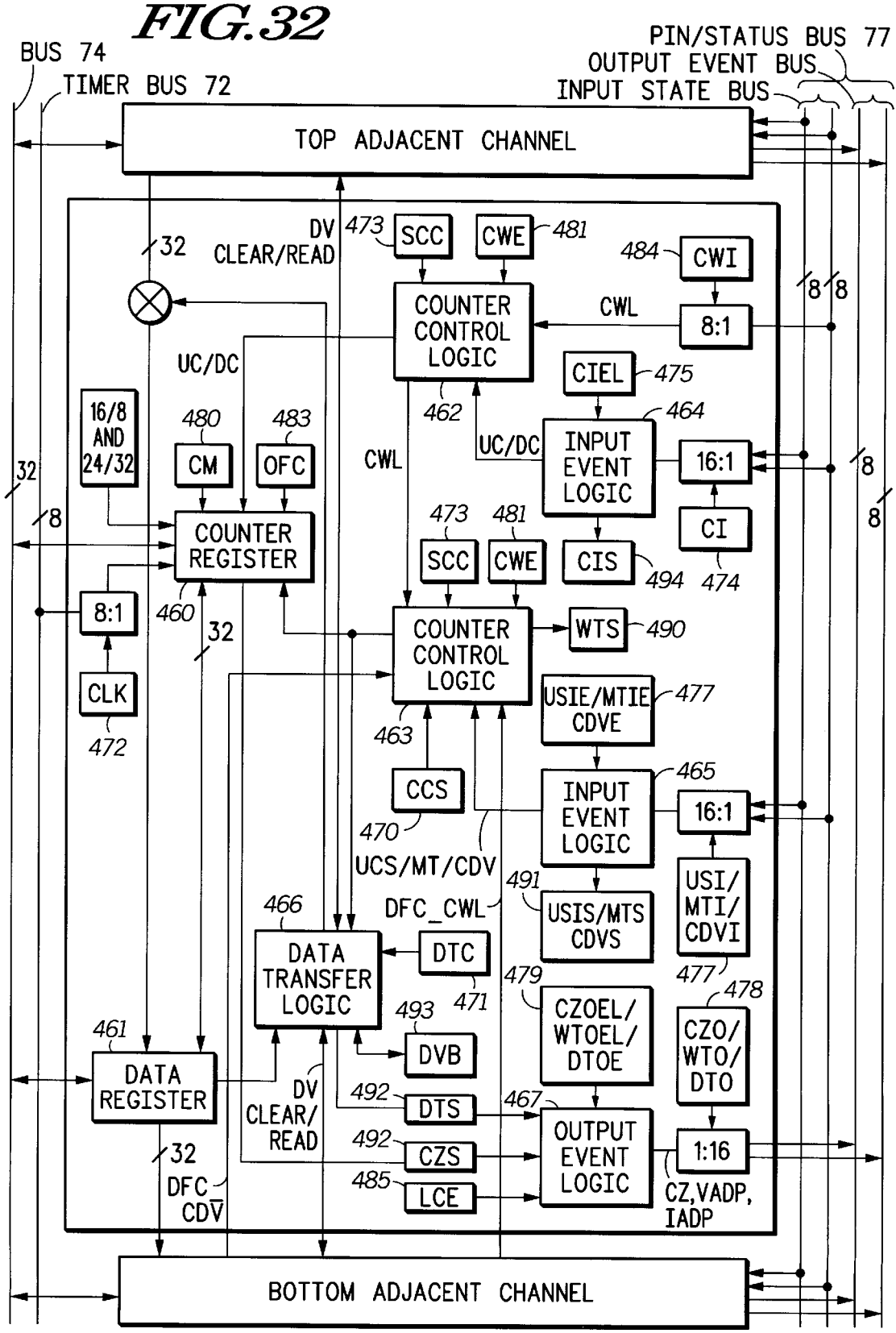
FIG. 32 illustrates, in block diagram form, a portion of counter channel 58 of FIG. 2 in accordance with one embodiment of the present invention.

FIG. 32 illustrates an alternate embodiment of a portion of counter channel 58 (see FIG. 2). In this embodiment, counter channel 58 includes a counter register 460, a data register 461, and output event logic 467. In one embodiment, counter register 460 can be partitioned into two counter portions which can operate independently. The first counter portion responds to counter control logic 462 and input event logic 464. The second counter portion responds to counter control logic 463 and input event logic 465. In one embodiment, each counter portion also has a separate set of control register bits as illustrated in FIG. 28 and FIG. 29.

The various control and status bits illustrated in FIG. 32, although located in read and write accessible registers, affect the behavior of counter channel 58 as illustrated in FIG. 32. Note that the DTC register bit 471, the DVB register bit 493, and the DTS register bit 492 are used for data transfer between channels in the same manner as described in FIGS. 20–24 and the accompanying portion of the specification.

Note that in one embodiment, the count stop signal is not needed if the counter (e.g. counter 441 in FIG. 27) is a down counter. In some embodiments using a down counter, a count value of all zeroes may be used to indicate that the count operation should stop. Thus a count value of all zeroes for a down counter may serve the same function as a count stop signal for an up counter. As a result, a down counter will stop counting when the count value reaches all zeroes the first time after the count window signal is negated.

Capture Window Feature

Many microcontroller based control applications require a timebase value to be captured at either rising edges, falling edges, or both rising and falling edges of a target signal. For example, capture channel 55 in FIG. 2 may be used to capture timebase values from timer bus 71 based upon when the selected edges of a target signal occur. The target signal may be provided from external to input/output (I/O) integrated circuit 22 (see FIG. 1), or may be generated internal to I/O integrated circuit 22. Capture channel 55 may perform a variety of capture operations which can be selected by writing predetermined control values into one or more user programmable control register storage bits 66 in capture channel 55 (see FIGS. 2, 5, 35, and 36).

Many control applications require a second signal produced by a second channel to qualify when to capture a timebase value and when not to capture a timebase value based on when the edges of a target signal occur. For example, referring to FIG. 2, this second channel that produces the second signal may be channel 54, which may be a match channel, a counter channel, or another other type of work channel in channels 57. Ideally, the enabling and disabling of the timebase value captures should require no direct servicing by a processor (e.g. CPU 13 in FIG. 1), and the capture timebase values should be coherent regardless of the frequency of the target signal.

However, in prior art control applications, the second signal was required to generate an interrupt, and the interrupt service routine executed by a processor (e.g. CPU 13 in FIG. 1) was required to intervene in order to enable the capture operation within the capture channel. Additionally, to disable the capture operation within the capture channel, the second signal was required to generate an interrupt, and the interrupt service routine was required to intervene in order to disable the capture operation within the capture channel.

Also, in order to maintain the coherency of the captured timebase values, prior art control applications generally required interrupt service processing in order to transfer each captured timebase value to a holding register or memory prior to the next active edge of the target signal. Thus if the frequency of the target signal was high enough, the interrupt service routine was not always able to transfer the captured timebase value to a holding register or memory before the next active edge of the target signal occurred, thus losing coherency of the captured timebase values.

Figure 33:
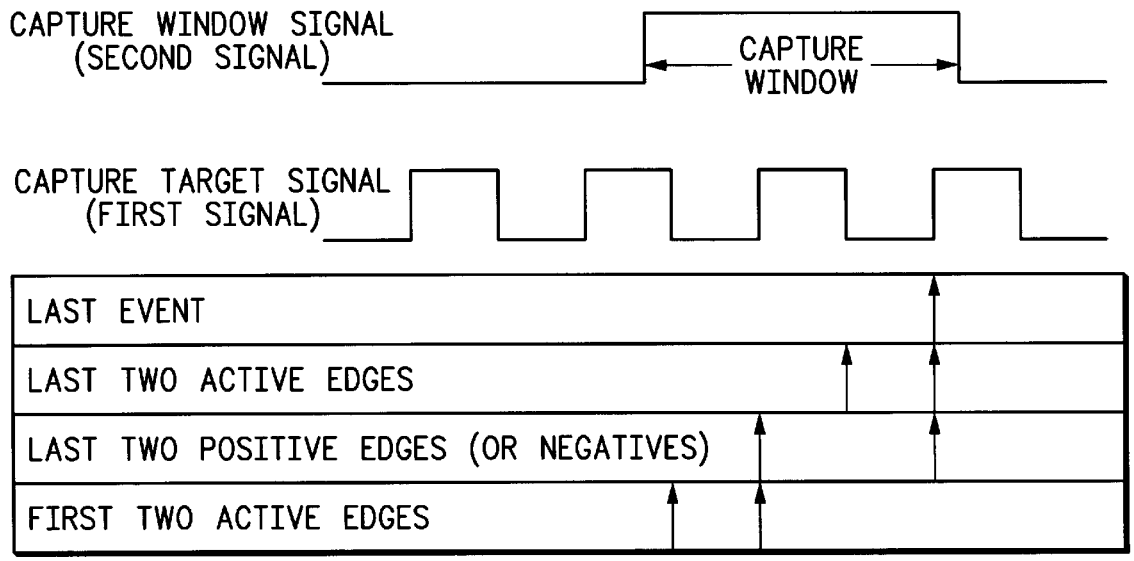
FIG. 33 illustrates, in timing diagram form, an improved method for capturing timebase values in accordance with one embodiment of the present invention.

FIG. 33 illustrates how a second signal, namely a capture window signal, may be used to qualify the capture of timebase values from a timer bus. As a first programmable selection, capture channel 55 may capture and store a timebase value based on the last event (i.e. the last active edge) of the target signal. The active edge may be programmably selected as either the rising edge, the falling edge, or any edge of the target signal. Second, capture channel 55 in conjunction with "N-1" other capture channels may capture and store "N" timebase values, one timebase value for each of the "N" last active edges of the target signal. Third, capture channel 55 in conjunction with "N-1" other capture channels may capture and store "N" timebase values, one timebase value for each of the "N" last positive edges of the target signal. Alternately, capture channel 55 in conjunction with "N-1" other capture channels may capture and store "N" timebase values, one timebase value for each of the "N" last negative edges of the target signal. Fourth, capture channel 55 in conjunction with "N-1" other capture channels may capture and store "N" timebase values, one timebase value for each of the "N" first active edges of the target signal. In one embodiment of the present invention, two capture channels are used, so the number "N" is 2. As used in this paragraph, "N" represents a positive integer. Alternate embodiments of the present invention may use other capture operations.

As described above, the capture window feature eliminates the need for service intervention by a processor (e.g. CPU 13 in FIG. 1) and provides an interlock of data regardless of the frequency of the target signal. The capture window feature allows a capture channel to directly receive stimulus (i.e. the capture window signal) to determine when to and when not to capture timebases. Thus, interrupt servicing by a processor (e.g. CPU 13 in FIG. 1) is greatly reduced and coherency of the captured timebase values is maintained, regardless of the frequency of the target signal.

The capture window feature allows the capturing of timebase values by a capture channel to be qualified by the logic state of a second signal, namely a capture window signal, such that the capturing of timebase values can be enabled during a "window" defined by the second signal.

A capture window enable register bit (CWE 501 in FIG. 35) is used to enable the capture window feature. A capture window is an interval or "window" of time/angles in which timebase capture operations are performed. While the capture window bit is set, timebase captures based on target signal edges are qualified by the state of a second signal, namely the capture window signal. Timebase captures due to the target signal are permitted while the state of the capture window signal is asserted (logic level one in FIGS. 33–34) and disabled while the state of the second signal is negated (logic level zero in FIGS. 33–34).

Figure 34:
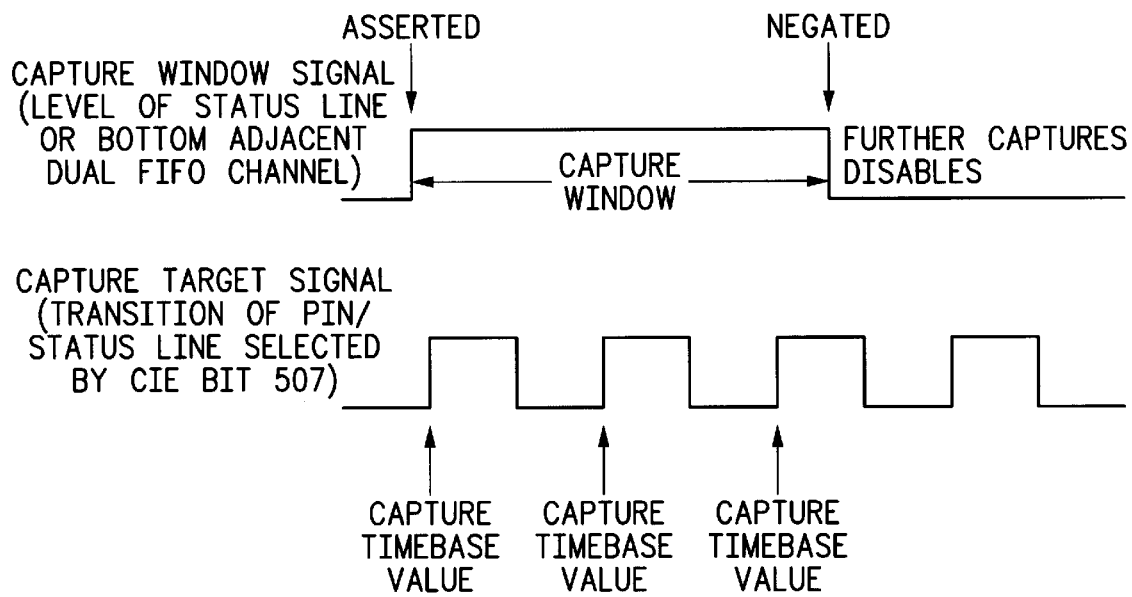
FIG. 34 illustrates, in timing diagram form, an improved method for capturing timebase values in accordance with one embodiment of the present invention.

FIG. 34 illustrates an example of the use of the capture window feature and the use of certain register control bits located in registers 66 of capture channel 55 (see FIG. 2). In this example, the capture window enable bit (CWE 501 in FIG. 35) is set, thus enabling the capture window feature. Capture channel 55 captures the timebase value present on timer bus 71 (see FIG. 2) when each rising edge of the target signal occurs. Note, however, that capture channel 55 only captures the timebase value present on timer bus 71 when the capture window signal is asserted and the selected edge of the target signal occurs. Thus, the interval in which the capture window signal is asserted defines the "window" in which captures are permitted. While the capture window signal is negated, further timebase captures of the target signal are disabled.

Note that in the example illustrated in FIG. 34, the capture window signal is provided to capture channel 55 by way of pin/status bus 75 or from the bottom adjacent dual FIFO channel (if it is implemented). In one embodiment, a dual FIFO channel is a work channel that is capable of acting as a two-deep FIFO for storing values. For example, referring to FIG. 20, counter channel 402 may be replaced by a dual FIFO channel which then may act as the bottom adjacent dual FIFO channel for capture channel 401. If the CWE bits 501 select the pin/status bus 75 as the source of the capture window signal, then the CWI bits 505 are used to select which of the pin/status bus conductors 75 will be used to provide the capture window signal to capture channel 55. If CWE bits 501 select the bottom adjacent dual FIFO channel as the source of the capture window signal, then the CWI bits 505 are ignored. Note that if the bottom adjacent channel is not a dual FIFO channel, and the CWE bits 505 are programmed to select a bottom adjacent dual FIFO channel, then the capture window remains disabled.

Still referring to the example illustrated in FIG. 34, the CI bit 506 in registers 66 (see FIG. 35) is used to select which of the pin/status bus conductors 75 will be used to provide the capture target signal to capture channel 55. The CIE bit 507 is used to select which edge of the capture target signal, namely the rising edge, the falling edge, or either edge, is used to trigger the capture of the timebase value from timer bus 71. And, the CTB bit 503 is used to select which of the timebase values will be captured by capture channel 55 from timer bus 71.

FIG. 35 illustrates one embodiment of a portion of register 66 (see FIG. 2 and FIG. 27). Note that some of the register bits may have a different function depending upon the mode selected for capture channel 55. For example, the CI/CDVI bits 506 function as Capture Input (CI) bits when the capture window mode is enabled and function as Clear Data Valid Input (CDVI) bits when the data transfer mode is selected. In one embodiment, the control register bits illustrated in FIG. 35 serve the following functions.

16/32: 16-bit or 32-bit Functionality Bit 500
    0 - 32-bit
    1 - 16-bit
CWE: Capture Window Enable Bits 501
    00 - Capture window disabled
    01 - Capture window enabled using
       status line selected by CWI bit field
    1x - Capture window enabled using input
       from bottom adjacent dual FIFO
       channel (if applicable)
DTC: Data Transfer Control Bits 502
    0X - Data transfer disabled; Capture
       enabled
    10-VADP
    11-IADP
CTB: Capture Timebase Bits 503
    000-111 Timebase 0 - 7
SCC: Single/Continuous Capture Bit 504
    0 - Continuous capture operation
    1 - Single capture operation
CWI: Capture Window Input Bits 505
    000-111 Status Bus 0 - 7
CI/CDVI: Capture Input/Clear Data Valid Input Bits 506
    0000-0111 Pin Bus 0 - 7
    1000-1111 Status Bus 0 - 7
CIE/CDVE: Capture Input Edge/Clear Data Valid Edge Bits 507
    00 - Input Disabled
    01 - Rising edge
    10 - Falling edge
    11 - Either edge
CO/DTO: Capture Output/Data Transfer Output Bits 508
    000 - 111 Status line 0 - 7
COE/DTOE: Capture Output Edge/
    Data Transfer Output Edge Bits 509
    00 - Output Disabled
    01 - Rising edge
    10 - Falling edge
    11 - Toggle FIG. 36 illustrates one embodiment of a portion of registers 66 (see FIG. 2). Note that in some embodiments, registers 66 include both control register bits and status register bits. In the embodiment illustrated in FIG. 36, a portion of registers 66 is used to store status information. In one embodiment, the status register bits illustrated in FIG. 36 serve the following functions.

Figure 37:
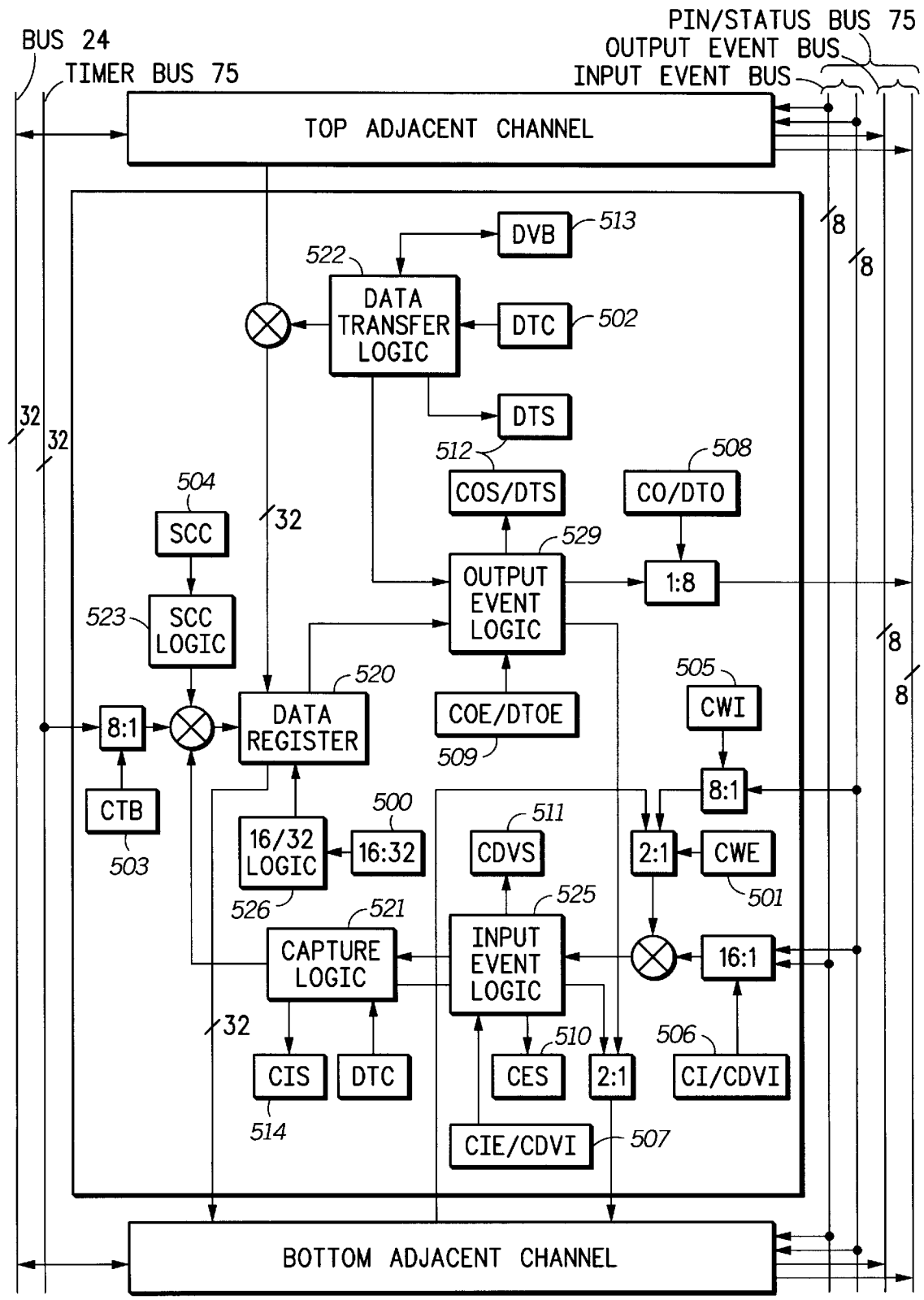
FIG. 37 illustrates, in block diagram form, a portion of capture channel 55 of FIG. 2 in accordance with one embodiment of the present invention.

CES: Capture Edge Status Bit 510
    0 - A falling edge input event detected and the associated capture operation occurred
    1 - A rising edge input event detected and the associated capture operation occurred
CDVS: Clear Data Valid Status Bit 511
    0 - No qualified input event with DVB = 1 detected
    1 - Qualified input event with DVB = 1 detected
COS: Capture Output Status Bit 512
    0 - Capture operation has not occurred or COE bit field = 00
    1 - Capture operation has occurred and COE bit field = 00
DTS: Data Transfer Output Status Bit 512
    0 - Condition for either VADP or IADP not detected
    1 - Condition for either VADP or IADP detected
DVB: Data Valid Bit 513
    0 - Data in data register is not valid
    1 - Data in data register is valid
CIS: Capture Input Status/Clear Data Valid Status Bit 514
    0 - A capture has not occurred
    1 - A capture has occurred FIG. 37 illustrates one embodiment of a portion of capture channel 55 (see FIG. 2). In this embodiment, capture channel 55 includes a data register 520, capture logic 521, data transfer logic 522, single/continuous capture logic 523, output event logic 524, input event logic 525, and 16/32 bit logic 526.

The various control and status bits illustrated in FIG. 37, although located in read and write accessible registers, affect the behavior of capture channel 55 as illustrated in FIG. 37. Note that the DTC register bit 502, the DVB register bit 513, and the DTS register bit 512 are used for data transfer between channels in the same manner as described in FIGS. 20–24 and the accompanying portion of the specification.

Features of a Single/Continuous Operation Timer Channel

In one embodiment of I/O integrated circuit 22 (see FIG. 1), each work channel has a single operation mode and a continuous operation mode. In one embodiment of the present invention, each counter channel (e.g. counter channel 58), each capture channel (e.g. capture channel 55), and each match channel (e.g. match channel 57) has a user programmable register bit which allows the channel to be operated in single mode or continuous mode.

For example, Single/Continuous Count Operation (SCC) register bit 473 (see FIG. 28) determines whether counter channel 58 (see FIG. 2) is in single operation mode or continuous operation mode. Single/Continuous Capture (SCC) register bit 504 (see FIG. 35) determines whether capture channel 55 (see FIG. 2) is in single operation mode or continuous operation mode. And, Single/Continuous Match (SCM) register bit 531 (see FIG. 38) determines whether match channel 57 (see FIG. 2) is in single operation mode or continuous operation mode.

Upon entering single operation mode, the associated timer function status bit (e.g. Count Input Status (CIS) bit 494 in FIG. 30, Capture Output Status (COS) bit 512 in FIG. 36, and Match Status (MS) bit 534 in FIG. 39) will be cleared and then provide both status and control of the timer function. While the work channel is configured for single operation mode, the channel will be disabled if the associated timer function status bit is set, and the channel will be enabled if the associated timer function status bit is cleared.

Unfortunately, however, there are three problems associated with a single operation mode/continuous operation mode work channel. The first problem is coherently transitioning from a continuous operation mode to a single operation mode. The second problem is preventing inadvertent re-enabling of a match channel when in single operation mode. And the third problem is preventing multiple outputs based on redundant match events from a match channel in continuous operation mode.

The problem of coherently transitioning from a continuous operation mode to a single operation mode is solved in the following manner. When performing timer functions in single operation mode (i.e. "single shot" matches, captures, etc.), the status bit associated with the timer function (i.e. CIS bit 494 in FIG. 30, COS bit 512 in FIG. 36, and MS bit 534 in FIG. 39) indicates if the timer function is enabled or disabled. In one embodiment, if the status bit is cleared, the timer function is enabled, and if the status bit is set, the timer function is disabled. In effect, the status bit "controls" the operation of the timer function.

When performing timer functions in a continuous operation mode (i.e. "continuous" matches, captures, etc.), the same status bit associated with the timer function indicates if one or more events (i.e. matches, captures, etc.) has occurred. The status bit only provides information about operation but does not affect or control the timer function in any way.

When transitioning from continuous operation mode to single operation mode, the same associated timer function status bit must transition from performing a "status" function to a "status and control" function. It is most likely that the status bit will have been set while the work channel was in continuous operation mode. When transitioning to single operation mode, if the status bit remains set the work channel will immediately disable itself, without having performed one timer function. If the work channel becomes disabled upon entering single operation mode, it is possible the channel will "miss" stimulus, thus causing an incoherent transition from continuous to single operation mode.

The work channel circuitry forces the associated status bit to clear itself upon entering single operation mode and then allows the status bit to perform a "status and control" function. The work channel circuitry uses the same status bit in both continuous and single operation mode, although the way the status bit is used is different dependent upon the mode. In addition, the transition between the two modes is coherent in that no stimulus to the work channel will be lost while transitioning between the two modes.

The problem of preventing inadvertent re-enabling of a match channel when in single operation mode is solved in the following manner. When a match channel (e.g. match channel 57 in FIG. 2 and FIG. 40) is operating in single operation mode (i.e. allowing only one true compare to occur and then disabling the match channel), the match channel will be enabled when the associated match status bit (e.g. MS bit 534 in FIG. 39) indicates that a match has not occurred (MS=% 0). The match channel will be disabled when the associated match status bit indicates that a match has occurred (MS=% 1).

In some cases it is desirable to clear the match status bit and not re-enable the match channel. The match channel circuitry prevents the match channel from being re-enabled by only clearing the match status bit. In order to re-enable the match channel, both the match status bit must be cleared and the data register (e.g. data register 540 in FIG. 40) must be written. This provides a coherent way for the CPU 13 (see FIG. 1) to manipulate the match channel (i.e. change the control values stored in the control registers, change the data value stored in the match register (e.g. 540 in FIG. 40), and negate the match status bit) without re-enabling the match channel. It is a useful feature to allow CPU 13 (see FIG. 1) to clear the match status bit without re-enabling the match function.

The problem of preventing multiple outputs based on redundant match events when in continuous operation mode is solved in the following manner. When a match channel in continuous operation mode is matching against a "slow" timebase (i.e. increments at a frequency of less than one half the match rate), it is possible to have multiple compares against the same timebase value. When the timebase value is equal to the value in the data register and remains the same over multiple compares, the data register will assert a true compare signal every time it performs a compare.

It is desirable to only assert one output upon a match between the timebase value and the value in the match register, regardless of how many "true compare" signals are generated. The match channel circuitry allows only the following true compare signals to generate an output: (1) the first true compare since the last false compare; and (2) the first true compare since the match register has received new data in its data register (i.e. written by CPU 13 or transfer from an adjacent channel). A continuous match interlock is set (inhibits matches) when the first true match occurs, and is cleared (enables matches) upon the occurrence of the first false compare since the last true compare on the same timebase, or when matches are disabled while in continuous mode (i.e. SCM=% 0 and MOE=% 000). As a result, no redundant matches will occur, regardless of the frequency of the match timebase.

FIG. 38 illustrates one embodiment of a portion of registers 65 (see FIG. 2). In one embodiment, the control register bits illustrated in FIG. 38 serve the following functions.

```
12/16/32: 12/half word/word Select Bits 529
    0x - 32-bit (word)
    10 - 12-bit
    11 - 16-bit
MTB: Match Time Base Bits 530
    000-111 Time Base 0 - 7
SCM: Single/Continuous Match Bit 531
    0 - Continuous match operation
    1 - Single match operation
MO: Match Output Bits 532
    0000-0111 Pin Bus 0 - 7
    1000-1111 Status Bus 0 - 7
MOE: Match Output Edge Bits 533
    000 - Output and equal to compare are disabled
    001 - Output a rising-edge
    010 - Output a falling-edge
    011 - Output a toggle
    100 - Conditional AND output to set pin/status
    101 - Conditional OR output to set pin/status
    110 - Conditional AND output to clear pin/status
    111 - Conditional OR output to clear pin/status
```

FIG. 39 illustrates one embodiment of a portion of registers 65 (see FIG. 27). Note that in some embodiments, registers 65 include both control register bits and status register bits. In the embodiment illustrated in FIG. 39, a portion of registers 65 is used to store status information. In one embodiment, the status register bit illustrated in FIG. 39 serves the following function.

```
MS: Match Status
    0 - A match has not occurred
    1 - A match event has occurred
```

Figure 40:
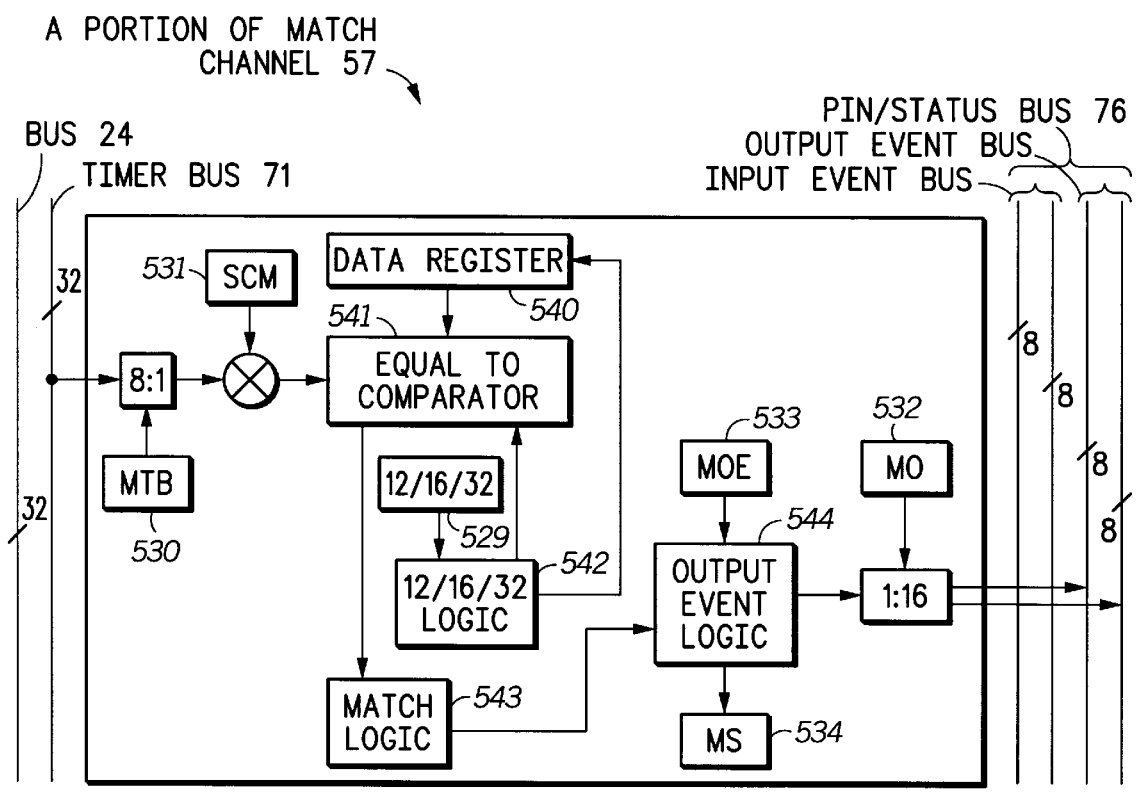
FIG. 40 illustrates, in block diagram form, a portion of match channel 57 of FIG. 2 in accordance with one embodiment of the present invention.

FIG. 40 illustrates one embodiment of a portion of match channel 57 (see FIG. 2). In this embodiment, match channel 57 includes a data register 540, equal to comparator logic 541, 12/16/32 select logic 542, match logic 543, and output event logic 544. In one embodiment, data register 540 can be partitioned into two portions, namely an upper portion and a lower portion, which can operate independently. In one embodiment, each of the two match portions has a separate set of control and status register bits as illustrated in FIG. 38 and FIG. 39, except there is only one set of 12/16/32 Select Bits 529 which control the partitioning. The first match portion uses first portions of data register 540, equal to comparator logic 541, match logic 543, and output event logic 544; the second match portion uses second portions of data register 540, equal to comparator logic 541, match logic 543, and output event logic 544.

The various control and status bits illustrated in FIG. 40, although located in read and write accessible registers, affect the behavior of match channel 57 as illustrated in FIG. 40. Note that in the embodiment illustrated in FIG. 40, match channel 57 does not include the register bits and the circuitry required to perform data transfer between adjacent channels. However, referring to FIG. 40 and FIG. 37, in alternate embodiments of the present invention, match channel 57 may include data transfer logic and register bits DTC, DVB, and DTS which serve the same function as the data transfer logic 522 and register bits DTC 471, DVB 493, and DTS 492 in capture channel 55. If implemented, data transfer to or from a match channel occurs in the same manner as described in FIGS. 20–24 and the accompanying portion of the specification.

Still referring to FIG. 40, match channel 57 supports single and continuous match operation. While functioning in the single or continuous match operation, the value in data register 540 is compared to one of eight values from timer bus 71. Output events can be programmed to be generated and provided to pin/status bus 76. The operation of one embodiment of match channel 57 will now be described according to the operation's purpose, the control bits which configure the operation, and the output events which are generated.

In single and continuous match operation, matches occur between valid data and a value from timer bus 71 (either a 32-bit or a 12/16 bit timebase value). The timebase value is selected by programming the MTB register bits 530 (see FIG. 38). The number of bits of the timebase value is selected by programming the 12/16/32 Select Bits 529. For example, if 12-bit operation is selected, the lower 12 bits of the timebase value and the lower 12 bits of the value in data register 540 will be compared by equal to comparator 541.

If MOE bits 533 are not equal to % 000, and the value in data register 540 is equal to the timebase value from timer bus 71, then a match occurs and the MS bit 534 (see FIG. 39) is set. An output event is then generated and provided to one of the pin/status bus conductors 76. The type of output event is selected by programming the MOE bits 533 (see FIG. 38). If MOE bits 533 are equal to % 000, both the output event logic 544 and the equal to comparator 541 are disabled. The destination of the output event is selected by programming the MO bits 532 (see FIG. 38).

The Single/Continuous Match (SCM) bit 531 (see FIG. 38) is used to select whether the match channel will produce only one output event (i.e. single operation mode) or will produce more than one output event (i.e. continuous operation mode) between software servicing by CPU 13 (see FIG. 1).

When the Single/Continuous Match (SCM) bit 531 (see FIG. 38) is % 1, single match operation is selected. In single match operation, once the timebase value from timer bus 71 and the value stored in data register 540 are equal, an output event is generated on pin/status bus 76 and the single match interlock mechanism will be asserted to prevent redundant matches. Subsequent output events can only be generated after the single match interlock mechanism is released. The following two actions are required to release the single match interlock mechanism (the two actions can be performed in any order): (1) the Match Status (MS) bit 534 (see FIG. 39) is read in the asserted state (i.e. a logic level one) and the negated state (i.e. logic level zero) is written back to MS bit 534; and (2) a value is written to data register 540.

Note that CPU 13 (see FIG. 1) may be used to perform the read and write accesses required by the single match interlock mechanism. Also, action (2) is necessary to release the single match interlock mechanism for the following reason. If there are multiple match channels generating output events and interrupt requests on the same pin/status bus conductor 76, action (2) allows the MS bit 534 to be cleared for any match channel, thereby clearing the status of the interrupting source, without re-enabling matches.

When the Single/Continuous Match (SCM) bit 531 (see FIG. 38) is % 0, continuous match operation is selected. In the continuous match operation, once the timebase value from timer bus 71 and the value stored in data register 540 are equal, an output event is generated on pin/status bus 76 and the continuous match interlock mechanism will be asserted to prevent redundant matches. Subsequent output events can only be generated after the continuous match interlock mechanism is released. The continuous match interlock is released after an unequal compare occurs or if the MOE bits 533 are cleared to % 000. The MS bit 534 is set after the first match occurs, but clearing of the MS bit 534 is not required for subsequent matches to occur.

While the present invention has been illustrated and described with reference to specific embodiments, further modifications and improvements will occur to those skilled in the art. It is to be understood, therefore, that this invention is not limited to the particular forms illustrated and that it is intended in the appended claims to cover all modifications that do not depart from the spirit and scope of this invention.

We claim:

1. An integrated circuit timer, comprising:

a first timer bus;

a first timebase channel for generating a first timebase value;

a second timebase channel for generating a second timebase value;

a first timer bus control channel corresponding to said first timebase channel, for selecting one of said first and second timebase channels, and if said first timebase channel is selected, for driving said first timer bus with the first timebase value; and a second timer bus control channel corresponding to said second timebase channel, for driving said first timer bus with the second timebase value if said second timebase channel is selected.

2. An integrated circuit timer as in claim 1, further comprising:

a work channel, coupled to said first timer bus, said work channel receiving one of the first and second timebase values from said first timer bus.

3. An integrated circuit timer as in claim 1, further comprising:

a second timer bus; and a third timer bus control channel corresponding to said second timebase channel, for selecting said second timebase channel, and if said second timebase channel is selected, for driving said second timer bus with the second timebase value.

4. An integrated circuit timer as in claim 3, wherein said second timer bus control channel drives said first timer bus with the second timebase value while said third timer bus control channel drives said second timer bus with the second timebase value.

5. An integrated circuit timer as in claim 3, further comprising:

a third timebase channel for generating a third timebase value; and a fourth timer bus control channel corresponding to said third timebase channel, for driving said second timer bus with the third timebase value if said third timebase channel is selected; and wherein the third timer bus control channel selects one of the second and third timebase channels.

6. An integrated circuit timer as in claim 5, further comprising:

a first work channel, coupled to said first timer bus, said first work channel receiving one of the first and second timebase values from said first timer bus; and a second work channel, coupled to said second timer bus, said second work channel receiving one of the second and third timebase values from said second timer bus.

7. An integrated circuit timer as in claim 6, further comprising:

a third work channel, coupled to said first timer bus, said third work channel receiving one of the first and second timebase values from said first timer bus; and a fourth work channel, coupled to said second timer bus, said fourth work channel receiving one of the second and third timebase values from said second timer bus.

8. An integrated circuit timer, comprising:

a first timer bus;

a first plurality of timebase channels for generating a first timebase value;

a second plurality of timebase channels for generating a second timebase value;

a first timer bus control channel corresponding to said first plurality of timebase channels, for selecting one of said first and second plurality of timebase channels, and if said first plurality of timebase channels is selected, for driving said first timer bus with the first timebase value; and a second timer bus control channel corresponding to said second plurality of timebase channels, for driving said first timer bus with the second timebase value if said second plurality of timebase channels is selected.

9. An integrated circuit timer, comprising:

a first timer bus;

a second timer bus;

a first plurality of timebase channels for generating a first timebase value;

a second plurality of timebase channels for generating a second timebase value;

a first timer bus control channel corresponding to said first plurality of timebase channels, for selecting one of said first and second plurality of timebase channels, and if said first plurality of timebase channels is selected, for driving said first timer bus with the first timebase value;

a second timer bus control channel corresponding to said second plurality of timebase channels, for driving said first timer bus with the second timebase value if said second plurality of timebase channels is selected;

a third timer bus control channel corresponding to said second plurality of timebase channels, for selecting said second plurality of timebase channels, and if said second plurality of timebase channels is selected, for driving said second timer bus with the second timebase value;

a first work channel, coupled to said first timer bus, said first work channel receiving one of the first and second timebase values from said first timer bus; and a second work channel, coupled to said second timer bus, said second work channel selectively receiving the second timebase value from said second timer bus.

* * * * *